(12) United States Patent
Machida

(10) Patent No.: US 10,816,782 B2
(45) Date of Patent: Oct. 27, 2020

(54) VARIABLE MAGNIFICATION OPTICAL SYSTEM, OPTICAL APPARATUS, IMAGING APPARATUS AND METHOD FOR MANUFACTURING VARIABLE MAGNIFICATION OPTICAL SYSTEM

(71) Applicant: Nikon Corporation, Minato-ku, Tokyo (JP)

(72) Inventor: Kosuke Machida, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 323 days.

(21) Appl. No.: 15/760,852

(22) PCT Filed: Sep. 16, 2016

(86) PCT No.: PCT/JP2016/077472
§ 371 (c)(1),
(2) Date: Apr. 24, 2018

(87) PCT Pub. No.: WO2017/047760
PCT Pub. Date: Mar. 23, 2017

(65) Prior Publication Data
US 2019/0293914 A1    Sep. 26, 2019

(30) Foreign Application Priority Data

Sep. 18, 2015 (JP) .................................. 2015-185503
Sep. 18, 2015 (JP) .................................. 2015-185505
Sep. 18, 2015 (JP) .................................. 2015-185507

(51) Int. Cl.
*G02B 15/14* (2006.01)
*G02B 15/173* (2006.01)
(Continued)

(52) U.S. Cl.
CPC ......... *G02B 15/173* (2013.01); *G02B 13/001* (2013.01); *G02B 27/646* (2013.01)

(58) Field of Classification Search
CPC ... G02B 15/173; G02B 27/646; G02B 13/001
See application file for complete search history.

(56) References Cited

U.S. PATENT DOCUMENTS 5,579,171 A * 11/1996 Suzuki ................ G02B 15/173
359/554
2014/0368913 A1    12/2014 Kawamura
(Continued)

FOREIGN PATENT DOCUMENTS

CN    104238097 A    12/2014
JP    S61-169808 A    7/1986
(Continued)

OTHER PUBLICATIONS

Communication including Supplementary Partial European Search Report for European Patent Application No. 16846631.6, dated Apr. 29, 2019.
(Continued)

*Primary Examiner* — Joseph P Martinez
(74) *Attorney, Agent, or Firm* — SGPatents PLLC

(57) ABSTRACT

A variable magnification optical system comprising a positive first lens group G1 disposed at a most object side, a negative second lens group G2 disposed at an image side of the first lens group G1 and a positive rear group GR disposed at an image side of the second lens group G2, upon varying magnification from an wide angle end state to a telephoto end state, the first lens group G1 being moved toward the object side, a distance between the first lens group G1 and the second lens group G2 and a distance between the second lens group G2 and the rear group GR being varied, and the rear group GR comprising a focusing group that is moved upon focusing, an A group having positive refractive power and a B group satisfying a given conditional expression with respect to the A group and having negative refractive power. Thus, the variable magnification optical system has excellent optical performance and the focusing group reduced in weight in order to attain high speed focusing operation.

24 Claims, 36 Drawing Sheets

(51) Int. Cl.
*G02B 13/00* (2006.01)
*G02B 27/64* (2006.01)

(56) References Cited

U.S. PATENT DOCUMENTS

| 2015/0055221 A1 | 2/2015 | Yokoi |
| 2016/0077316 A1 | 3/2016 | Yamamoto et al. |

FOREIGN PATENT DOCUMENTS

| JP | H04-293007 A | 10/1992 |
| JP | H06-289298 A | 10/1994 |
| JP | 2011-090186 A | 5/2011 |
| JP | 2012-212087 A | 11/2012 |
| WO | WO 2013/146758 A1 | 10/2013 |
| WO | WO 2014-192750 A1 | 12/2014 |
| WO | WO 2016/104771 A1 | 6/2016 |
| WO | WO 2016/104793 A1 | 6/2016 |

OTHER PUBLICATIONS

International Search Report from International Patent Application No. PCT/JP2016/077472, dated Dec. 20, 2016.
Office Action dated Mar. 23, 2020 in Chinese Patent Application No. 201680060991.X.

\* cited by examiner

COMA ABERRATION

COMA ABERRATION

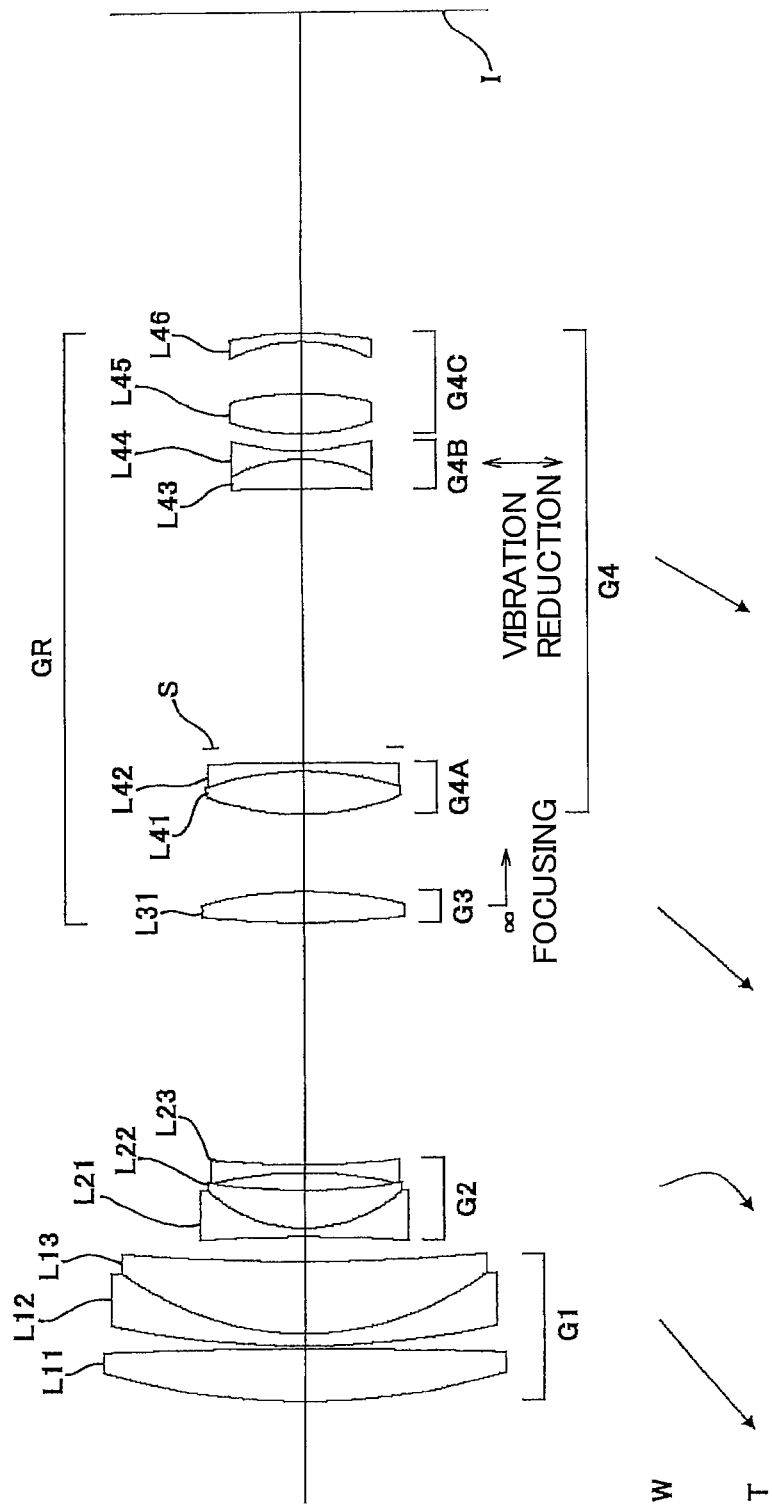

COMA ABERRATION

COMA ABERRATION

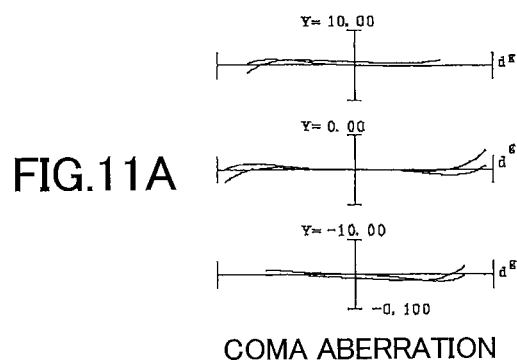
FIG.11A COMA ABERRATION
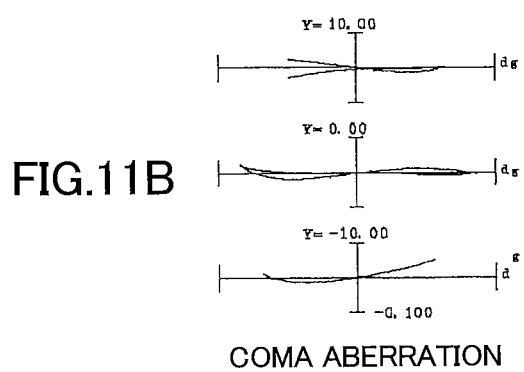
FIG.11B COMA ABERRATION

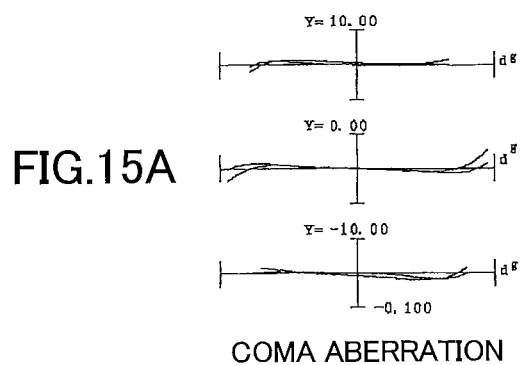
FIG.15A COMA ABERRATION
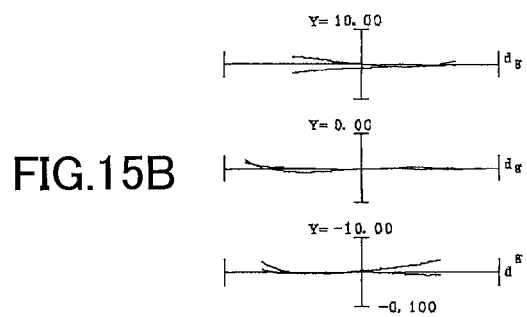
FIG.15B COMA ABERRATION

COMA ABERRATION

COMA ABERRATION

COMA ABERRATION

COMA ABERRATION

COMA ABERRATION

COMA ABERRATION

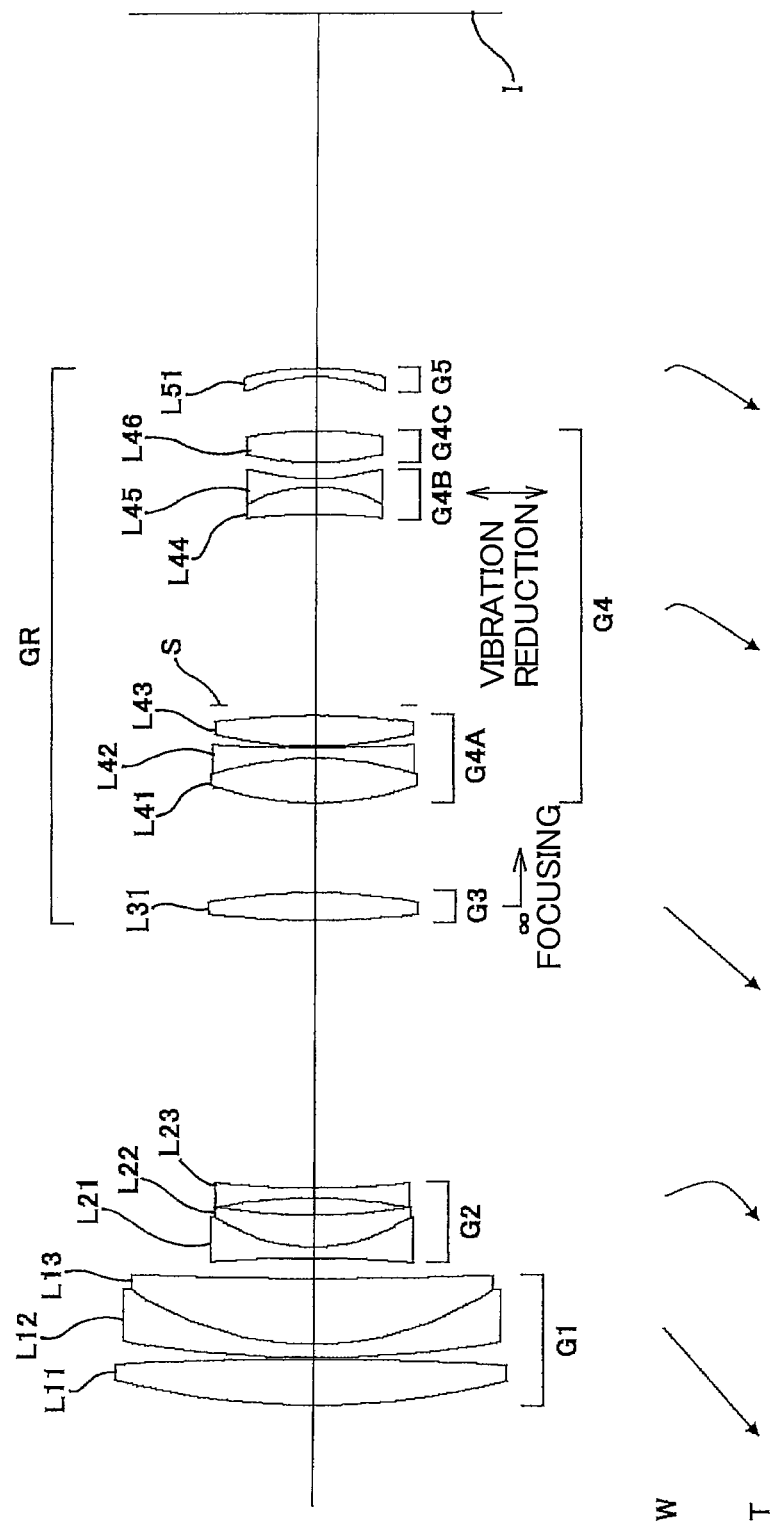

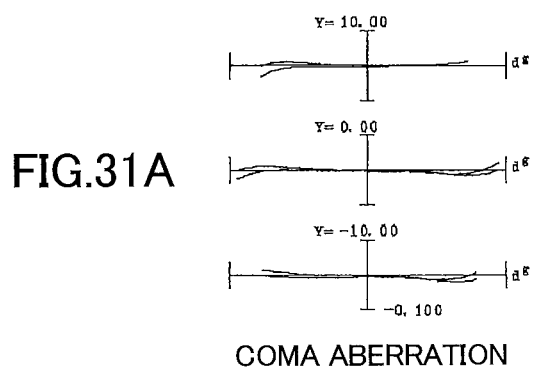
FIG.31A COMA ABERRATION
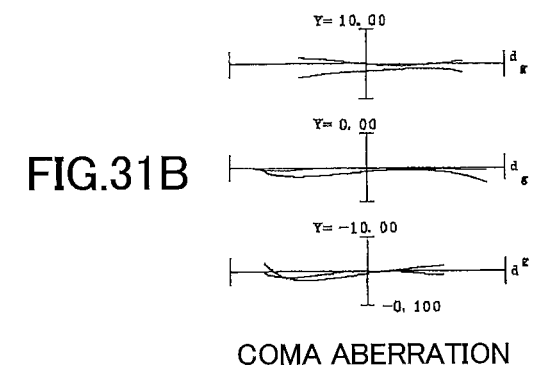
FIG.31B COMA ABERRATION

VARIABLE MAGNIFICATION OPTICAL SYSTEM, OPTICAL APPARATUS, IMAGING APPARATUS AND METHOD FOR MANUFACTURING VARIABLE MAGNIFICATION OPTICAL SYSTEM

TECHNICAL FIELD

The present invention relates to a variable magnification optical system, an optical apparatus, an imaging apparatus and a method for manufacturing the variable magnification optical system.

BACKGROUND ART

There has been proposed a variable magnification optical system that is suitable to be used for a photographic camera, an electronic still camera, a video camera and the like. For example, please refer to a Japanese Patent application Laid-Open Gazette No. H4-293007. However, a variable magnification optical system as disclosed in the Japanese Patent application Laid-Open Gazette No. H4-293007 is not intended to reduce a focusing group in weight sufficiently and is not suitable for attain high speed focusing operation.

PRIOR ART REFERENCE

Patent Document

Patent Document 1: Japanese Patent application Laid-Open Gazette No. H4-293007.

SUMMARY OF THE INVENTION

According to a first aspect of the present invention, there is provided a variable magnification optical system comprising a first lens group disposed at a most object side and having positive refractive power, a second lens group disposed at an image side of the first lens group and having negative refractive power, and a rear group disposed at an image side of the second lens group and having positive refractive power;

upon varying magnification from an wide angle end state to a telephoto end state, the first lens group being moved toward the object side, a distance between the first lens group and the second lens group and a distance between the second lens group and the rear group being varied; and the rear group comprising a focusing group moving upon focusing, an A group having positive refractive power, and a B group satisfying the following conditional expression with respect to the A group and having negative refractive power:

$$0.11 < Dvrw/TLw < 0.25$$

where Dvrw denotes a distance from the A group to the B group in the wide angle end state, and TLw denotes a whole length of the variable magnification optical system in the wide angle end state.

Further, according to a second aspect of the present invention, there is provided a method for manufacturing a variable magnification optical system comprising a step of arranging a first lens group disposed at a most object side and having positive refractive power, a second lens group disposed at an image side of the first lens group and having negative refractive power, and a rear group disposed at an image side of the second lens group and having positive refractive power such that, upon varying magnification from an wide angle end state to a telephoto end state, the first lens group is moved toward the object side, a distance between the first lens group and the second lens group and a distance between the second lens group and the rear group are varied;

arranging the rear group to be composed of a focusing group that is moved upon focusing, an A group having positive refractive power and a B group satisfying the following conditional expression with respect to the A group and having negative refractive power:

$$0.11 < Dvrw/TLw < 0.25$$

where Dvrw denotes a distance from the A group to the B group in the wide angle end state, and TLw denotes a whole length of the variable magnification optical system in the wide angle end state.

Further, according to a third aspect of the present invention, there is provided a method for manufacturing a variable magnification optical system comprising a step of arranging a first lens group disposed at a most object side and having positive refractive power, a second lens group disposed at an image side of the first lens group and having negative refractive power, and a rear group disposed at an image side of the second lens group and having positive refractive power, such that, upon varying magnification from an wide angle end state to a telephoto end state, the first lens group is moved toward the object side, a distance between the first lens group and the second lens group and a distance between the second lens group and the rear group are varied;

the first lens group comprising at least one negative lens that satisfies the following conditional expression:

$$nN < 1.70$$

where nN denotes refractive index at d-line (wavelength 587.6 nm) of the negative lens in the first lens group; and the rear group being composed of a focusing group that is moved upon focusing, an A group having positive refractive power and a B group satisfying the following conditional expression with respect to the A group and having negative refractive power:

$$0.11 < Dvrw/TLw < 0.25$$

where Dvrw denotes a distance from the A group to the B group in the wide angle end state, and TLw denotes a whole length of the variable magnification optical system in the wide angle end state.

Further, according to a fourth aspect of the present invention, there is provided a method for manufacturing a variable magnification optical system comprising step of arranging a first lens group disposed at a most object side and having positive refractive power, a second lens group disposed at an image side of the first lens group and having negative refractive power, and a rear group disposed at an image side of the second lens group and having positive refractive power, such that, upon varying magnification from an wide angle end state to a telephoto end state, the first lens group is moved toward the object side, a distance between the first lens group and the second lens group and a distance between the second lens group and the rear group are varied;

arranging the rear group to be composed of a focusing group that is moved upon focusing, an A group having positive refractive power and a B group satisfying the following conditional expression with respect to the A group and having negative refractive power:

$$0.11 < Dvrw/TLw < 0.25$$

where Dvrw denotes a distance from the A group to the B group in the wide angle end state, and TLw denotes a whole length of the variable magnification optical system in the telephoto end state; and arranging an aperture stop at an image side of the focusing group.

Further, according to a fifth aspect of the present invention, there is provided a variable magnification optical system comprising a first lens group disposed at a most object side and having positive refractive power, a second lens group disposed at an image side of the first lens group and having negative refractive power, and a rear group disposed at an image side of the second lens group and having positive refractive power;

upon varying magnification from an wide angle end state to a telephoto end state, the first lens group being moved toward the object side, a distance between the first lens group and the second lens group and a distance between the second lens group and the rear group being varied;

the rear group comprising a focusing group which is moved upon focusing;

the first lens group comprising at least one negative lens; and the following conditional expression being satisfied:

$$nN<1.70$$

where nN denotes refractive index at d-line (wavelength 587.6 nm) of the negative lens in the first lens group.

Further, according to a sixth aspect of the present invention, there is provided a variable magnification optical system comprising a first lens group disposed at a most object side and having positive refractive power, a second lens group disposed at an image side of the first lens group and having negative refractive power, and a rear group disposed at an image side of the second lens group and having positive refractive power;

upon varying magnification from an wide angle end state to a telephoto end state, the first lens group being moved toward the object side, a distance between the first lens group and the second lens group and a distance between the second lens group and the rear group being varied;

the rear group comprising a focusing group that is moved upon focusing; and an aperture stop being disposed at an image side of the focusing group.

BRIEF DESCRIPTION OF THE DRAWINGS

FIG. 5 is a sectional view of a variable magnification optical system according to a Second Example.

FIGS. 11A and 11B are graphs showing meridional transverse aberrations of the variable magnification optical system according to the Third Example.

FIGS. 15A and 15B are graphs showing meridional transverse aberrations of the variable magnification optical system according to the Fourth Example.

FIG. 29 is a sectional view of a variable magnification optical system according to an Eighth Example.

FIGS. 31A and 31B are graphs showing meridional transverse aberrations of the variable magnification optical system according to the Eighth Example.

EMBODIMENTS FOR CARRYING OUT THE INVENTION

Figure 1:
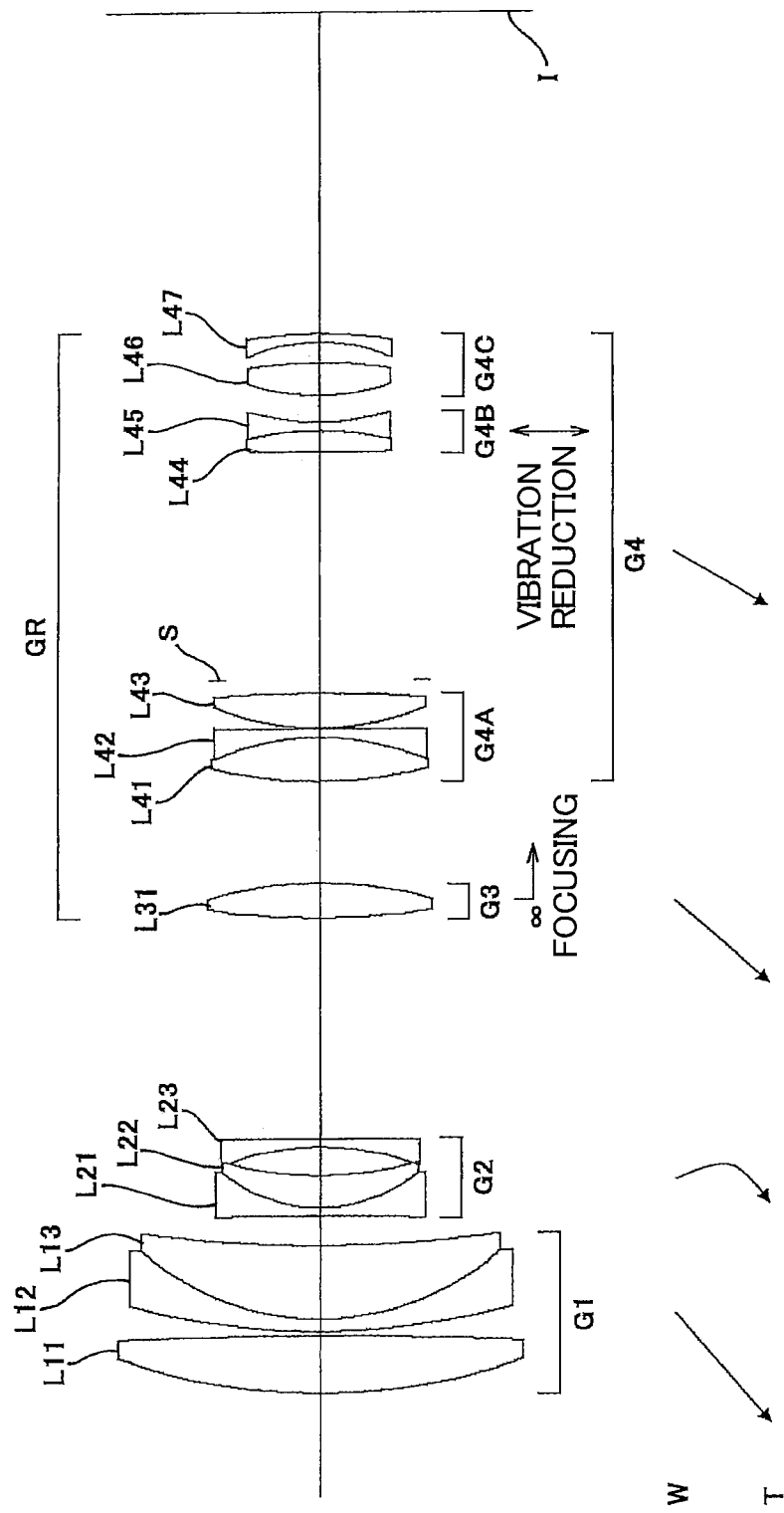
FIG. 1 is a sectional view of a variable magnification optical system according to a First Example.

Next, a variable magnification optical system according to the first embodiment of the present invention, an optical apparatus, an imaging apparatus and a method for manufacturing the variable magnification optical system, will be explained.

The variable magnification optical system according to the present embodiment comprises a first lens group disposed at a most object side and having positive refractive power, a second lens group disposed at an image side of the first lens group and having negative refractive power, and a rear group disposed at an image side of the second lens group and having positive refractive power;

upon varying magnification from an wide angle end state to a telephoto end state, the first lens group being moved toward the object side, a distance between the first lens group and the second lens group and a distance between the second lens group and the rear group being varied; and the rear group comprising a focusing group moving upon focusing, an A group having positive refractive power, and a B group satisfying the following conditional expression with respect to the A group and having negative refractive power:

$$0.11 < Dvrw/TLw < 0.25 \tag{1}$$

where Dvrw denotes a distance from the A group to the B group in the wide angle end state, and TLw denotes a whole length of the variable magnification optical system in the wide angle end state.

Further, in the variable magnification optical system according to the present embodiment, it is desirable that the B group is disposed to be movable to have a displacement component in a direction perpendicular to the optical axis.

Further, in the variable magnification optical system according to the present embodiment, it is desirable that, in the rear group, a distance between the A group and the B group is largest.

The rear group of the present embodiment comprises one or more lens groups. Meanwhile, in the present embodiment, lens group is intended to mean a portion comprising at least one lens separated by an air space which varies upon varying magnification. Further, a distance between the lenses in the lens group in the present embodiment is defined not to be varied upon varying magnification, but can be altered suitably.

In the variable magnification optical system according to the present embodiment, as described above, there are three or more lens groups, and upon varying magnification from a wide angle end state to a telephoto end state, the first lens group is moved toward the object side. With such a configuration, it is possible to reduce the entire length in the wide angle end state of the variable magnification optical system according to the present embodiment, so that it is possible to downsize the variable magnification optical system according to the present embodiment.

Further, in the variable magnification optical system according to the present embodiment, distances between the lens groups vary upon varying magnification, and with such a configuration it is possible to correct superbly various aberrations upon varying magnification.

Further, in the variable magnification optical system according to the present embodiment, as describe above, the focusing group is composed of one lens component or two lens components. For this configuration, the focusing lens group can be small-sized and reduce in weight. Meanwhile, lens component in the present embodiment means a single lens or a cemented lens. Further, in the present embodiment, focusing group means a portion comprising at least one lens separated by an air space that varies upon focusing.

Further, in the variable magnification optical system according to the present embodiment, the vibration reduction group in the rear group is moved to have a component in a direction perpendicular to the optical axis. With taking such a configuration, it is possible to correct displacement of an imaging position caused by a camera shake, in other words, vibration reduction can be carried out. Furthermore, it is possible to downsize the vibration reducing group and in addition it is possible to prevent effectively deterioration in optical performance at the time of carrying out vibration reduction. Meanwhile, vibration reduction group is a portion that is moved to have a component in a direction perpendicular to the optical axis at the time of carrying out vibration reduction.

The conditional expression (1) defines a ratio of a distance along the optical axis from the vibration reduction group to a lens at an object side thereof and adjacent thereto in the wide angle end state, to a whole length of the variable magnification optical system in the wide angle end state, that is, a distance along the optical axis from a most object side lens surface of the variable magnification optical system according to the present embodiment to the image plane. The variable magnification optical system according to the present embodiment can suppress coma aberration and other various aberrations effectively by satisfying the conditional expression (1).

When the value of Dvrw/TLw is equal to or exceeds the upper limit of the conditional expression (1), the entire length of the variable magnification optical system according to the present embodiment in the wide angle end state becomes small, and it becomes difficult to correct coma aberration and other various aberrations. Meanwhile, in order to ensure the advantageous effect of the present embodiment, it is preferable to set the upper limit value of the conditional expression (1) to 0.23. Furthermore, in order to ensure the advantageous effect of the present embodiment more surely, it is preferable to set the upper limit value of the conditional expression (1) to 0.21.

On the other hand, when the value of Dvrw/TLw is equal to or falls below the lower limit of the conditional expression (1), the distance along the optical axis from the vibration reduction group to the lens at the object side thereof and adjacent thereto in the wide angle end state becomes small. For this reason, it becomes difficult to correct coma aberration and other various aberrations. Moreover, the vibration reduction group becomes large and a lens barrel receiving the variable magnification optical system according to the present embodiment becomes large. This is not desirable. Meanwhile, in order to ensure the advantageous effect of the present embodiment, it is preferable to set the lower limit value of the conditional expression (1) to 0.12. Furthermore, in order to ensure the advantageous effect of the present embodiment more surely, it is preferable to set the lower limit value of the conditional expression (1) to 0.13.

Incidentally, in the variable magnification optical system according to the present embodiment, it is preferable that the focal length in the wide angle end state is in the range of 50 to 100 mm. Further, in the variable magnification optical system according to the present embodiment, it is more preferable that the focal length in the wide angle end state is in the range of 50 to 80 mm. Furthermore, in the variable magnification optical system according to the present embodiment, it is more preferable that the focal length in the wide angle end state is in the range of 50 to 75 mm.

With configurations as described above, it is possible to realize a variable magnification optical system having an excellent optical performance and a focusing lens group which is light in weight and can attain high speed focusing operation.

Further, in the variable magnification optical system according to the present embodiment, it is preferable that the rear group comprises, in order from the object side, a third lens group having positive refractive power and a fourth lens group having positive refractive power. With this configuration, it is possible to correct effectively curvature of field and other various aberrations.

Further, in the variable magnification optical system according to the present embodiment, it is desirable that the following conditional expression (2) is satisfied:

$$1.50 < f1/f3 < 2.35 \tag{2}$$

where f1 denotes a focal length of the first lens group, and f3 denotes a focal length of the third lens group.

The conditional expression (2) defines a ratio of the focal length of the first lens group to the focal length of the third lens group. By satisfying the conditional expression (2), it is possible to suppress variations in spherical aberration and other aberrations upon focusing from an infinitely distant object to a close distance object.

When the value of f1/f3 is equal to or exceeds the upper limit value of the conditional expression (2), refractive power of the third lens group becomes large, and it becomes difficult to correct spherical aberration and other various aberrations upon focusing from an infinitely distant object to a close distance object. Meanwhile, in order to ensure the advantageous effect of the present embodiment, it is preferable to set the upper limit value of the conditional expression (2) to 2.30. Further, in order to ensure the advantageous effect of the present embodiment more surely, it is preferable to set the upper limit value of the conditional expression (2) to 2.25.

On the other hand, when the value of f1/f3 is equal to or falls below the lower limit of the conditional expression (2), refractive power of the first lens group becomes large, and it becomes difficult to correct spherical aberration and other various aberrations. Meanwhile, in order to ensure the advantageous effect of the present embodiment, it is preferable to set the lower limit value of the conditional expression (2) to 1.60. Further, in order to ensure the advantageous effect of the present embodiment more surely, it is preferable to set the lower limit value of the conditional expression (2) to 1.70.

Further, in the variable magnification optical system according to the present embodiment, it is desirable that a distance between the third lens group and the fourth lens group is increased upon varying magnification from the wide angle end state to the telephoto end state. With such a configuration, it is possible to correct superbly various aberrations upon varying magnification. In particular, it is possible to secure sufficiently a space in which the focusing group is moved for focusing in the telephoto end state, and therefore it is possible to correct spherical aberration superbly at the time when a close distance object is focused in the telephoto end state.

Further, in the variable magnification optical system according to the present embodiment, it is desirable that the following conditional expression (3) is satisfied:

$$0.25 < f3/f4 < 1.10 \tag{3}$$

where f3 denotes a focal length of the third lens group, and f4 denotes a focal length of the fourth lens group.

The conditional expression (3) defines a ratio of the focal length of the third lens group to the focal length of the fourth lens group. By satisfying the conditional expression (3), it is possible to suppress variation in spherical aberration and other aberrations upon focusing from an infinitely distant object to a close distance object.

When the value of f3/f4 is equal to or exceeds the upper limit value of the conditional expression (3), refractive power of the fourth lens group becomes large, and it becomes difficult to correct coma aberration and other various aberrations. Meanwhile, in order to ensure the advantageous effect of the present embodiment, it is preferable to set the upper limit value of the conditional expression (3) to 1.05. Further, in order to ensure the advantageous effect of the present embodiment more surely, it is preferable to set the upper limit value of the conditional expression (3) to 1.00.

On the other hand, when the value of f3/f4 is equal to or falls below the lower limit of the conditional expression (3), refractive power of the third lens group becomes large, and it becomes difficult to correct spherical aberration and other various aberrations upon focusing from an infinitely distant object to a close distance object. Meanwhile, in order to ensure the advantageous effect of the present embodiment, it is preferable to set the lower limit value of the conditional expression (3) to 0.28. Further, in order to ensure the advantageous effect of the present embodiment more surely, it is preferable to set the lower limit value of the conditional expression (3) to 0.31.

Further, in the variable magnification optical system according to the present embodiment, it is preferable that the following conditional expression (4) is satisfied:

$$1.80 < f4/(-fvr) < 5.20 \tag{4}$$

where f4 denotes a focal length of the fourth lens group, and fvr denotes a focal length of the B group.

The conditional expression (4) defines a ratio of the focal length of the fourth lens group to the focal length of the B group. By satisfying the conditional expression (4), it is possible to suppress deterioration in optical performance upon carrying out vibration reduction.

When the value of f4/(−fvr) is equal to or exceeds the upper limit value of the conditional expression (4), refractive power of the B group becomes large, and deterioration of eccentric coma aberration upon carrying out vibration reduction becomes large. Meanwhile, in order to ensure the advantageous effect of the present embodiment, it is preferable to set the upper limit value of the conditional expression (4) to 5.00. Further, in order to ensure the advantageous effect of the present embodiment more surely, it is preferable to set the upper limit value of the conditional expression (4) to 4.90.

On the other hand, when the value of f4/(−fvr) is equal to or falls below the lower limit value of the conditional expression (4), refractive power of the fourth lens group becomes large, and it becomes difficult to correct coma aberration and other various aberrations. Further, refractive power of the B group becomes small, and an amount of movement of the vibration reduction group upon carrying out vibration reduction becomes large. For this reason, a lens barrel that receives the variable magnification optical system according to the present embodiment becomes large, so this is not desirable. Meanwhile, in order to ensure the advantageous effect of the present embodiment, it is preferable to set the lower limit value of the conditional expression (4) to 1.90. Further, in order to ensure the advantageous effect of the present embodiment more surely, it is preferable to set the lower limit value of the conditional expression (4) to 2.00.

Further, in the variable magnification optical system according to the present embodiment, it is desirable that the first lens group comprises at least two positive lenses. With this configuration, it is possible to correct effectively spherical aberration and chromatic aberration.

Further, in the variable magnification optical system according to the present embodiment, it is desirable that the third lens group is composed of one lens component. With this configuration, it is possible to make the focusing group more down-sized and reduced in weight.

Further, in the variable magnification optical system according to the present embodiment, it is desirable that the third lens group is composed of one single lens having positive refractive power. With this configuration, the focusing group can be made more reduced in weight.

Further, in the variable magnification optical system according to the present embodiment, it is desirable that the following conditional expression (5) is satisfied:

$$58.00 < vFP \qquad (5)$$

Where vFP denotes an Abbe number of the single lens composing the third lens group at d-line (wavelength 587.6 nm).

The conditional expression (5) defines an Abbe number of the single lens composing the third lens group. By satisfying the conditional expression (5), the variable magnification optical system according to the present embodiment can suppress variation in chromatic aberration upon focusing from an infinitely distant object to a close distance object.

When the value of vFP is equal to or falls below the lower limit of the conditional expression (5), generation of chromatic aberration in the third lens group upon focusing from an infinitely distant object to a close distance object becomes large, and variation in chromatic aberration upon focusing from the infinitely distant object to the close distance object becomes large. Meanwhile, in order to ensure the advantageous effect of the present embodiment, it is preferable to set the lower limit value of the conditional expression (5) to 59.00. Further, in order to ensure the advantageous effect of the present embodiment more surely, it is preferable to set the lower limit value of the conditional expression (5) to 60.00.

Further, in the variable magnification optical system according to the present embodiment, it is desirable that the first lens group comprises at least one negative lens, and the following conditional expression (6) is satisfied:

$$nN < 1.70 \qquad (6)$$

where nN denotes refractive index of the negative lens in the first lens group at d-line (wavelength 587.6 nm).

The conditional expression (6) defines refractive index of the negative lens in the first lens group. By satisfying the conditional expression (6), it is possible to correct superbly spherical aberration and coma aberration in the telephoto end state. Meanwhile, in a case where the first lens group comprises a plurality of negative lenses, it is enough that the most object side negative lens in the first lens group satisfies the conditional expression (6).

When the value of nN is equal to or exceeds the upper limit value of the conditional expression (6), negative refractive power in the first lens group becomes large, and it becomes difficult to correct superbly spherical aberration and coma aberration in the telephoto end state. Meanwhile, in order to ensure the advantageous effect of the present embodiment, it is preferable to set the upper limit value of the conditional expression (6) to 1.68. Further, in order to ensure the advantageous effect of the present embodiment more surely, it is preferable to set the upper limit value of the conditional expression (6) to 1.66.

Further, in the variable magnification optical system according to the present embodiment, it is desirable that the second lens group comprises at least one positive lens. With this configuration, chromatic aberration can be corrected superbly.

Further, in the variable magnification optical system according to the present embodiment, it is desirable that the following conditional expression (7) is satisfied:

$$1.40 < (R2+R1)/(R2-R1) < 3.50 \qquad (7)$$

where R1 denotes radius of curvature of an object side lens surface of the positive lens in the second lens group, and R2 denotes radius of curvature of an image side lens surface of the positive lens in the second lens group.

The conditional expression (7) defines a shape of the positive lens in the second lens group. By satisfying the conditional expression (7), it is possible to correct spherical aberration in the telephoto end state superbly. Meanwhile, in a case where the second lens group comprises a plurality of positive lenses, it is enough that the most object side positive lens in the second lens group satisfies the conditional expression (7).

When the value of (R2+R1)/(R2−R1) is equal to or exceeds the upper limit value of the conditional expression (7), positive refractive power in the second lens group becomes small, and it becomes difficult to correct spherical aberration in the telephoto end state. Meanwhile, in order to ensure the advantageous effect of the present embodiment, it is preferable to set the upper limit value of the conditional expression (7) to 3.20. Further, in order to ensure the advantageous effect of the present embodiment more surely, it is preferable to set the upper limit value of the conditional expression (7) to 3.00.

On the other hand, when the value of (R2+R1)/(R2−R1) is equal to or falls below the lower limit of the conditional expression (7), refractive power of the positive lens in the second lens group becomes large, and it becomes difficult to correct spherical aberration in the telephoto end state. Meanwhile, in order to ensure the advantageous effect of the present embodiment, it is preferable to set the lower limit value of the conditional expression (7) to 1.50. Further, in order to ensure the advantageous effect of the present embodiment more surely, it is preferable to set the lower limit value of the conditional expression (7) to 1.60.

Further, in the variable magnification optical system according to the present embodiment, it is desirable that an aperture stop is disposed at an image side of the focusing group. With such a configuration, it is possible to correct superbly various aberrations.

Further, in the variable magnification optical system according to the present embodiment, it is desirable that the following conditional expression (8) is satisfied:

$$0.20 < DSt/DRt < 0.60 \quad (8)$$

where DSt denotes a distance along the optical axis from a most object side lens surface in the rear group to the aperture stop in the telephoto end state, and DRt denotes a distance along the optical axis from the most object side lens surface to a most image side lens surface in the rear group in the telephoto end state.

The conditional expression (8) defines a ratio of the distance along the optical axis from the most object side lens surface in the rear group to the aperture stop in the telephoto end state and the distance along the optical axis from the most object side lens surface to the most image side lens surface in the rear group in the telephoto end state. By satisfying the conditional expression (8), it is not necessary to make the variable magnification optical system according to the present embodiment large in size, and it is possible to correct effectively coma aberration and various aberrations in the telephoto end state.

When the value of DSt/DRt is equal to or exceeds the upper limit value of the conditional expression (8), off axis light flux incident onto the first lens group in the telephoto end state, becomes distant from the optical axis. For this reason, diameter of the first lens group must be made large. This is not preferable. Meanwhile, in order to ensure the advantageous effect of the present embodiment, it is preferable to set the upper limit value of the conditional expression (8) to 0.55. Furthermore, in order to ensure the advantageous effect of the present embodiment more surely, it is preferable to set the lower limit value of the conditional expression (8) to 0.50.

On the other hand, when the value of DSt/DRt is equal to or falls below the lower limit value of the conditional expression (8), off-axis light flux that is incident onto a lens(s) located at the image side of the aperture stop in the telephoto end state, becomes far from the optical axis. Accordingly, it becomes difficult to correct coma aberration and other aberrations in the telephoto end state. Meanwhile, in order to ensure the advantageous effect of the present embodiment, it is preferable to set the lower limit value of the conditional expression (8) to 0.25. Furthermore, in order to ensure the advantageous effect of the present embodiment more surely, it is preferable to set the lower limit value of the conditional expression (8) to 0.30.

The optical apparatus of the first embodiment of the present invention is equipped with the variable magnification optical system having the above described configuration.

The imaging apparatus of the first embodiment of the present invention is equipped with the variable magnification optical system having the above described configuration and an imaging portion which captures an image formed through the variable magnification optical system.

Thus, it is possible to realize an optical apparatus whose focusing group is reduced in weight in order to attain high speed focusing operation, and an imaging apparatus therefor.

Further, a method for manufacturing a variable magnification optical system according to the first embodiment of the present invention comprises steps of arranging a first lens group disposed at a most object side and having positive refractive power, a second lens group disposed at an image side of the first lens group and having negative refractive power, and a rear group disposed at an image side of the second lens group and having positive refractive power, such that, upon varying magnification from an wide angle end state to a telephoto end state, the first lens group is moved toward the object side, and a distance between the first lens group and the second lens group and a distance between the second lens group and the rear group are varied; and arranging such that the rear group is composed of a focusing group moving upon focusing, an A group having positive refractive power, and a B group satisfying the following conditional expression (1) with respect to the A group and having negative refractive power:

$$0.11 < Dvrw/TLw < 0.25 \quad (1)$$

where Dvrw denotes a distance from the A group to the B group in the wide angle end state, and TLw denotes a whole length of the variable magnification optical system in the wide angle end state.

Thus, it is possible to manufacture a variable magnification optical apparatus which has an excellent optical performance and whose focusing group is reduced in weight in order to attain high speed focusing operation.

Further, it is desirable that a method for manufacturing a variable magnification optical system according to the first embodiment of the present invention comprises steps of arranging a first lens group disposed at a most object side and having positive refractive power, a second lens group disposed at an image side of the first lens group and having negative refractive power, and a rear group disposed at an image side of the second lens group and having positive refractive power, such that, upon varying magnification from the wide angle end state to the telephoto end state, the first lens group is moved toward the object side, and a distance between the first lens group and the second lens group and a distance between the second lens group and the rear group are varied; and arranging such that the first lens group comprises at least one negative lens and satisfies the following conditional expression (6):

$$nN < 1.70 \quad (6)$$

where nN denotes refractive index of the negative lens in the first lens group at d line (wavelength 587.6 nm), and arranging such that, the rear group comprises a focusing group moving upon focusing, an A group having positive refractive power, and a B group satisfying the following conditional expression (1) with respect to the A group and having negative refractive power:

$$0.11 < Dvrw/TLw < 0.25 \quad (1)$$

where Dvrw denotes a distance from the A group to the B group in the wide angle end state, and TLw denotes a whole length of the variable magnification optical system in the wide angle end state.

Thus, it is possible to manufacture a variable magnification optical system which has superb optical performance and whose focusing group is reduced in weight in order to attain high speed focusing operation.

Further, it is desirable that a method for manufacturing a variable magnification optical system according to the first embodiment of the present invention comprises steps of arranging a first lens group disposed at a most object side and having positive refractive power, a second lens group disposed at an image side of the first lens group and having negative refractive power, and a rear group disposed at an image side of the second lens group and having positive refractive power such that, upon varying magnification from the wide angle end state to the telephoto end state, the first lens group is moved toward the object side, and a distance between the first lens group and the second lens group and a distance between the second lens group and the rear group are varied; and arranging such that the rear group comprises a focusing group moving upon focusing, an A group having positive refractive power, and a B group satisfying the following conditional expression (1) with respect to the A group and having negative refractive power:

$$0.11 < Dvrw/TLw < 0.25 \quad (1)$$

where Dvrw denotes a distance from the A group to the B group in the wide angle end state, and TLw denotes a whole length of the variable magnification optical system in the wide angle end state; and arranging an aperture stop to be located at an image side of the focusing group.

Thus, it is possible to manufacture a variable magnification optical system which has superb optical performance and whose focusing group is reduced in weight in order to attain high speed focusing operation.

Next, a variable magnification optical system according to the second embodiment of the present invention, an optical apparatus, an imaging apparatus and a method for manufacturing the variable magnification optical system, will be explained.

The variable magnification optical system according to the present embodiment comprises a first lens group disposed at a most object side and having positive refractive power, a second lens group disposed at an image side of the first lens group and having negative refractive power, and a rear group disposed at an image side of the second lens group and having positive refractive power;

upon varying magnification from an wide angle end state to a telephoto end state, the first lens group being moved toward an object side, a distance between the first lens group and the second lens group and a distance between the second lens group and the rear group being varied;

the rear group comprising a focusing group that is moved for focusing;

the first lens group comprising at least one negative lens that satisfies the following conditional expression:

$$nN < 1.70 \quad (6)$$

where nN denotes refractive index at d-line (wavelength 587.6 nm) of the negative lens in the first lens group.

Further, it is desirable that the rear group comprises a focusing group which is disposed to be movable to have a displacement component in a direction perpendicular to the optical axis.

The rear group of the present embodiment comprises one or more lens groups. Meanwhile, in the present embodiment, lens group is intended to mean a portion comprising at least one lens separated by an air space which varies upon varying magnification. Further, a distance between the lenses in the lens group in the present embodiment is defined not to be varied upon varying magnification, but can be altered suitably.

In the variable magnification optical system according to the present embodiment, as described above, there are three or more lens groups, and upon varying magnification distances between the lens groups are varied. With this configuration, various aberrations are superbly corrected upon varying magnification.

In the variable magnification optical system according to the present embodiment, as described above, a portion located at a most object side position in the rear group is moved upon focusing. With this configuration, that portion, that is, the focusing group can be made small in size and light in weight.

In the variable magnification optical system according to the present embodiment, as described above, the vibration reduction group in the rear group is moved to have a component in a direction perpendicular to the optical axis. With this configuration, displacement of imaging position caused by a camera shake is corrected, in other words, vibration reduction can be carried out. Further, the vibration reduction group can be downsized, and it is possible to suppress effectively deterioration in optical performance at the time when vibration reduction is carried out. Meanwhile, vibration reduction group in the present embodiment means a portion that is moved to have a component in a direction perpendicular to the optical axis at the time when vibration reduction is carried out.

The conditional expression (6) defines refractive index of negative lens(es) in the first lens group. By satisfying the conditional expression (6), it is possible to correct superbly spherical aberration and coma aberration in the telephoto end state. Meanwhile, in a case where the first lens group comprises a plurality of negative lenses, it is enough that the most object side negative lens in the first lens group satisfies the conditional expression (6).

When the value of nN is equal to or exceeds the upper limit value of the conditional expression (6), negative refractive power in the first lens group becomes large, and it becomes difficult to correct superbly spherical aberration and coma aberration in the telephoto end state. Meanwhile, in order to ensure the advantageous effect of the present embodiment, it is preferable to set the upper limit value of the conditional expression (6) to 1.68. Further, in order to ensure the advantageous effect of the present embodiment more surely, it is preferable to set the upper limit value of the conditional expression (6) to 1.66.

With the above described configuration, it is possible to realize a variable magnification optical system that has excellent optical performance and has a focusing group which is reduced in weight in order to attain high speed focusing operation.

Further, in the variable magnification optical system according to the present embodiment, it is preferable that the second lens group comprises at least one positive lens. With this configuration, chromatic aberration can be corrected superbly.

Further, in the variable magnification optical system according to the present embodiment, it is preferable that the following conditional expression (7) is satisfied:

$$1.40 < (R2+R1)/(R2-R1) < 3.50 \quad (7)$$

where R1 denotes radius of curvature of an object side lens surface of the positive lens in the second lens group, and R2 denotes radius of curvature of an image side lens surface of the positive lens in the second lens group.

The conditional expression (7) defines a shape of positive lens(es) in the second lens group. By satisfying the conditional expression (7), it is possible to correct spherical aberration in the telephoto end state. Meanwhile, in a case where the second lens group comprises a plurality of positive lenses, it is enough that the most object side positive lens in the second lens group satisfies the conditional expression (7).

When the value of (R2+R1)/(R2−R1) is equal to or exceeds the upper limit value of the conditional expression (7), positive refractive power in the second lens group becomes small, and it becomes difficult to correct spherical aberration in the telephoto end state. Meanwhile, in order to ensure the advantageous effect of the present embodiment, it is preferable to set the upper limit value of the conditional expression (7) to 3.20. Further, in order to ensure the advantageous effect of the present embodiment more surely, it is preferable to set the upper limit value of the conditional expression (7) to 3.00.

On the other hand, when the value of (R2+R1)/(R2−R1) is equal to or falls below the lower limit of the conditional expression (7), refractive power of the positive lens in the second lens group becomes large, and it becomes difficult to correct spherical aberration in the telephoto end state. Meanwhile, in order to ensure the advantageous effect of the present embodiment, it is preferable to set the lower limit value of the conditional expression (7) to 1.50. Further, in order to ensure the advantageous effect of the present embodiment more surely, it is preferable to set the lower limit value of the conditional expression (7) to 1.60.

Next, a variable magnification optical system according to the third embodiment of the present invention, an optical apparatus, an imaging apparatus and a method for manufacturing the variable magnification optical system, will be explained.

The variable magnification optical system according to the present embodiment comprises a variable magnification optical system comprising a first lens group disposed at a most object side and having positive refractive power, a second lens group disposed at an image side of the first lens group and having negative refractive power, and a rear group disposed at an image side of the second lens group and having positive refractive power;

upon varying magnification from an wide angle end state to a telephoto end state, the first lens group being moved toward the object side, a distance between the first lens group and the second lens group and a distance between the second lens group and the rear group being varied; and the rear group comprises a focusing group that is moved upon focusing and an aperture stop disposed at an image side of the focusing group.

Further, in the variable magnification optical system according to the present embodiment, it is preferable that the rear group comprises the focusing group that is disposed to be movable to have a displacement component in a direction perpendicular to the optical axis.

The rear group of the present embodiment comprises one or more lens groups. Meanwhile, in the present embodiment, lens group is intended to mean a portion comprising at least one lens separated by an air space which varies upon varying magnification. Further, distance(s) between the lenses in the lens group in the present embodiment is (are) defined not to be varied upon varying magnification, but can be altered suitably.

Further, the variable magnification optical system according to the present embodiment, as described above, comprises three or more lens groups and distance(s) between lens groups is(are) varied upon varying magnification. With this configuration, it is possible to correct superbly various aberrations upon varying magnification.

Further, in the variable magnification optical system according to the present embodiment, as described above, the focusing group is composed of one or two lens components. For this configuration, the focusing group can be small-sized and reduced in weight. Meanwhile, lens component in the present embodiment means a single lens or a cemented lens. Further, in the present embodiment, focusing group means a portion comprising at least one lens separated by air space(s) that varies (vary) upon focusing.

Further, in the variable magnification optical system according to the present embodiment, the vibration reduction group in the rear group is moved to have a component in a direction perpendicular to the optical axis. With taking such a configuration, it is possible to correct displacement of an imaging position caused by a camera shake, in other words, vibration reduction can be carried out. Furthermore, it is possible to downsize the vibration reducing group and in addition it is possible to prevent effectively deterioration in optical performance at the time of carrying out vibration reduction. Meanwhile, vibration reduction group in the present embodiment is a portion that is moved to have a component in a direction perpendicular to the optical axis at the time of carrying out vibration reduction.

Further, the variable magnification optical system according to the present embodiment, as describe above, comprises the aperture stop at the image side of the focusing group. With this configuration, various aberrations can be corrected superbly.

By configuring as described above, it is possible to realize a variable magnification optical system which has excellent optical performance and which is reduced in weight in order to attain high speed focusing operation.

Further, in the variable magnification optical system according to the present embodiment, it is desirable that the following conditional expression (8) is satisfied:

$$0.20 < DSt/DRt < 0.60 \qquad (8)$$

where DSt denotes a distance along the optical axis from a most object side lens surface in the rear group to the aperture stop in the telephoto end state, and DRt denotes a distance along the optical axis from the most object side lens surface to a most image side lens surface in the rear group in the telephoto end state.

The conditional expression (8) defines a ratio of the distance along the optical axis from the most object side lens surface in the rear group to the aperture stop in the telephoto end state and the distance along the optical axis from the most object side lens surface to the most image side lens surface in the rear group in the telephoto end state. By satisfying the conditional expression (8), it is not necessary to make a lens barrel receiving the variable magnification optical system according to the present embodiment large in size, and it is possible to correct effectively coma aberration and various aberrations in the telephoto end state.

When the value of DSt/DRt is equal to or exceeds the upper limit of the conditional expression (8), off-axis light flux incident onto the first lens group in the telephoto end state, becomes distant from the optical axis. For this reason, diameter of the first lens group must be made large. This is not preferable. Meanwhile, in order to ensure the advantageous effect of the present embodiment, it is preferable to set the upper limit value of the conditional expression (8) to 0.55. Furthermore, in order to ensure the advantageous effect of the present embodiment more surely, it is preferable to set the lower limit value of the conditional expression (8) to 0.50.

On the other hand, when the value of DSt/DRt is equal to or falls below the lower limit of the conditional expression (8), off-axis light flux that is incident onto a lens(s) located at the image side of the aperture stop in the telephoto end state, becomes far from the optical axis. Accordingly, it becomes difficult to correct coma aberration and other various aberrations in the telephoto end state. Meanwhile, in order to ensure the advantageous effect of the present embodiment, it is preferable to set the lower limit value of the conditional expression (8) to 0.25. Furthermore, in order to ensure the advantageous effect of the present embodiment more surely, it is preferable to set the lower limit value of the conditional expression (8) to 0.30.

Next, a variable magnification optical system according to the first to the third embodiments of the present invention, will be explained with reference to the accompanying drawings. Meanwhile, the first to the eighth Examples are common to all of the first to the third embodiments.

First Example

FIG. 1 is a sectional view showing a variable magnification optical system according to the First Example that is common to the first to the third embodiments. Meanwhile, arrows shown in FIG. 1 and herein later described FIG. 5, FIG. 9, FIG. 13, FIG. 17, FIG. 21, FIG. 25 and FIG. 29, show moving trajectories of the respective lens groups upon varying magnification from the wide angle end state (W) to the telephoto end state (T).

The variable magnification optical system according to the First Example is composed of, in order from an object side, a first lens group G1 having positive refractive power, a second lens group G2 having negative refractive power and a rear group GR having positive refractive power. The rear group GR is composed of, in order from the object side, a third lens group G3 having positive refractive power and a fourth lens group G4 having positive refractive power.

The first lens group G1 consists of, in order from the object side, a double convex positive lens L11, a cemented lens constructed by a negative meniscus lens L12 having a convex surface facing the object side cemented with a positive meniscus lens L13 having a convex surface facing the object side.

The second lens group G2 consists of, in order from the object side, a cemented negative lens constructed by a double concave negative lens L21 cemented with a positive meniscus lens L22 having a convex surface facing the object side, and a double concave negative lens L23.

The third lens group G3 consists of a double convex positive lens L31.

The fourth lens group G4 consists of, in order from the object side, an A group G4A having positive refractive power, a B group G4B having negative refractive power, and a C group G4C having positive refractive power. Meanwhile, an aperture stop S is disposed between the A group G4A and the B group G4B.

The A group G4A consists of, in order from the object side, a cemented positive lens constructed by a double convex positive lens L41 cemented with a double concave negative lens L42, and a double convex positive lens L43.

The B group G4B consists of, in order from the object side, a cemented negative lens constructed by a double convex positive lens L44 cemented with a double concave negative lens L45.

The C group G4C consists of, in order from the object side, a double convex positive lens L46 and a double concave negative lens L47 having a concave surface facing the object side.

In the variable magnification optical system according to the First Example, upon varying magnification between the wide-angle end state and the telephoto end state, the first to the fourth lens groups G1 to G4 are moved along the optical axis such that a distance between the first lens group G1 and the second lens group G2, a distance between the second lens group G2 and the third lens group G3 and a distance between the third lens group G3 and the fourth lens group G4 are varied.

In the variable magnification optical system according to the First Example, focusing from an infinitely distant object to a close distance object is carried out by moving the third lens group G3 along the optical axis as the focusing group.

In the variable magnification optical system according to the First Example, vibration reduction is carried out by moving the B group G4B as the vibration group to have a component in the direction perpendicular to the optical axis. Meanwhile, upon carrying out vibration reduction, the A group G4A and the C group G4C are fixed at the respective positions in the direction perpendicular to the optical axis.

It is noted here that in a lens having a focal length of f, a vibration reduction coefficient K, which is a ratio of a moving amount of an image on the image plane I to a moving amount of the vibration reduction group carrying out vibration reduction, in order to correct rotational camera shake of an angle θ, the vibration reduction group for correcting the camera shake may be moved by the amount of (f·tan δ)/K perpendicularly to the optical axis.

Accordingly, in the variable magnification optical system according to the First Example, the vibration reduction coefficient K is 1.06 and the focal length is 71.40 (mm) in the wide-angle end state, so that the moving amount of the B group G4B for correcting a rotational camera shake of 0.30 degrees is 0.35 (mm). In the telephoto end state, the vibration reduction coefficient K is 1.86, and the focal length is 294.00 (mm), so that the moving amount of the B lens group G4B for correcting a rotational camera shake of 0.20 degrees is 0.55 (mm).

Table 1 below shows various values of the variable magnification optical system according to the First Example.

In table 1, "f" denotes a focal length and "Bf" denotes a back focal length (that is, a distance along the optical axis between the most image side lens surface and the image plane I).

In [Surface Data], surface number shows the optical surface number counted in order from the object side, "r" shows a radius of curvature, "d" shows a surface to surface distance (that is, a distance between the n-th surface and the (n+1)-th surface where n is an integer), "nd" shows refractive index of the material at d-line (wavelength 587.6 nm), and "vd" shows Abbe number of the material at d-line (wavelength 587.6 nm). Further, "Object surface" denotes a surface of an object, "variable" denotes a variable surface to surface distance and "Image Plane" is the image plane I. Meanwhile, "r=∞" denotes a plane surface. Refractive index of the air nd=1.000000 is omitted.

In [Various Data], FNO denotes an f-number, "2ω" denotes an angle of view (unit "°"), Y max denotes a maximum image height, TL denotes a total length of the variable magnification optical system, that is, a distance along the optical axis from the first surface to the image plane I, "dn" denotes a variable distance between an n-th surface and an (n+1)-th surface. Meanwhile, "W" denotes a wide-angle end state, "M" denotes an intermediate focal length state, and "T" denotes a telephoto end state.

In [Lens Group Data], a starting surface number ST and focal length of each lens group are shown.

In [Values for Conditional Expressions], values corresponding to respective conditional expressions are shown.

It is noted, here, that "mm" is generally used for the unit of length such as the focal length f, the radius of curvature r and the unit for other lengths shown in Table 1. However, since similar optical performance can be obtained by an optical system proportionally enlarged or reduced its dimension, the unit is not necessarily to be limited to "mm".

The explanation of reference symbols in Table 1 described above, is the same in Tables for the other Examples.

TABLE 1

First Example

[Surface Data]

| Surface number | r | d | nd | vd |
|---|---|---|---|---|
| Object surface | ∞ | | | |
| 1 | 72.3688 | 6.972 | 1.51680 | 63.88 |
| 2 | −604.5951 | 0.499 | | |
| 3 | 88.4675 | 1.500 | 1.62004 | 36.40 |
| 4 | 32.5526 | 8.844 | 1.51680 | 63.88 |
| 5 | 149.4554 | variable | | |
| 6 | −453.8182 | 1.000 | 1.69680 | 55.52 |
| 7 | 18.7304 | 3.761 | 1.80518 | 25.45 |
| 8 | 40.0562 | 3.501 | | |
| 9 | −33.7169 | 1.000 | 1.69680 | 55.52 |
| 10 | 3769.5898 | variable | | |
| 11 | 91.7620 | 4.268 | 1.51680 | 63.88 |
| 12 | −46.5887 | variable | | |
| 13 | 54.6217 | 5.361 | 1.48749 | 70.31 |
| 14 | −31.8367 | 1.000 | 1.85026 | 32.35 |
| 15 | 829.9126 | 0.200 | | |
| 16 | 34.8197 | 4.124 | 1.48749 | 70.31 |
| 17 | −190.4880 | 1.633 | | |
| 18 (Stop S) | ∞ | 27.478 | | |
| 19 | 316.7035 | 2.575 | 1.80518 | 25.45 |
| 20 | −37.0122 | 1.000 | 1.74400 | 44.81 |
| 21 | 28.1012 | 3.267 | | |
| 22 | 27.6380 | 3.921 | 1.54814 | 45.79 |
| 23 | −54.2282 | 2.418 | | |
| 24 | −22.4640 | 1.000 | 1.77250 | 49.62 |
| 25 | −55.2971 | BF | | |
| Image plane | ∞ | | | |

[Various Data]
variable magnification ratio 4.12

| | W | M | T |
|---|---|---|---|
| f | 71.4 | 105.0 | 294.0 |
| FNO | 4.17 | 4.18 | 6.38 |
| 2ω | 22.84 | 15.30 | 5.48 |
| Ymax | 14.25 | 14.25 | 14.25 |
| TL | 166.32 | 183.64 | 219.32 |
| BF | 38.52 | 38.53 | 73.71 |
| Infinitely distant | | | |
| d5 | 3.555 | 24.790 | 43.361 |
| d10 | 26.610 | 21.614 | 2.000 |
| d12 | 12.316 | 13.381 | 14.933 |
| Close distance | | | |
| d5 | 3.555 | 24.790 | 43.361 |
| d10 | 27.368 | 22.723 | 3.114 |
| d12 | 11.558 | 12.271 | 13.819 |

[Lens Group Data]

| Group | Starting surface | f |
|---|---|---|
| 1 | 1 | 115.478 |
| 2 | 6 | −26.653 |
| 3 | 11 | 60.427 |
| 4 | 13 | 138.481 |

[Values for Conditional Expression]

(1) Dvrw/TLw = 0.175
(2) f1/f3 = 1.911
(3) f3/f4 = 0.436
(4) f4/(−fvr) = 3.064
(5) vFP = 63.88
(6) nN = 1.620
(7) (R2 + R1)/(R2 − R1) = 2.757
(8) DSt/DRt = 0.431

Figure 2A:
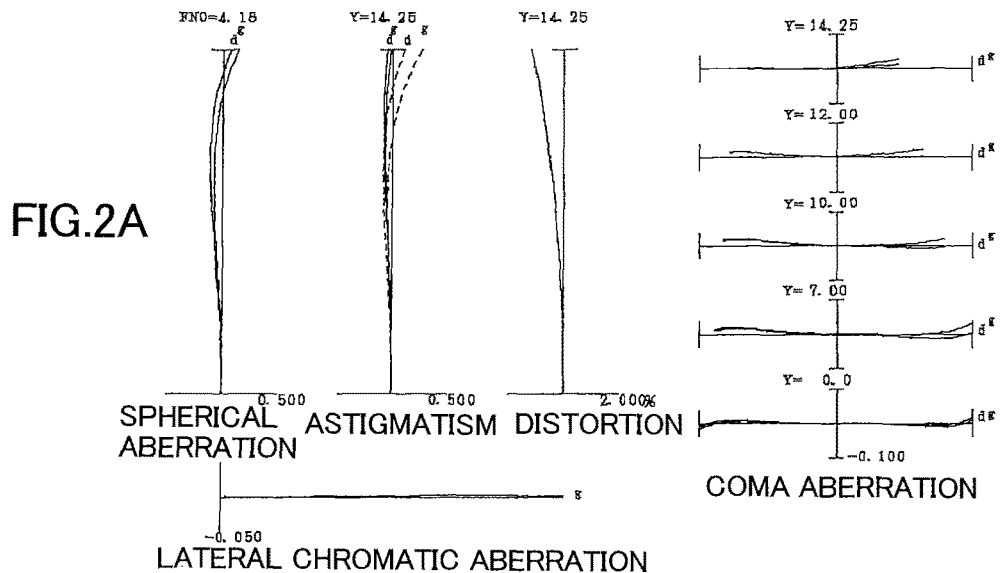
FIGS. 2A, 2B and 2C are graphs showing various aberrations of the variable magnification optical system according to the First Example.
Figure 2B:
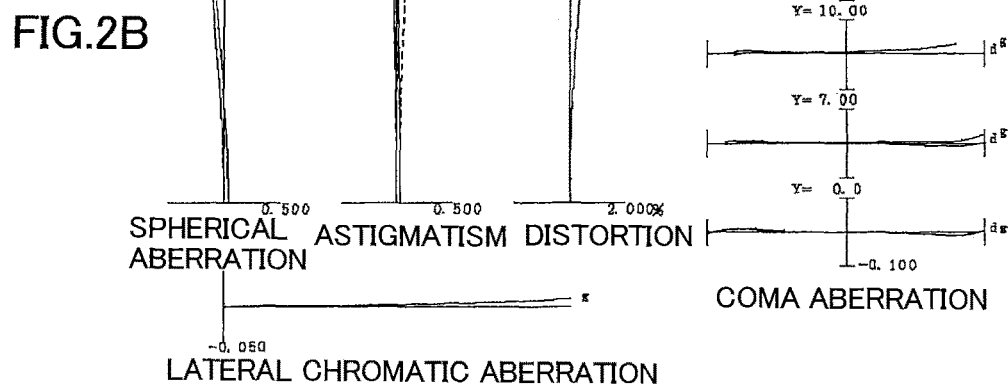
Figure 2C:
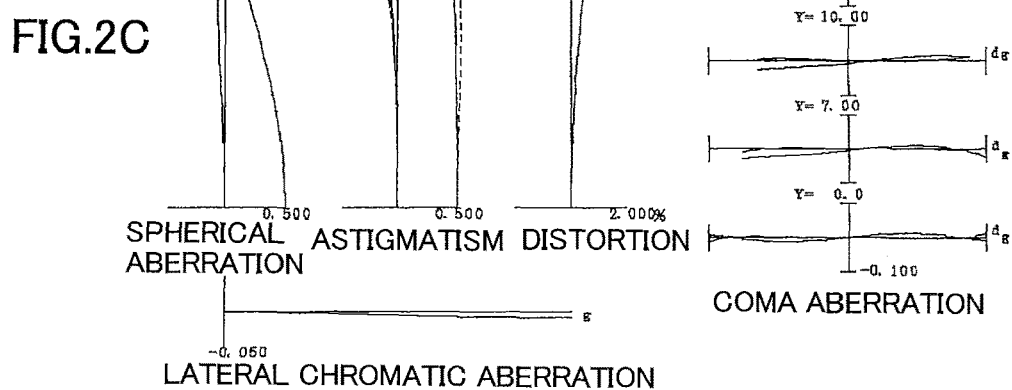

FIGS. 2A, 2B and 2C are graphs showing various aberrations of the variable magnification optical system according to the First Example upon focusing on an infinitely distant object, in which FIG. 2A is in a wide-angle end state, FIG. 2B is in an intermediate focal length state, and FIG. 2C is in a telephoto end state.

Figure 3A:
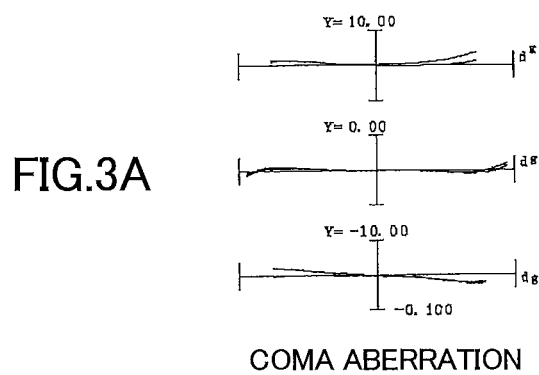
FIGS. 3A and 3B are graphs showing meridional transverse aberrations of the variable magnification optical system according to the First Example.
Figure 3B:
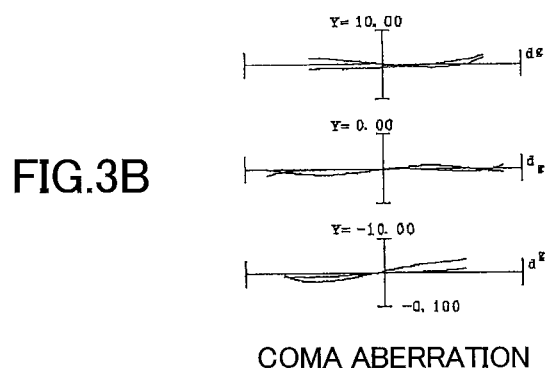

FIGS. 3A and 3B are graphs showing meridional transverse aberration of the variable magnification optical system according to the First Example, in which FIG. 3A is upon focusing on an infinitely distant object with carrying out vibration reduction for a rotation camera shake of 0.30 degrees in the wide-angle end state, FIG. 3B is upon focusing on an infinitely distant object with carrying out vibration reduction for a rotation camera shake of 0.20 degrees in the telephoto end state.

Figure 4A:
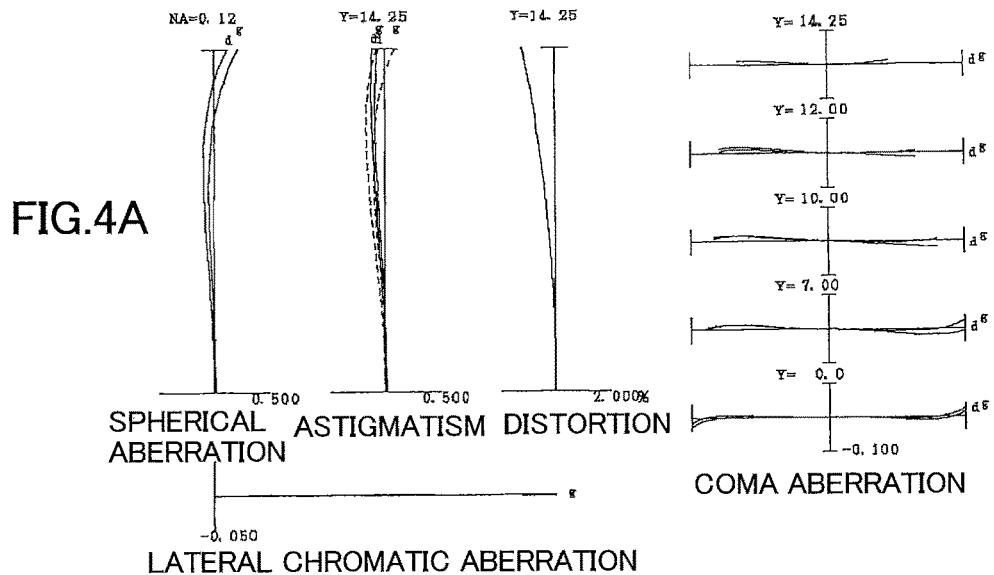
FIGS. 4A, 4B and 4C are graphs showing various aberrations of the variable magnification optical system according to the First Example.
Figure 4B:
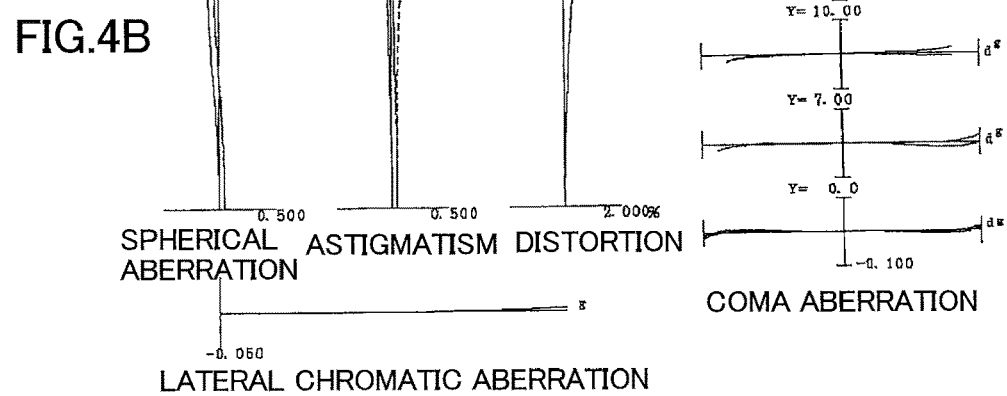
Figure 4C:
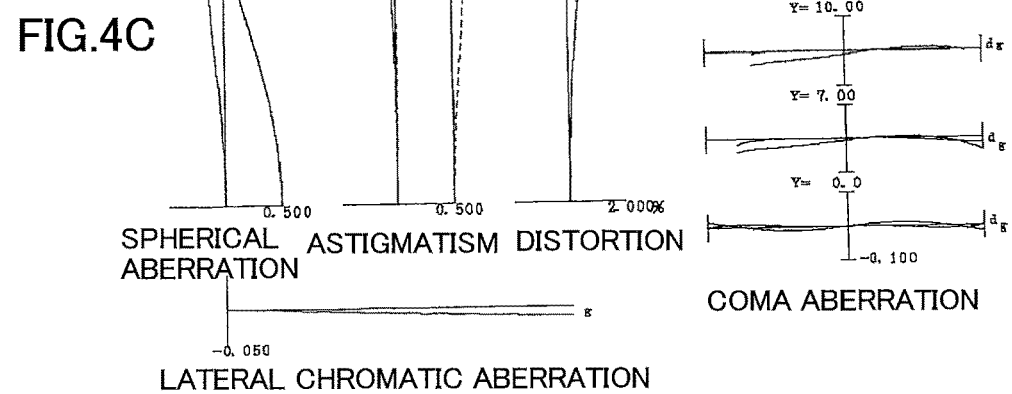

FIGS. 4A, 4B and 4C are graphs showing various aberrations of the variable magnification optical system according to the First Example upon focusing on close distance object, in which FIG. 4A is in the wide-angle end state, FIG. 4B is in the intermediate focal length state, and FIG. 4C is in the telephoto end state.

In respective graphs showing aberrations, FNO denotes an f-number, Y denotes an image height, and NA denotes a numerical aperture. In more detail, in graphs showing spherical aberrations values of the f-number FNO or the numerical aperture NA corresponding to the maximum aperture diameter are shown. In graphs showing astigmatism and distortion, the maximum values of the image height Y are respectively shown. In graphs showing coma aberrations, value of the each image height is shown. In the graphs of the respective aberrations, "d" denotes an aberration curve at d-line (wavelength 587.6 nm), and "g" denotes an aberration curve at g-line (wavelength 435.8 nm). In the graph showing astigmatism, a solid line indicates a sagittal image plane, and a broken line indicates a meridional image plane. In graphs showing coma aberration, coma aberration at each image height Y is shown.

Incidentally, the above-described explanation regarding various aberration graphs is the same as the other Examples.

As is apparent from the respective graphs showing aberrations, the variable magnification optical system according to the First Example shows superb imaging performance as a result of good corrections to various aberrations in the wide-angle end state to the telephoto end state, and also shows superb imaging performance upon carrying out vibration reduction as well as focusing on a close distance object.

Second Example

FIG. 5 is a sectional view showing a configuration of a variable magnification optical system according to the Second Example that is common to the first to third embodiments of the present application.

The variable magnification optical system according to the Second Example is composed of, in order from an object side: a first lens group G1 having positive refractive power, a second lens group G2 having negative refractive power and a rear group GR having positive refractive power. The rear group GR is composed of, in order from the object side, a third lens group G3 having positive refractive power and a fourth lens group G4 having positive refractive power.

The first lens group G1 consists of, in order from the object side, a double convex positive lens L11 and a cemented lens constructed by a negative meniscus lens L12 having a convex surface facing the object side cemented with a positive meniscus lens L13 having a convex surface facing the object side.

The second lens group G2 consists of, in order from the object side, a cemented negative lens constructed by a double concave negative lens L21 cemented with a positive meniscus lens L22 having a convex surface facing the object side, and a double concave negative lens L23.

The third lens group G3 consists of a double convex positive lens L31.

The fourth lens group G4 is composed of, in order from the object side, an A group G4A having positive refractive power, a B group G4B having negative refractive power, and a C group G4C having positive refractive power. Meanwhile, an aperture stop S is disposed between the A group G4A and the B group G4B.

The A group G4A consists of, in order from the object side, a cemented positive lens constructed by a double convex positive lens L41 cemented with a negative meniscus lens L42 having a concave surface facing the object side.

The B group G4B consists of, in order from the object side, a cemented negative lens constructed by a positive meniscus lens L43 having a concave surface facing the object side cemented with a double concave negative lens L44.

The C group G4C consists of, in order from the object side, a double convex positive lens L45 and a negative meniscus lens L46 having a concave surface facing the object side.

In the variable magnification optical system according to the Second Example, upon varying magnification between the wide-angle end state and the telephoto end state, the first to the fourth lens groups G1 to G4 are moved along the optical axis such that a distance between the first lens group G1 and the second lens group G2, a distance between the second lens group G2 and the third lens group G3 and a distance between the third lens group G3 and the fourth lens group G4 are varied.

In the variable magnification optical system according to the Second Example, focusing from an infinitely distant object to a close distance object is carried out by moving the third lens group G3 along the optical axis toward the image side as the focusing group.

In the variable magnification optical system according to the Second Example, vibration reduction is carried out by moving the B group G4B as the vibration group to have a component in the direction perpendicular to the optical axis. Meanwhile, upon carrying out vibration reduction, the A group G4A and the C group G4C are fixed at the respective positions in the direction perpendicular to the optical axis.

It is noted here that in the variable magnification optical system according to the Second Example, the vibration reduction coefficient is 1.17 and the focal length is 71.35 (mm) in the wide-angle end state, so that the moving amount of the B group G4B for correcting a rotational camera shake of 0.30 degrees is 0.32 (mm). Further, in the telephoto end state, the vibration reduction coefficient is 1.80, and the focal length is 294.00 (mm), so that the moving amount of the B lens group G4B for correcting a rotational camera shake of 0.20 degrees is 0.57 (mm).

Table 2 below shows various values of the variable magnification optical system according to the Second Example.

TABLE 2

Second Example

[Surface Data]

| Surface number | r | d | nd | vd |
|---|---|---|---|---|
| Object surface | ∞ | | | |
| 1 | 84.0136 | 6.369 | 1.51680 | 63.88 |
| 2 | −569.5201 | 0.287 | | |

TABLE 2-continued

Second Example

| | | | | |
|---|---|---|---|---|
| 3 | 111.7962 | 1.500 | 1.62004 | 36.40 |
| 4 | 36.8295 | 8.708 | 1.51680 | 63.88 |
| 5 | 239.6437 | variable | | |
| 6 | −196.3998 | 1.000 | 1.69680 | 55.52 |
| 7 | 17.8250 | 4.472 | 1.80518 | 25.45 |
| 8 | 63.8758 | 2.220 | | |
| 9 | −50.1550 | 1.000 | 1.80100 | 34.92 |
| 10 | 107.3132 | variable | | |
| 11 | 98.4276 | 3.799 | 1.51680 | 63.88 |
| 12 | −44.7987 | variable | | |
| 13 | 33.5689 | 5.221 | 1.48749 | 70.31 |
| 14 | −34.6171 | 1.000 | 1.75520 | 27.57 |
| 15 | −464.1612 | 1.880 | | |
| 16 (Stop S) | ∞ | 31.253 | | |
| 17 | −215.7008 | 3.558 | 1.80610 | 40.97 |
| 18 | −18.9067 | 1.000 | 1.69680 | 55.52 |
| 19 | 29.6933 | 2.000 | | |
| 20 | 25.4517 | 4.902 | 1.51742 | 52.20 |
| 21 | −34.1288 | 6.212 | | |
| 22 | −19.1689 | 1.000 | 1.77250 | 49.62 |
| 23 | −46.3649 | BF | | |
| Image plane | ∞ | | | |

[Various Data]
Variable magnification ratio 4.12

| | W | M | T |
|---|---|---|---|
| f | 71.4 | 105.0 | 294.0 |
| FNO | 4.70 | 4.74 | 6.44 |
| 2ω | 22.84 | 15.30 | 5.46 |
| Ymax | 14.25 | 14.25 | 14.25 |
| TL | 167.32 | 188.67 | 222.32 |
| BF | 38.52 | 39.12 | 64.52 |
| Infinitely distant | | | |
| d5 | 3.000 | 27.419 | 53.254 |
| d10 | 29.124 | 23.882 | 2.000 |
| d12 | 9.294 | 10.871 | 15.165 |
| Close distance | | | |
| d5 | 3.000 | 27.419 | 53.254 |
| d10 | 29.965 | 25.078 | 3.487 |
| d12 | 8.453 | 9.675 | 13.679 |

[Lens Group Data]

| Group | Starting surface | f |
|---|---|---|
| 1 | 1 | 128.484 |
| 2 | 6 | −29.436 |
| 3 | 11 | 60.115 |
| 4 | 13 | 180.542 |

[Values for Conditional Expression]

(1) Dvrw/TLw = 0.198
(2) f1/f3 = 2.137
(3) f3/f4 = 0.333
(4) f4/(−fvr) = 3.886
(5) vFP = 63.88
(6) nN = 1.620
(7) (R2 + R1)/(R2 − R1) = 1.774
(8) DSt/DRt = 0.352

Figure 6A:
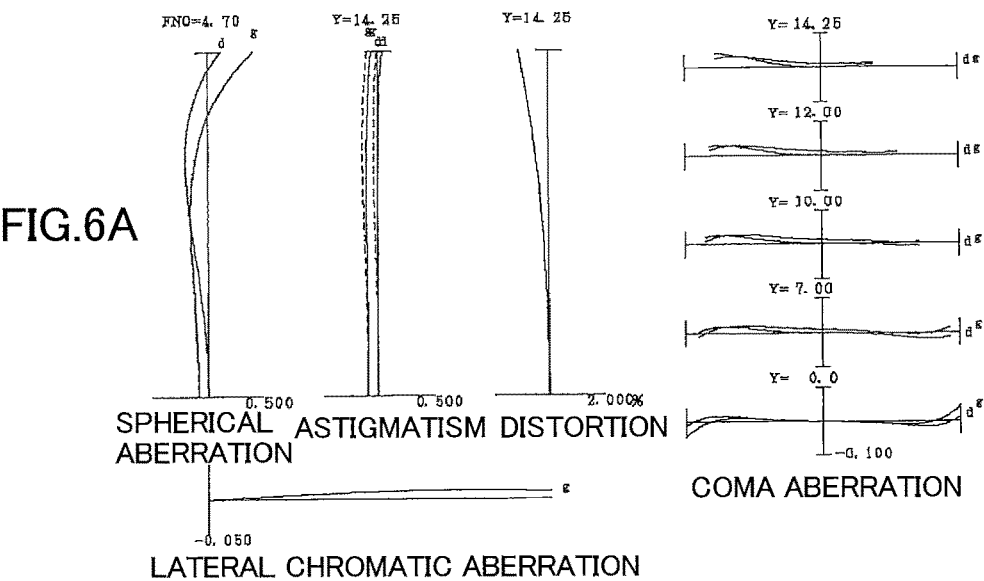
FIGS. 6A, 6B and 6C are graphs showing various aberrations of the variable magnification optical system according to the Second Example.
Figure 6B:
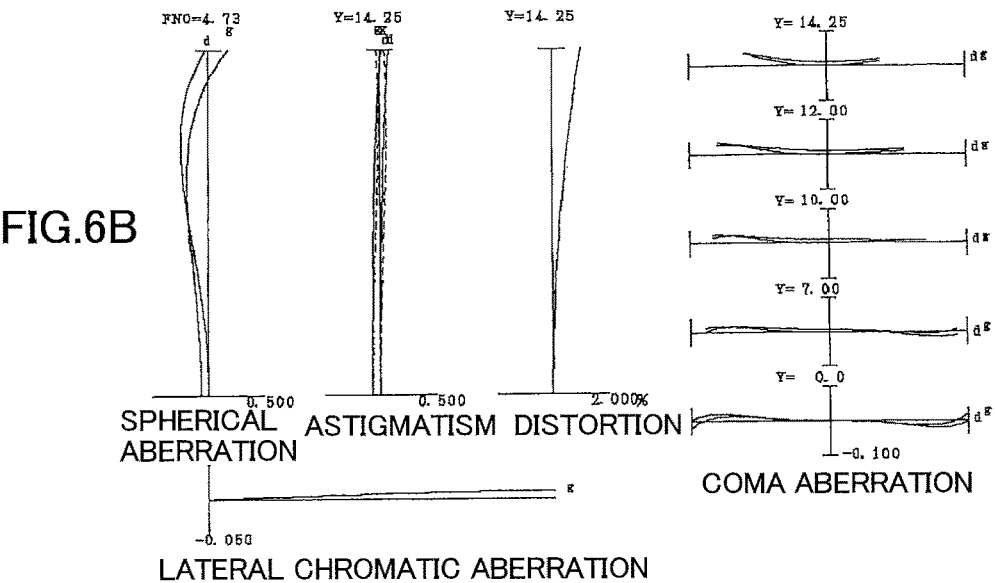
Figure 6C:
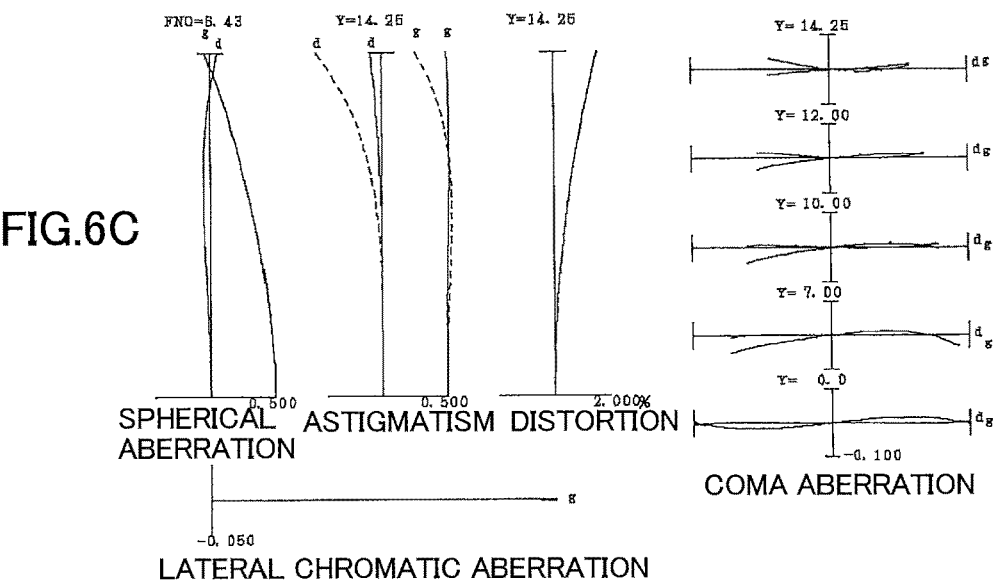

FIGS. 6A, 6B and 6C are graphs showing various aberrations of the variable magnification optical system according to the Second Example upon focusing on an infinitely distant object, in which FIG. 6A is in a wide-angle end state, FIG. 6B is in an intermediate focal length state, and FIG. 6C is in a telephoto end state.

Figure 7A:
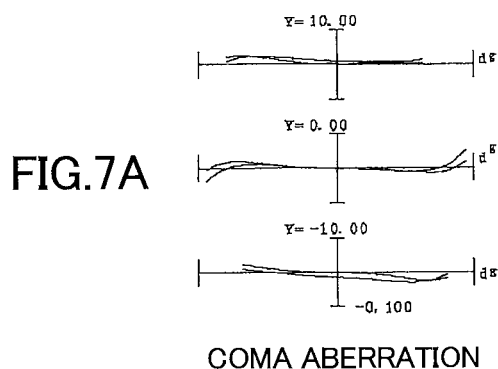
FIGS. 7A and 7B are graphs showing meridional transverse aberrations of the variable magnification optical system according to the Second Example.
Figure 7B:
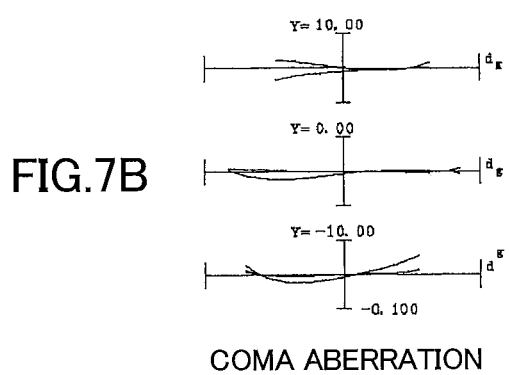

FIGS. 7A and 7B are graphs showing meridional transverse aberration of the variable magnification optical system according to the Second Example, in which FIG. 7A is upon focusing on an infinitely distant object with carrying out vibration reduction for a rotation camera shake of 0.30 degrees in the wide-angle end state, FIG. 7B is upon focusing on an infinitely distant object with carrying out vibration reduction for a rotation camera shake of 0.20 degrees in the telephoto end state.

Figure 8A:
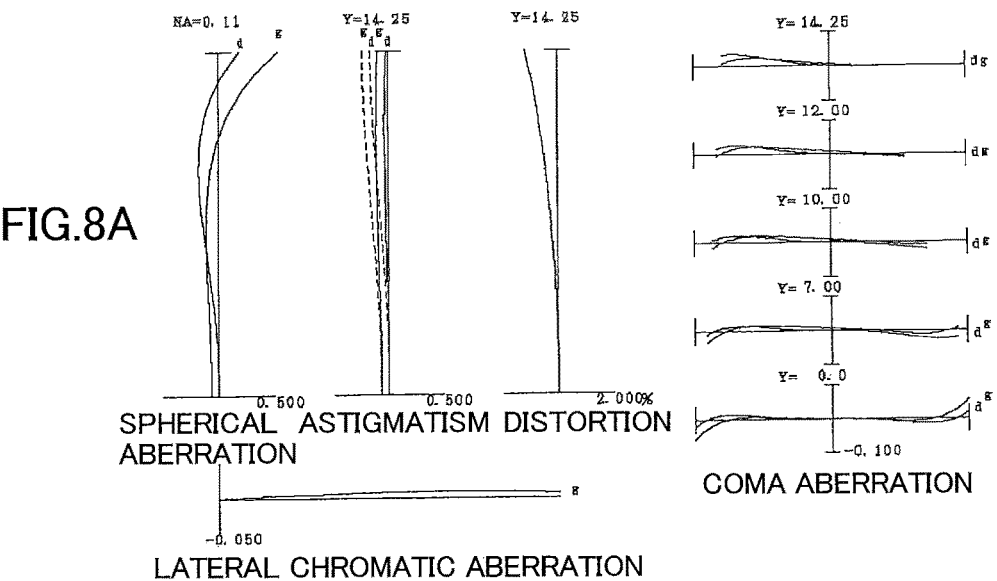
FIGS. 8A, 8B and 8C are graphs showing various aberrations of the variable magnification optical system according to the Second Example.
Figure 8B:
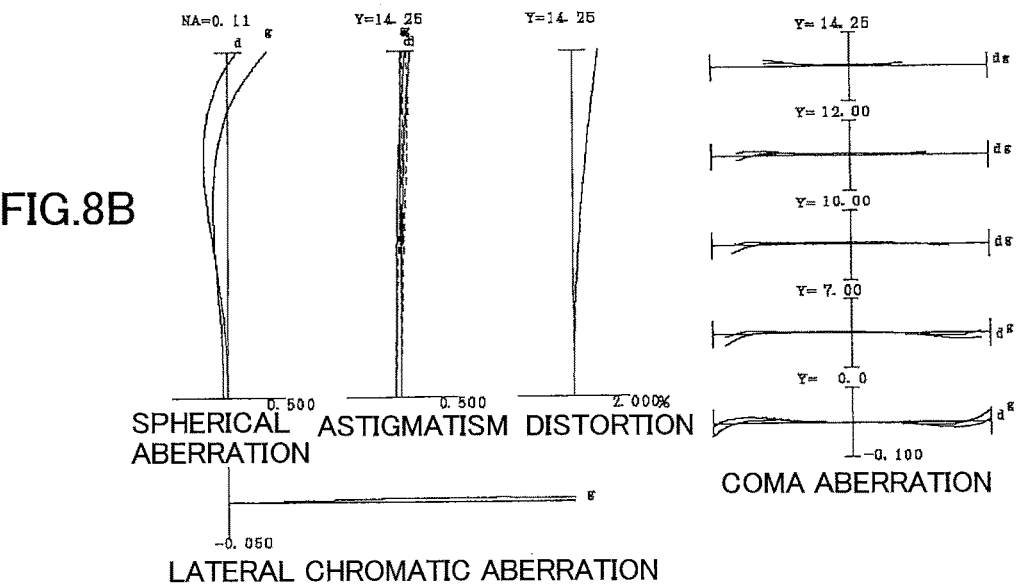
Figure 8C:
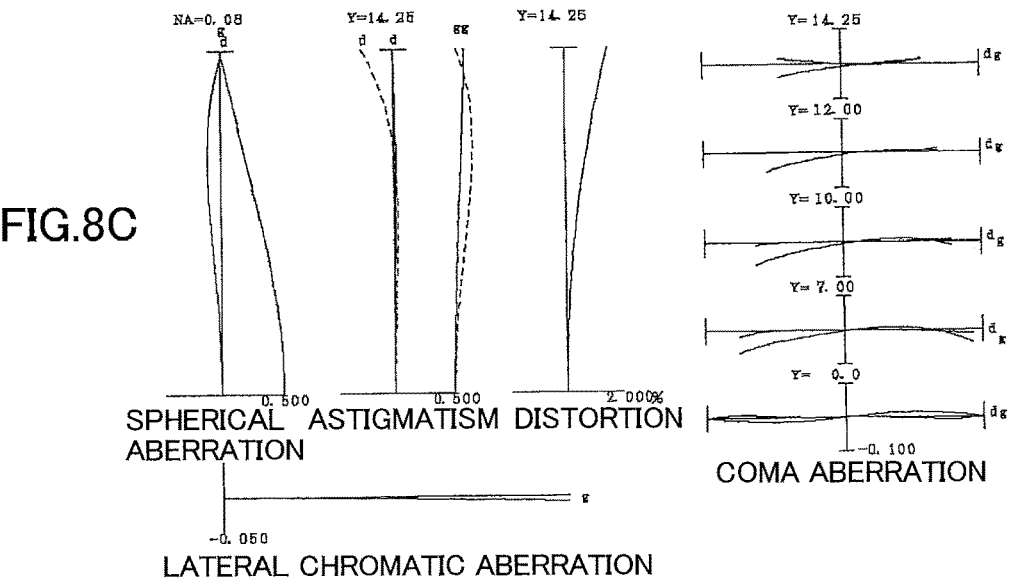

FIGS. 8A, 8B and 8C are graphs showing various aberrations of the variable magnification optical system according to the Second Example upon focusing on close distance object, in which FIG. 8A is in the wide-angle end state, FIG. 8B is in the intermediate focal length state, and FIG. 8C is in the telephoto end state.

As is apparent from the respective graphs showing aberrations, the variable magnification optical system according to the Second Example shows superb imaging performance as a result of good corrections to various aberrations in the wide-angle end state to the telephoto end state, and also shows superb imaging performance upon carrying out vibration reduction as well as focusing on a close distance object also.

Third Example

Figure 9:
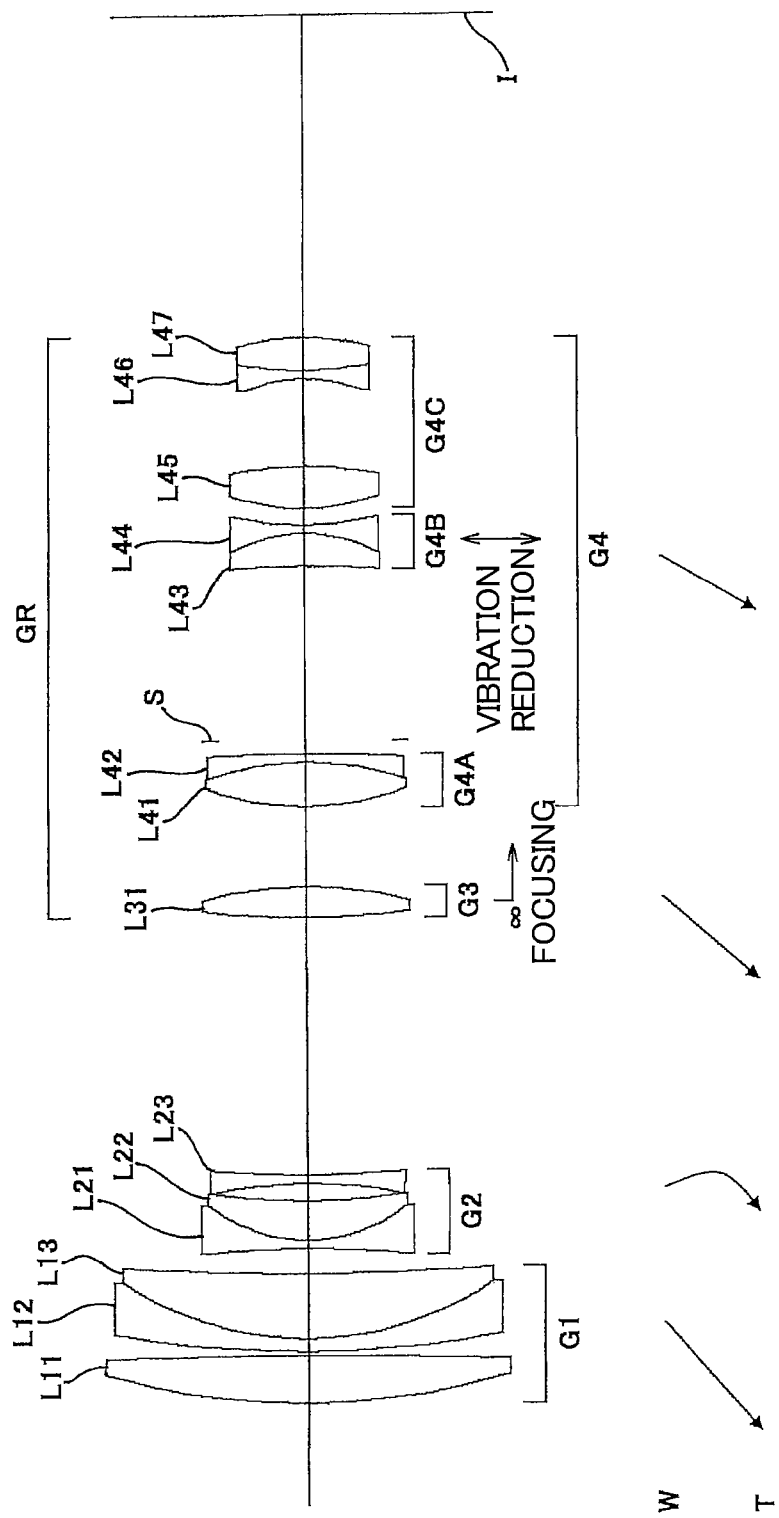
FIG. 9 is a sectional view of a variable magnification optical system according to a Third Example.

FIG. 9 is a sectional view showing a configuration of a variable magnification optical system according to the Third Example that is common to the first to third embodiments.

The variable magnification optical system according to the Third Example is composed of, in order from an object side: a first lens group G1 having positive refractive power, a second lens group G2 having negative refractive power and a rear group GR having positive refractive power. The rear group GR is composed of, in order from the object side, a third lens group G3 having positive refractive power and a fourth lens group G4 having positive refractive power.

The first lens group G1 consists of, in order from the object side, a double convex positive lens L11 and a cemented positive lens constructed by a negative meniscus lens L12 having a convex surface facing the object side cemented with a positive meniscus lens L13 having a convex surface facing the object side.

The second lens group G2 consists of, in order from the object side, a cemented negative lens constructed by a double concave negative lens L21 cemented with a positive meniscus lens L22 having a convex surface facing the object side, and a double concave negative lens L23.

The third lens group G3 consists of a double convex positive lens L31.

The fourth lens group G4 is composed of, in order from the object side, an A group G4A having positive refractive power, a B group G4B having negative refractive power and a C group G4C having positive refractive power. Meanwhile, an aperture stop S is disposed between the A group G4A and the B group G4B.

The A group G4A consists of, in order from the object side, a cemented positive lens constructed by a double convex positive lens L41 cemented with a negative meniscus lens L42 having a concave surface facing the object side.

The B group G4B consists of, in order from the object side, a cemented negative lens constructed by a positive meniscus lens L43 having a concave surface facing the object side cemented with a double concave negative lens L44.

The C group G4C consists of, in order from the object side, a double convex positive lens L45 and a cemented negative lens constructed by a double concave negative lens L46 cemented with a double convex positive lens L47.

In the variable magnification optical system according to the Third Example, upon varying magnification between the wide-angle end state and the telephoto end state, the first to the fourth lens groups G1 to G4 are moved along the optical axis such that a distance between the first lens group G1 and the second lens group G2, a distance between the second lens group G2 and the third lens group G3 and a distance between the third lens group G3 and the fourth lens group G4 are varied.

In the variable magnification optical system according to the Third Example, focusing from an infinitely distant object to a close distance object is carried out by moving the third lens group G3 along the optical axis as the focusing group.

In the variable magnification optical system according to the Third Example, vibration reduction is carried out by moving the B group G4B as the vibration group to have a component in the direction perpendicular to the optical axis. Meanwhile, upon carrying out vibration reduction, the A group G4A and the C group G4C are fixed at the respective positions in the direction perpendicular to the optical axis.

It is noted here that in the variable magnification optical system according to the Third Example, the vibration reduction coefficient is 1.22 and the focal length is 71.40 (mm) in the wide-angle end state, so that the moving amount of the B group G4B for correcting a rotational camera shake of 0.30 degrees is 0.31 (mm). Further, in the telephoto end state, the vibration reduction coefficient is 1.79, and the focal length is 294.00 (mm), so that the moving amount of the B lens group G4B for correcting a rotational camera shake of 0.20 degrees is 0.57 (mm).

Table 3 below shows various values of the variable magnification optical system according to the Third Example.

TABLE 3

Third Example

[Surface Data]

| Surface number | r | d | nd | νd |
|---|---|---|---|---|
| Object surface | ∞ | | | |
| 1 | 85.0462 | 5.776 | 1.51680 | 63.88 |
| 2 | −660.6172 | 0.468 | | |
| 3 | 127.3802 | 1.500 | 1.62004 | 36.40 |
| 4 | 39.1726 | 7.903 | 1.51680 | 63.88 |
| 5 | 338.5447 | variable | | |
| 6 | −132.1891 | 1.000 | 1.69680 | 55.52 |
| 7 | 19.2602 | 4.667 | 1.80518 | 25.45 |
| 8 | 76.0183 | 2.071 | | |
| 9 | −54.4201 | 1.000 | 1.80100 | 34.92 |
| 10 | 119.2030 | variable | | |
| 11 | 101.6158 | 3.707 | 1.51680 | 63.88 |
| 12 | −48.1136 | variable | | |
| 13 | 32.8274 | 5.339 | 1.48749 | 70.31 |
| 14 | −36.1413 | 1.000 | 1.80518 | 25.45 |
| 15 | −208.8127 | 1.719 | | |
| 16 (Stop S) | ∞ | 20.897 | | |
| 17 | −111.8106 | 3.901 | 1.66755 | 41.87 |
| 18 | −18.5066 | 1.000 | 1.58913 | 61.22 |
| 19 | 35.2076 | 2.000 | | |
| 20 | 26.2172 | 5.000 | 1.48749 | 70.31 |
| 21 | −44.8232 | 10.387 | | |
| 22 | −18.5590 | 1.000 | 1.77250 | 49.62 |
| 23 | 39.9065 | 4.006 | 1.60342 | 38.03 |
| 24 | −29.6411 | BF | | |
| Image plane | ∞ | | | |

[Various Data]
variable magnification ratio 4.12

| | W | M | T |
|---|---|---|---|
| f | 71.4 | 105.0 | 294.0 |
| FNO | 4.68 | 4.76 | 6.45 |
| 2ω | 22.80 | 15.28 | 5.44 |
| Ymax | 14.25 | 14.25 | 14.25 |

TABLE 3-continued

Third Example

| | | | |
|---|---|---|---|
| TL | 166.39 | 188.89 | 221.32 |
| BF | 38.52 | 39.12 | 64.52 |

Infinitely distant

| | | | |
|---|---|---|---|
| d5 | 3.000 | 27.909 | 54.414 |
| d10 | 30.861 | 25.246 | 2.000 |
| d12 | 9.676 | 12.274 | 16.047 |

Close distance

| | | | |
|---|---|---|---|
| d5 | 3.000 | 27.909 | 54.414 |
| d10 | 31.772 | 26.533 | 3.581 |
| d12 | 8.765 | 10.987 | 14.466 |

[Lens Group Data]

| Group | Starting surface | f |
|---|---|---|
| 1 | 1 | 130.814 |
| 2 | 6 | −30.984 |
| 3 | 11 | 63.720 |
| 4 | 13 | 184.004 |

[Values for Conditional Expressions]

(1) Dvrw/TLw = 0.136
(2) f1/f3 = 2.063
(3) f3/f4 = 0.345
(4) f4/(−fvr) = 3.433
(5) vFP = 63.88
(6) nN = 1.620
(7) (R2 + R1)/(R2 − R1) = 1.679
(8) DSt/DRt = 0.366

Figure 10A:
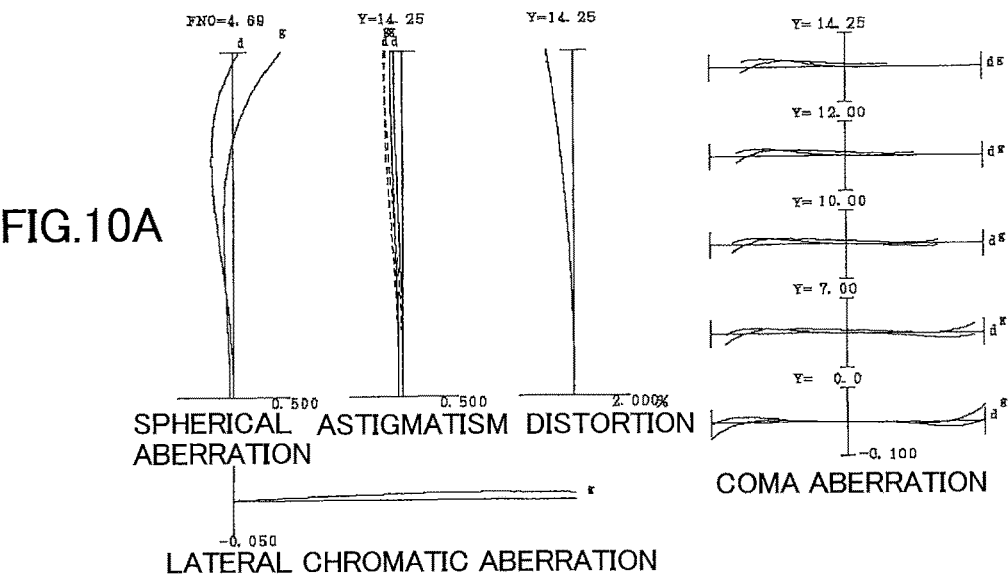
FIGS. 10A, 10B and 10C are graphs showing various aberrations of the variable magnification optical system according to the Third Example.
Figure 10B:
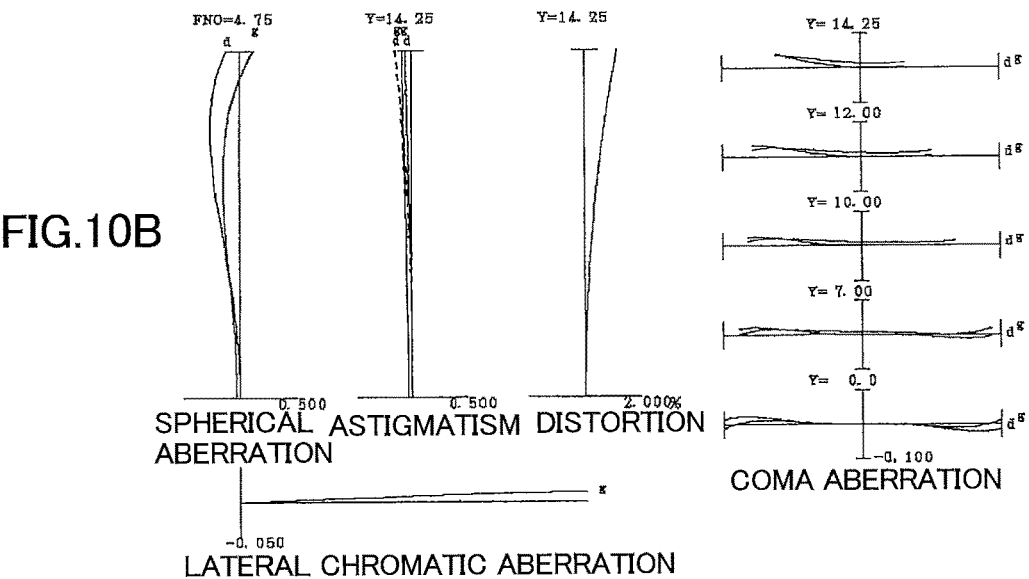
Figure 10C:
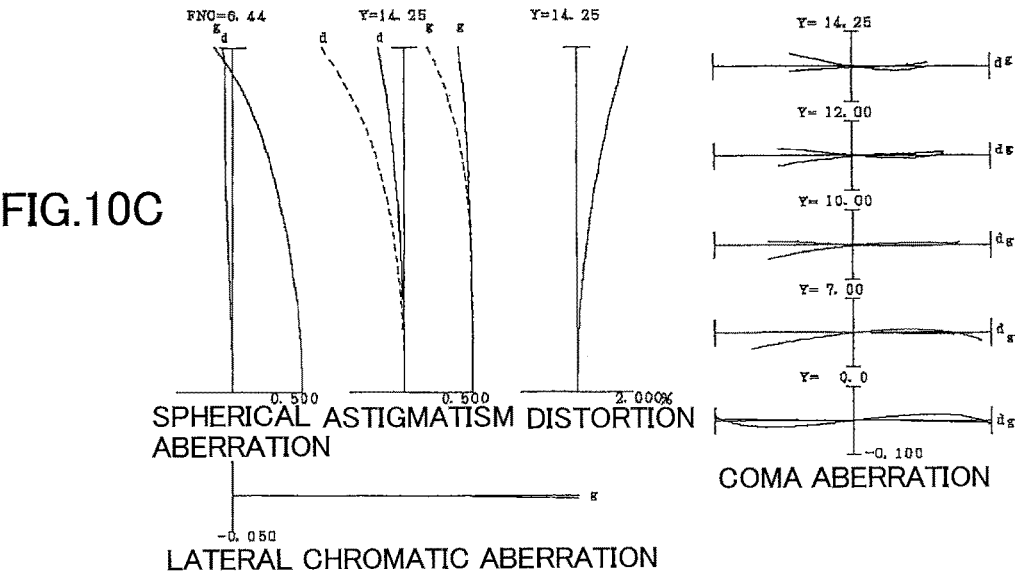

FIGS. 10A, 10B and 10C are graphs showing various aberrations of the variable magnification optical system according to the Third Example upon focusing on an infinitely distant object, in which FIG. 10A is in a wide-angle end state, FIG. 10B is in an intermediate focal length state, and FIG. 10C is in a telephoto end state.

Figure 12A:
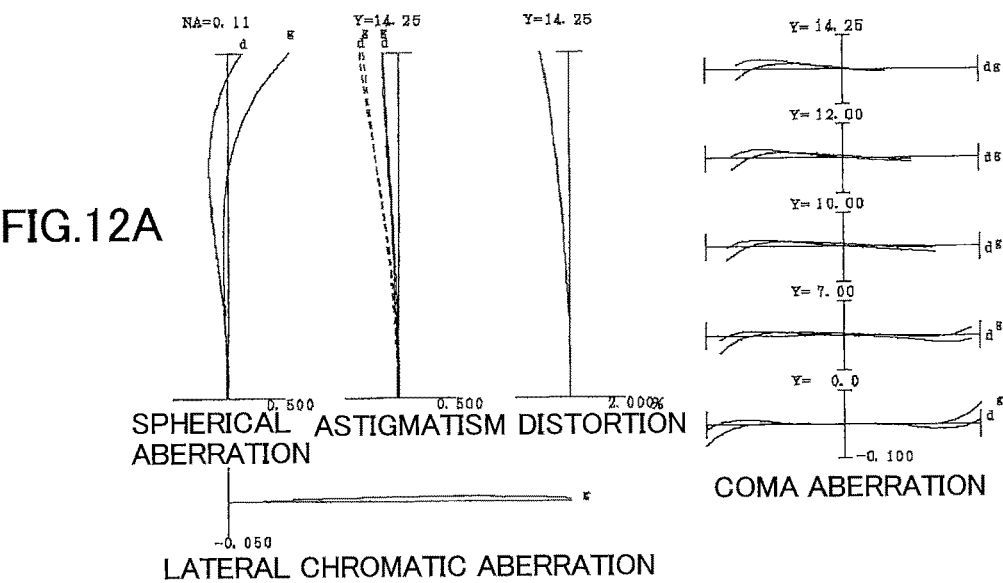
FIGS. 12A, 12B and 12C are graphs showing various aberrations of the variable magnification optical system according to the Third Example.
Figure 12B:
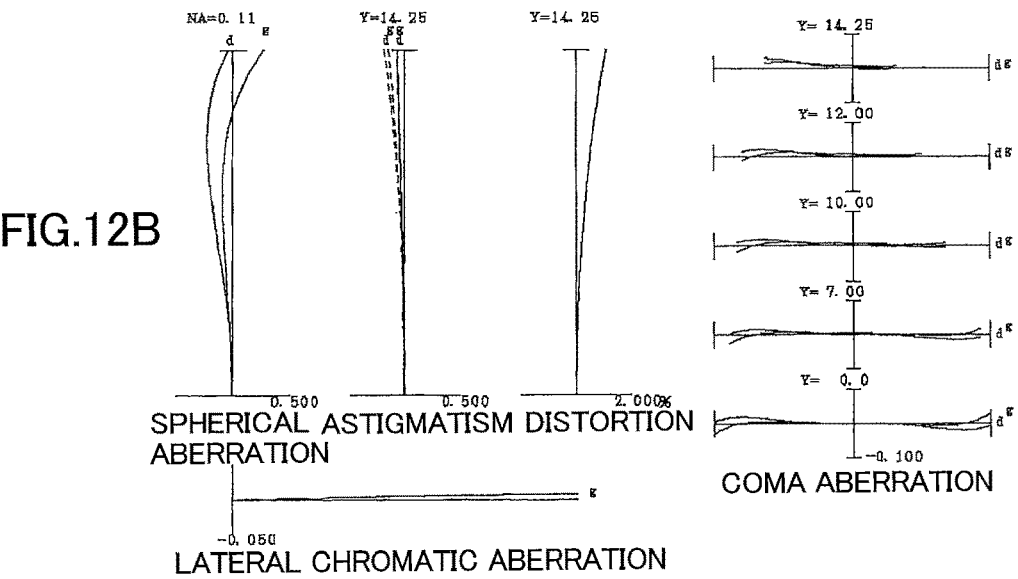
Figure 12C:
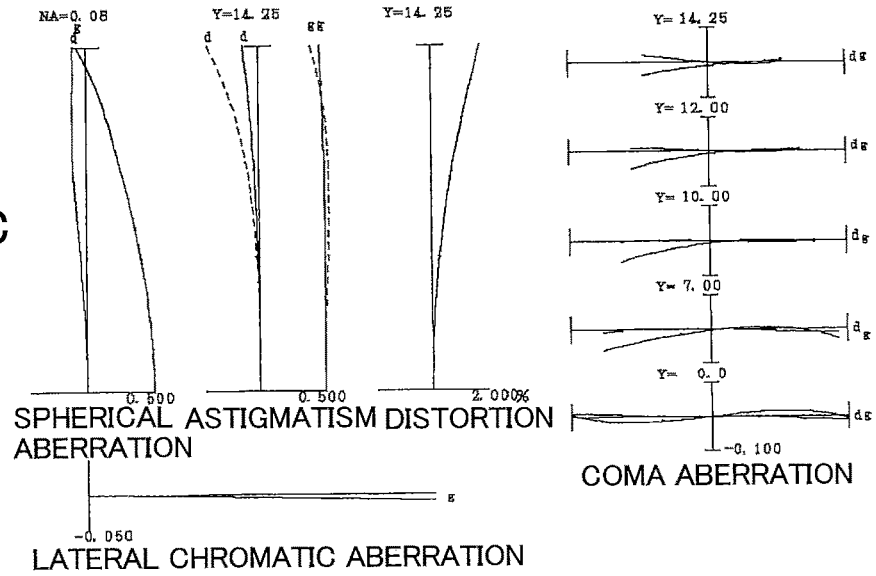

FIGS. 11A and 11B are graphs showing meridional transverse aberration of the variable magnification optical system according to the Third Example, in which FIG. 11A is upon focusing on an infinitely distant object with carrying out vibration reduction for a rotation camera shake of 0.30 degrees in the wide-angle end state, FIG. 11B is upon focusing on an infinitely distant object with carrying out vibration reduction for a rotation camera shake of 0.20 degrees in the telephoto end state. FIGS. 12A, 12B and 12C are graphs showing various aberrations of the variable magnification optical system according to the Third Example upon focusing on close distance object, in which FIG. 12A is in the wide-angle end state, FIG. 12B is in the intermediate focal length state, and FIG. 12C is in the telephoto end state.

As is apparent from the respective graphs, the variable magnification optical system according to the Third Example shows superb imaging performance as a result of good corrections to various aberrations in the wide-angle end state to the telephoto end state, and also shows superb imaging performance upon carrying out vibration reduction as well as focusing on a close distance object.

Fourth Example

Figure 13:
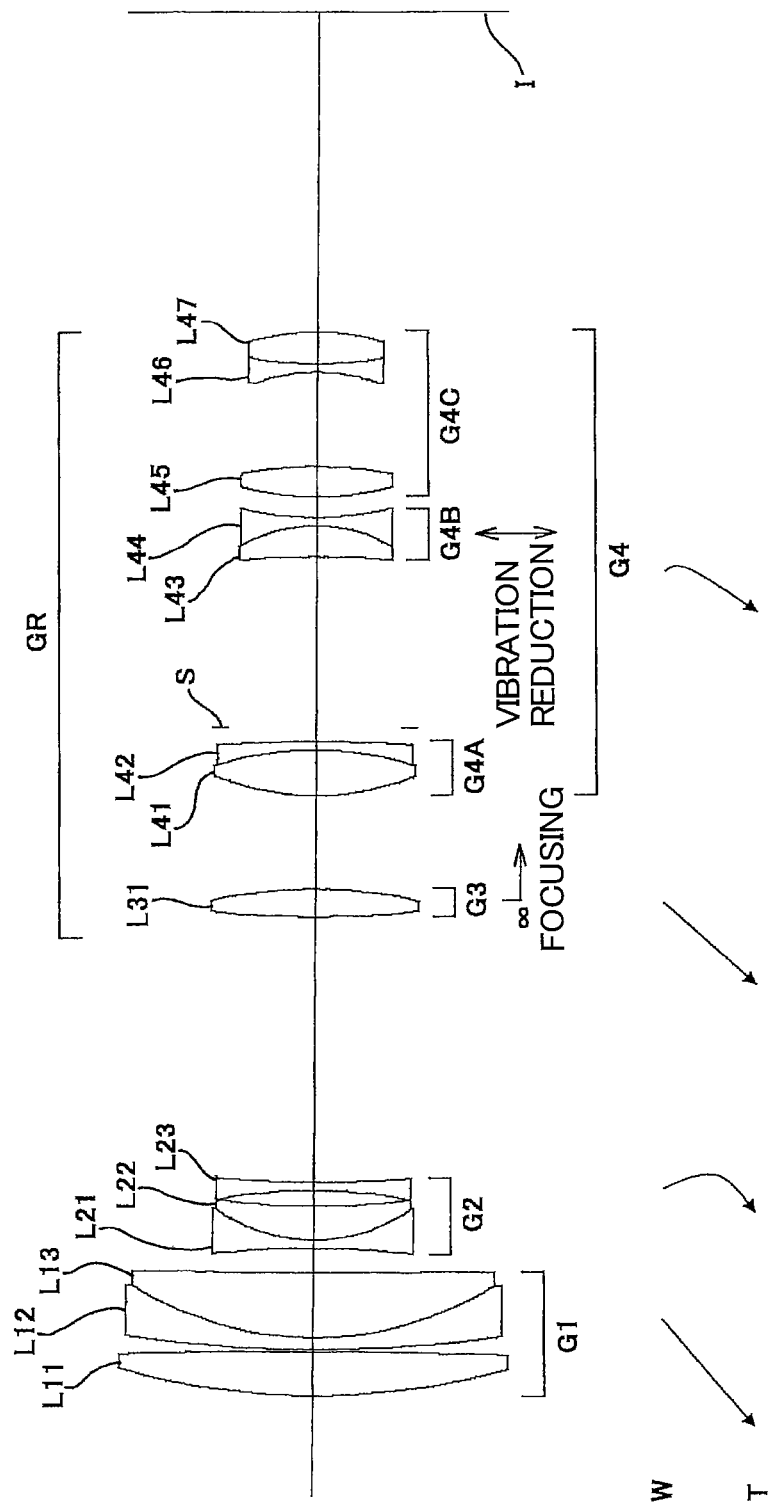
FIGS. 13A and 13B are a sectional view of a variable magnification optical system according to a Fourth Example.

FIG. 13 is a sectional view showing a configuration of a variable magnification optical system according to the Fourth Example that is common to the first to third embodiments.

The variable magnification optical system according to the Fourth Example is composed of, in order from an object side: a first lens group G1 having positive refractive power; a second lens group G2 having negative refractive power; and a rear group GR having positive refractive power. The rear group GR is composed of, in order from the object side, a third lens group G3 having positive refractive power and a fourth lens group G4 having positive refractive power.

The first lens group G1 consists of, in order from the object side, a double convex positive lens L11 and a cemented positive lens constructed by a negative meniscus lens L12 having a convex surface facing the object side cemented with a positive meniscus lens L13 having a convex surface facing the object side.

The second lens group G2 consists of, in order from the object side, a cemented negative lens constructed by a double concave negative lens L21 cemented with a positive meniscus lens L22 having a convex surface facing the object side, and a double concave negative lens L23.

The third lens group G3 consists of a double convex positive lens L31.

The fourth lens group G4 is composed of, in order from the object side, an A group G4A having positive refractive power, a B group G4B having negative refractive power, and a C group G4C having positive refractive power. Meanwhile, an aperture stop S is disposed between the A group G4A and the B group G4B.

The A group G4A consists of, in order from the object side, a cemented positive lens constructed by a double convex positive lens L41 cemented with a negative meniscus lens L42 having a concave surface facing the object side.

The B group G4B consists of, in order from the object side, a cemented negative lens constructed by a positive meniscus lens L43 having a concave surface facing the object side cemented with a double concave negative lens L44.

The C group G4C consists of, in order from the object side, a double convex positive lens L45 and a cemented negative lens constructed by a double concave negative lens L46 cemented with a double convex positive lens L47.

In the variable magnification optical system according to the Fourth Example, upon varying magnification between the wide-angle end state and the telephoto end state, the first to the fourth lens groups G1 to G4 are moved along the optical axis such that a distance between the first lens group G1 and the second lens group G2, a distance between the second lens group G2 and the third lens group G3 and a distance between the third lens group G3 and the fourth lens group G4 are varied.

In the variable magnification optical system according to the Fourth Example, focusing from an infinitely distant object to a close distance object is carried out by moving the third lens group G3 along the optical axis as the focusing group.

In the variable magnification optical system according to the Fourth Example, vibration reduction is carried out by moving the B group G4B as the vibration group to have a component in a direction perpendicular to the optical axis. Meanwhile, upon carrying out vibration reduction, the A group G4A and the C group G4C are fixed at the respective positions in the direction perpendicular to the optical axis.

It is noted here that in the variable magnification optical system according to the Fourth Example, the vibration reduction coefficient is 1.21 and the focal length is 71.40 (mm) in the wide-angle end state, so that the moving amount of the B group G4B for correcting a rotational camera shake of 0.30 degrees is 0.31 (mm). Further, in the telephoto end state, the vibration reduction coefficient is 1.79, and the focal length is 292.00 (mm), so that the moving amount of the B lens group G4B for correcting a rotational camera shake of 0.20 degrees is 0.57 (mm).

Table 4 below shows various values of the variable magnification optical system according to the Fourth Example.

TABLE 4

Fourth Example

[Surface Data]

| Surface number | r | d | nd | vd |
|---|---|---|---|---|
| Object surface | ∞ | | | |
| 1 | 86.4475 | 5.443 | 1.51680 | 63.88 |
| 2 | −981.1690 | 0.200 | | |
| 3 | 146.3378 | 1.500 | 1.62004 | 36.40 |
| 4 | 41.2453 | 8.000 | 1.51680 | 63.88 |
| 5 | 1154.1773 | variable | | |
| 6 | −105.1301 | 1.000 | 1.69680 | 55.52 |
| 7 | 20.4832 | 4.124 | 1.80518 | 25.45 |
| 8 | 77.3629 | 1.964 | | |
| 9 | −62.6354 | 1.000 | 1.83400 | 37.18 |
| 10 | 142.2611 | variable | | |
| 11 | 123.7504 | 3.431 | 1.58913 | 61.22 |
| 12 | −57.1062 | variable | | |
| 13 | 33.8130 | 5.634 | 1.49700 | 81.73 |
| 14 | −38.7693 | 1.000 | 1.80518 | 25.45 |
| 15 | −194.5892 | 1.688 | | |
| 16 (Stop S) | ∞ | 21.000 | | |
| 17 | −99.8095 | 3.775 | 1.66755 | 41.87 |
| 18 | −18.8632 | 1.000 | 1.58913 | 61.22 |
| 19 | 36.8056 | 2.500 | | |
| 20 | 34.3226 | 3.724 | 1.51680 | 63.88 |
| 21 | −51.2601 | 11.445 | | |
| 22 | −20.6818 | 1.000 | 1.77250 | 49.62 |
| 23 | 51.2093 | 3.854 | 1.60342 | 38.03 |
| 24 | −30.0976 | BF | | |
| Image plane | ∞ | | | |

[Various Data]
Variable magnification ratio 4.09

| | W | M | T |
|---|---|---|---|
| f | 71.4 | 100.0 | 292.0 |
| FNO | 4.70 | 4.69 | 6.48 |
| 2ω | 22.78 | 16.04 | 5.48 |
| Ymax | 14.25 | 14.25 | 14.25 |
| TL | 169.32 | 189.52 | 221.32 |
| BF | 39.12 | 38.52 | 66.12 |
| Infinitely distant | | | |
| d5 | 3.000 | 26.086 | 53.441 |
| d10 | 32.425 | 27.561 | 2.000 |
| d12 | 11.493 | 14.070 | 16.477 |
| Close distance | | | |
| d5 | 3.000 | 26.086 | 53.441 |
| d10 | 33.360 | 28.885 | 3.621 |
| d12 | 10.558 | 12.746 | 14.856 |

[Lens Group Data]

| Group | Starting surface | f |
|---|---|---|
| 1 | 1 | 128.221 |
| 2 | 6 | −31.614 |
| 3 | 11 | 66.796 |
| 4 | 13 | 176.525 |

[Values for Conditional Expression]

(1) Dvrw/TLw = 0.134
(2) f1/f3 = 1.920
(3) f3/f4 = 0.378
(4) f4/(−fvr) = 3.308

TABLE 4-continued

Fourth Example (5) νFP = 61.22
(6) nN = 1.620
(7) (R2 + R1)/(R2 − R1) = 1.720
(8) DSt/DRt = 0.369

Figure 14A:
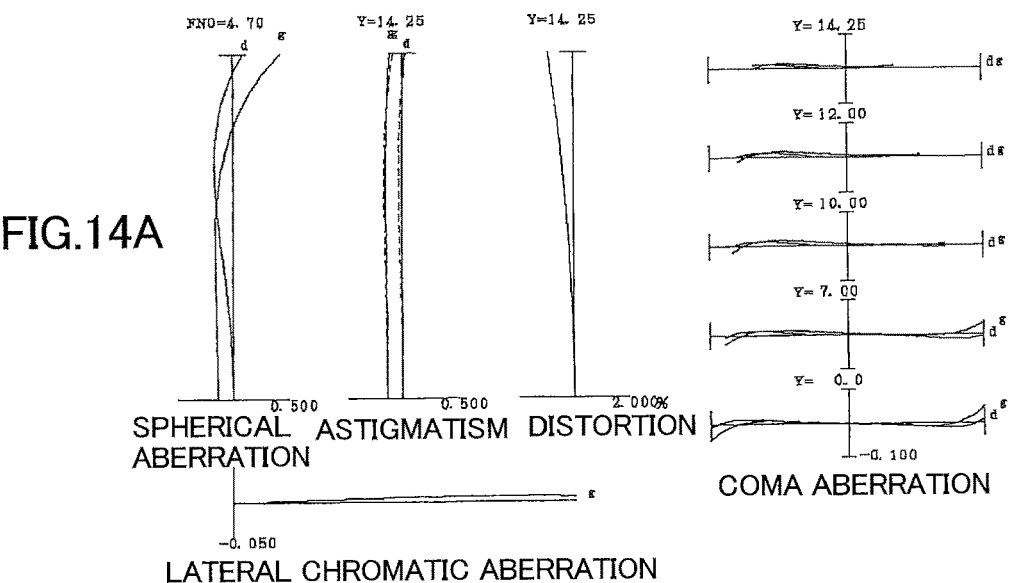
FIGS. 14A, 14B and 14C are graphs showing various aberrations of the variable magnification optical system according to the Fourth Example.
Figure 14B:
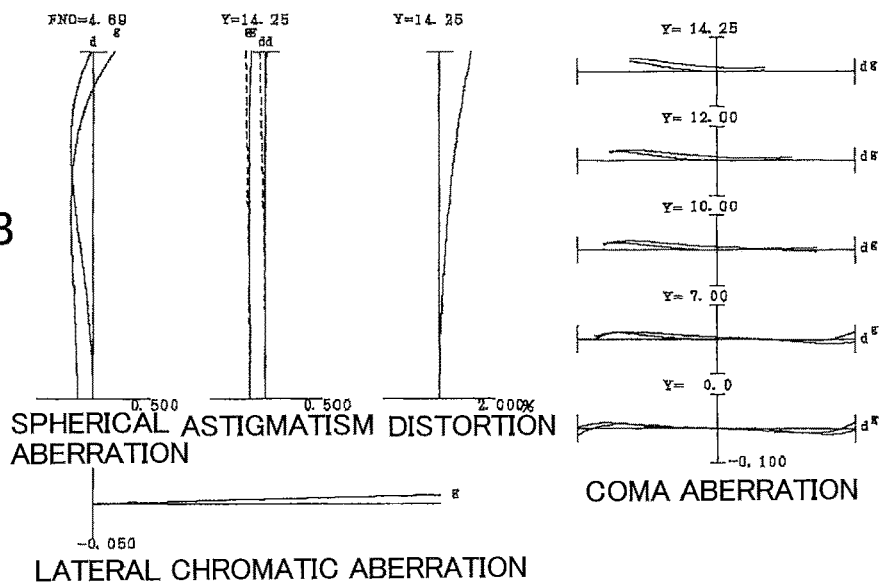
Figure 14C:
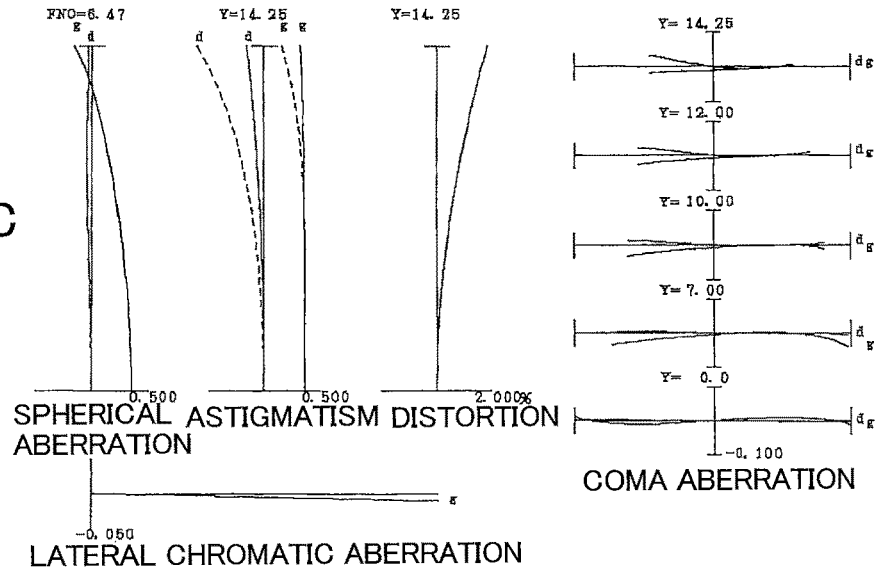

FIGS. 14A, 14B and 14C are graphs showing various aberrations of the variable magnification optical system according to the Fourth Example upon focusing on an infinitely distant object, in which FIG. 14A is in a wide-angle end state, FIG. 14B is in an intermediate focal length state, and FIG. 14C is in a telephoto end state.

FIGS. 15A and 15B are graphs showing meridional transverse aberration of the variable magnification optical system according to the Fourth Example, in which FIG. 15A is upon focusing on an infinitely distant object with carrying out vibration reduction for a rotation camera shake of 0.30 degrees in the wide-angle end state, FIG. 15B is upon focusing on an infinitely distant object with carrying out vibration reduction for a rotation camera shake of 0.20 degrees in the telephoto end state.

Figure 16A:
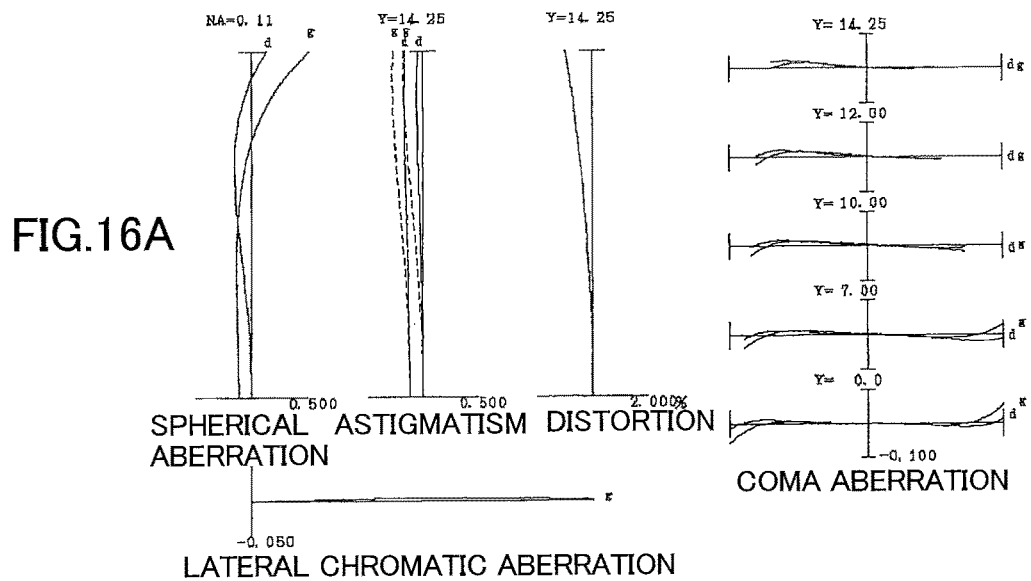
FIGS. 16A, 16B and 16C are graphs showing various aberrations of the variable magnification optical system according to the Fourth Example.
Figure 16B:
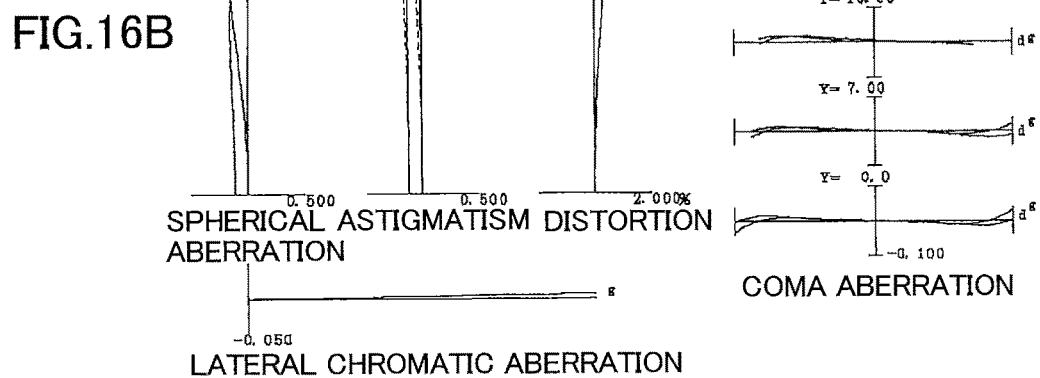
Figure 16C:
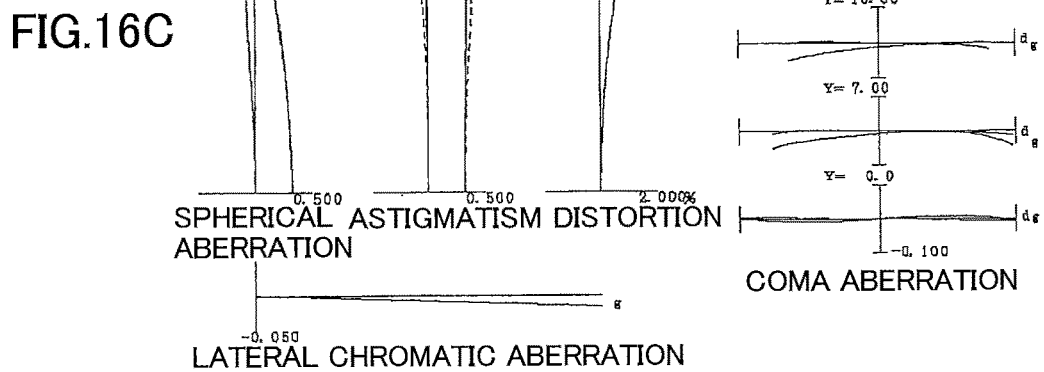

FIGS. 16A, 16B and 16C are graphs showing various aberrations of the variable magnification optical system according to the Fourth Example upon focusing on close distance object, in which FIG. 16A is in the wide-angle end state, FIG. 16B is in the intermediate focal length state, and FIG. 16C is in the telephoto end state.

As is apparent from the respective graphs showing aberrations, the variable magnification optical system according to the Fourth Example shows superb imaging performance as a result of good corrections to various aberrations in the wide-angle end state to the telephoto end state, and also shows superb imaging performance upon carrying out vibration reduction as well as focusing on a close distance object.

Fifth Example

Figure 17:
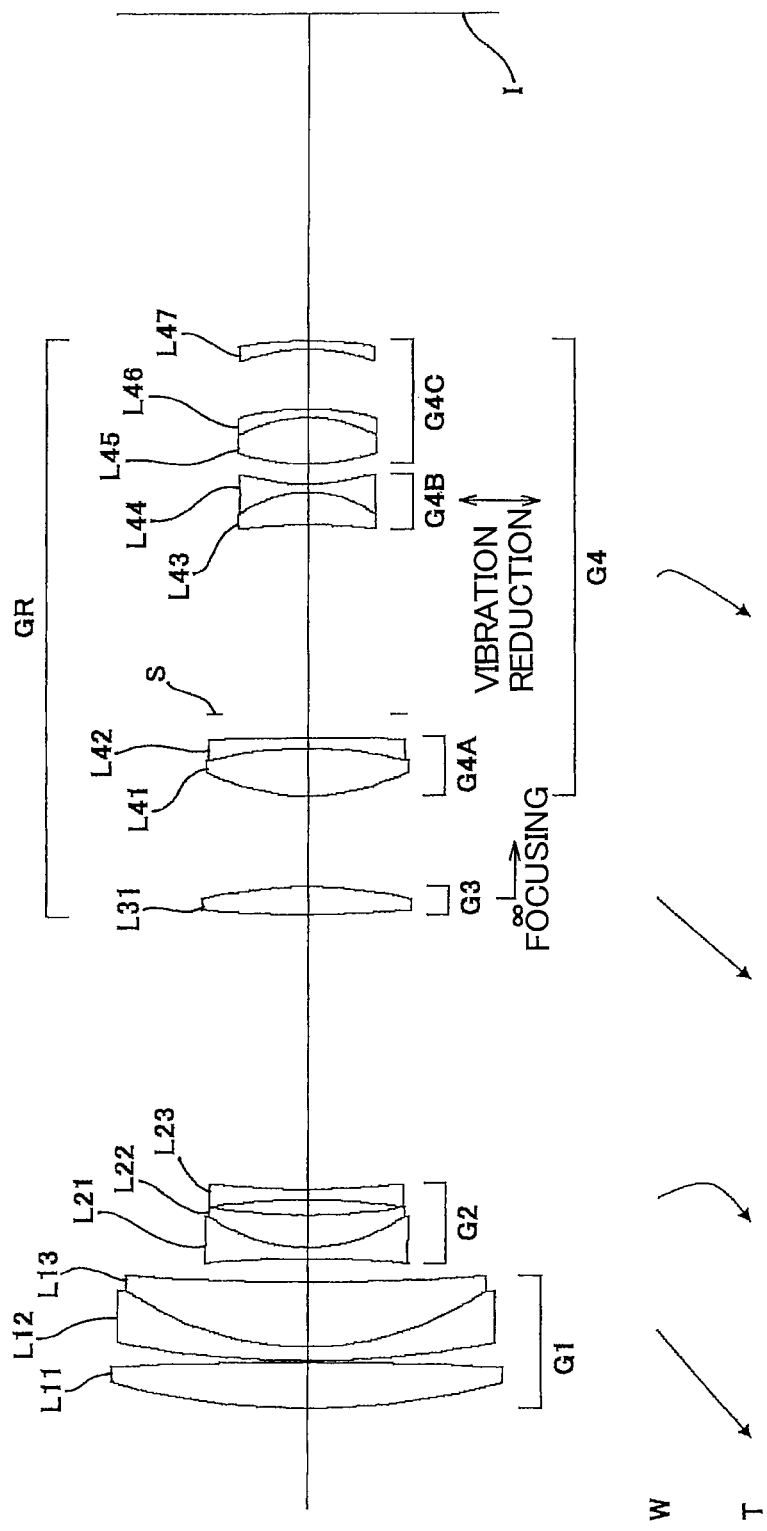
FIG. 17 is a sectional view of a variable magnification optical system according to a Fifth Example.

FIG. 17 is a sectional view showing a configuration of a variable magnification optical system according to the Fifth Example that is common to the first to third embodiments.

The variable magnification optical system according to the Fifth Example is composed of, in order from an object side: a first lens group G1 having positive refractive power, a second lens group G2 having negative refractive power, and a rear group GR having positive refractive power. The rear group GR is composed of, in order from the object side, a third lens group G3 having positive refractive power and a fourth lens group G4 having positive refractive power.

The first lens group G1 consists of, in order from the object side, a double convex positive lens L11 and a cemented positive lens constructed by a negative meniscus lens L12 having a convex surface facing the object side cemented with a positive meniscus lens L13 having a convex surface facing the object side.

The second lens group G2 consists of, in order from the object side, a cemented negative lens constructed by a double concave negative lens L21 cemented with a positive meniscus lens L22 having a convex surface facing the object side, and a double concave negative lens L23.

The third lens group G3 consists of a double convex positive lens L31.

The fourth lens group G4 is composed of, in order from the object side, an A group G4A having positive refractive power, a B group G4B having negative refractive power, and a C group G4C having positive refractive power. Meanwhile, an aperture stop S is disposed between the A group G4A and the B group G4B.

The A group G4A consists of, in order from the object side, a cemented positive lens constructed by a double convex positive lens L41 cemented with a negative meniscus lens L42 having a concave surface facing the object side.

The B group G4B consists of, in order from the object side, a cemented negative lens constructed by a positive meniscus lens L43 having a concave surface facing the object side cemented with a double concave negative lens L44.

The C group G4C consists of, in order from the object side, a cemented positive lens constructed by a double convex positive lens L45 cemented with a negative meniscus lens L46 having a concave surface facing the object side, and a negative meniscus lens L47 having a concave surface facing the object side.

In the variable magnification optical system according to the Fifth Example, upon varying magnification between the wide-angle end state and the telephoto end state, the first to the fourth lens groups G1 to G4 are moved along the optical axis such that a distance between the first lens group G1 and the second lens group G2, a distance between the second lens group G2 and the third lens group G3 and a distance between the third lens group G3 and the fourth lens group G4 are varied.

In the variable magnification optical system according to the Fifth Example, focusing from an infinitely distant object to a close distance object is carried out by moving the third lens group G3 along the optical axis as the focusing group.

In the variable magnification optical system according to the Fifth Example, vibration reduction is carried out by moving the B group G4B as the vibration group to have a component in the direction perpendicular to the optical axis. Meanwhile, upon carrying out vibration reduction, the A group G4A and the C group G4C are fixed at the respective positions in the direction perpendicular to the optical axis.

It is noted here that in the variable magnification optical system according to the Fifth Example, the vibration reduction coefficient is 1.61 and the focal length is 72.10 (mm) in the wide-angle end state, so that the moving amount of the B group G4B for correcting a rotational camera shake of 0.30 degrees is 0.23 (mm). Further, in the telephoto end state, the vibration reduction coefficient is 2.44, and the focal length is 292.00 (mm), so that the moving amount of the B lens group G4B for correcting a rotational camera shake of 0.20 degrees is 0.42 (mm).

Table 5 below shows various values of the variable magnification optical system according to the Fifth Example.

TABLE 5

Fifth Example

[Surface Data]

| Surface number | r | d | nd | vd |
|---|---|---|---|---|
| Object surface | ∞ | | | |
| 1 | 90.0000 | 5.600 | 1.51680 | 63.88 |
| 2 | −517.3850 | 0.200 | | |
| 3 | 123.0815 | 1.700 | 1.62004 | 36.40 |
| 4 | 39.0000 | 7.800 | 1.51680 | 63.88 |
| 5 | 324.1762 | variable | | |
| 6 | −110.0000 | 1.300 | 1.69680 | 55.52 |
| 7 | 21.2201 | 3.957 | 1.84666 | 23.80 |
| 8 | 73.0429 | 1.848 | | |

TABLE 5-continued

Fifth Example

| | | | | |
|---|---|---|---|---|
| 9 | −75.3714 | 1.200 | 1.85026 | 32.35 |
| 10 | 106.1768 | variable | | |
| 11 | 148.9696 | 3.374 | 1.58913 | 61.22 |
| 12 | −56.4978 | variable | | |
| 13 | 28.2564 | 5.746 | 1.49700 | 81.73 |
| 14 | −48.4258 | 1.200 | 1.84666 | 23.80 |
| 15 | −580.3411 | 2.897 | | |
| 16 (Stop S) | ∞ | 23.051 | | |
| 17 | −77.0000 | 3.951 | 1.72825 | 28.38 |
| 18 | −14.4874 | 1.000 | 1.67003 | 47.14 |
| 19 | 29.3362 | 2.500 | | |
| 20 | 29.8903 | 5.510 | 1.62004 | 36.40 |
| 21 | −17.4201 | 1.000 | 1.84666 | 23.80 |
| 22 | −35.2773 | 7.314 | | |
| 23 | −22.7541 | 1.000 | 1.77250 | 49.62 |
| 24 | −46.2730 | BF | | |
| Image plane | ∞ | | | |

[Various Data]
Variable magnification ratio 4.05

| | W | M | T |
|---|---|---|---|
| f | 72.1 | 100.0 | 292.0 |
| FNO | 4.70 | 4.63 | 6.53 |
| 2ω | 22.62 | 16.08 | 5.50 |
| Ymax | 14.25 | 14.25 | 14.25 |
| TL | 169.32 | 187.97 | 221.32 |
| BF | 39.61 | 38.52 | 66.61 |

Infinitely distant

| | | | |
|---|---|---|---|
| d5 | 3.001 | 26.619 | 53.461 |
| d10 | 33.373 | 28.524 | 2.000 |
| d12 | 11.187 | 12.162 | 17.100 |

Close distance

| | | | |
|---|---|---|---|
| d5 | 3.001 | 26.619 | 53.461 |
| d10 | 34.372 | 29.969 | 3.698 |
| d12 | 10.188 | 10.718 | 15.402 |

[Lens Group Data]

| Group | Starting surface | f |
|---|---|---|
| 1 | 1 | 131.155 |
| 2 | 6 | −32.550 |
| 3 | 11 | 69.956 |
| 4 | 13 | 165.331 |

[Values for Conditional Expression]

(1) Dvrw/TLw = 0.153
(2) f1/f3 = 1.902
(3) f3/f4 = 0.417
(4) f4/(−fvr) = 4.755
(5) vFP = 61.22
(6) nN = 1.620
(7) (R2 + R1)/(R2 − R1) = 1.819
(8) DSt/DRt = 0.401

Figure 18A:
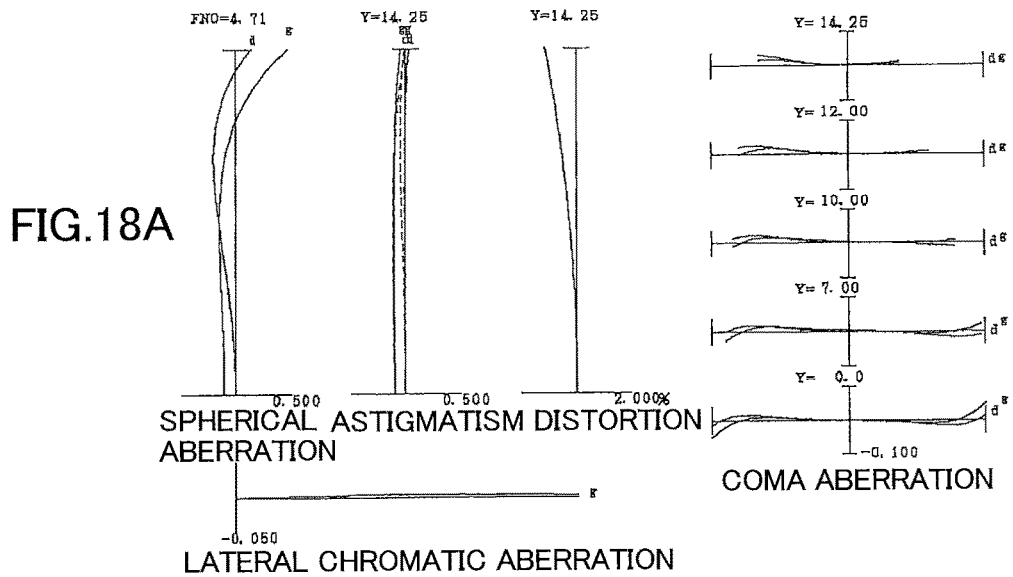
FIGS. 18A, 18B and 18C are graphs showing various aberrations of the variable magnification optical system according to the Fifth Example.
Figure 18B:
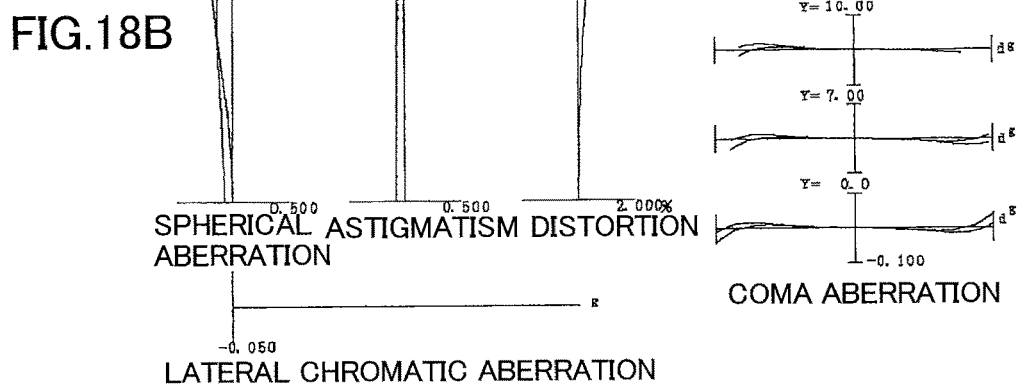
Figure 18C:
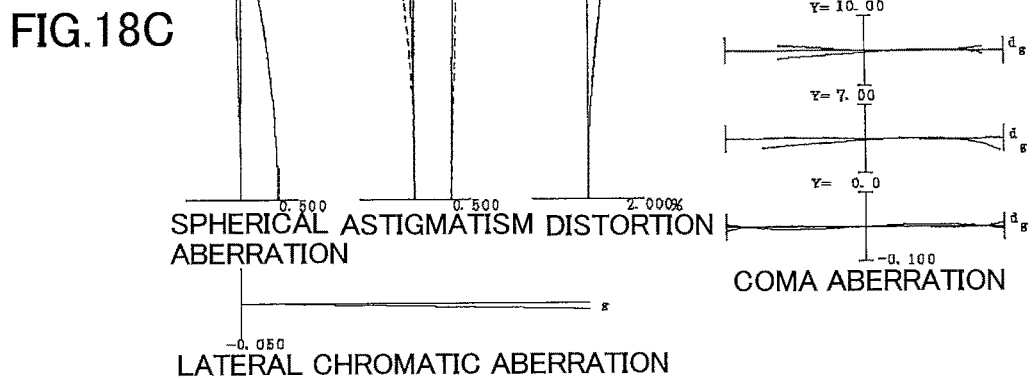

FIGS. 18A, 18B and 18C are graphs showing various aberrations of the variable magnification optical system according to the Fifth Example upon focusing on an infinitely distant object, in which FIG. 18A is in a wide-angle end state, FIG. 18B is in an intermediate focal length state, and FIG. 18C is in a telephoto end state.

Figure 19A:
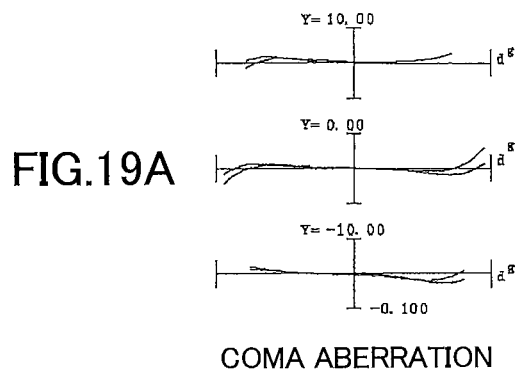
FIGS. 19A and 19E are graphs showing meridional transverse aberrations of the variable magnification optical system according to the Fifth Example.
Figure 19B:
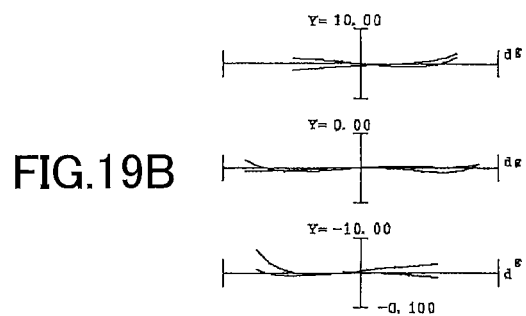

FIGS. 19A and 19B are graphs showing meridional transverse aberration of the variable magnification optical system according to the Fifth Example, in which FIG. 19A is upon focusing on an infinitely distant object with carrying out vibration reduction for a rotation camera shake of 0.30 degrees in the wide-angle end state, FIG. 19B is upon focusing on an infinitely distant object with carrying out vibration reduction for a rotation camera shake of 0.20 degrees in the telephoto end state.

Figure 20A:
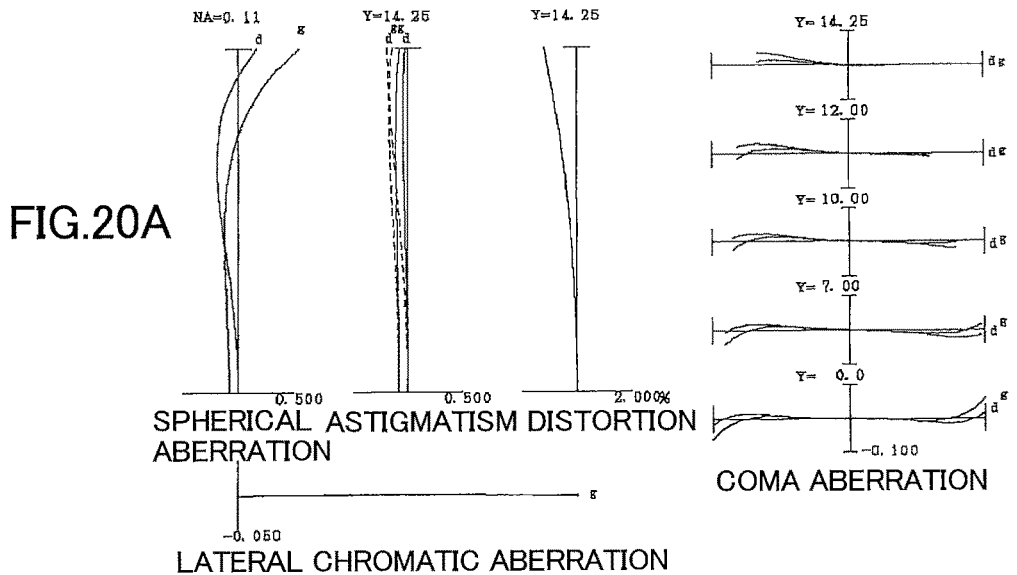
FIGS. 20A, 20B and 20C are graphs showing various aberrations of the variable magnification optical system according to the Fifth Example.
Figure 20B:
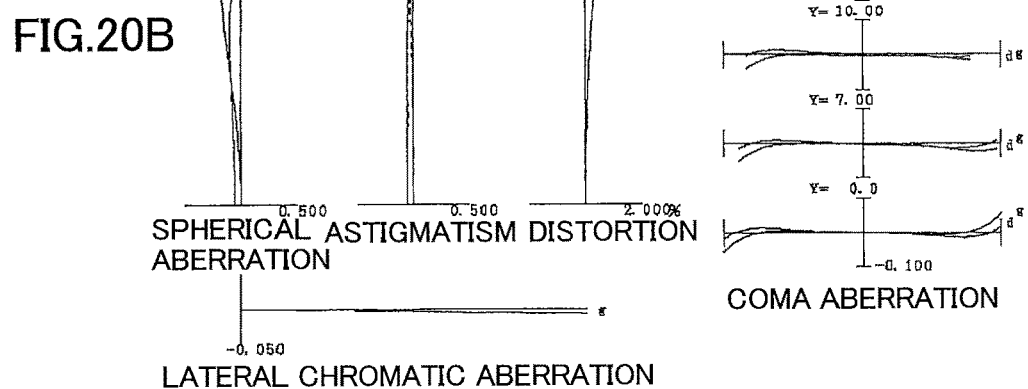
Figure 20C:
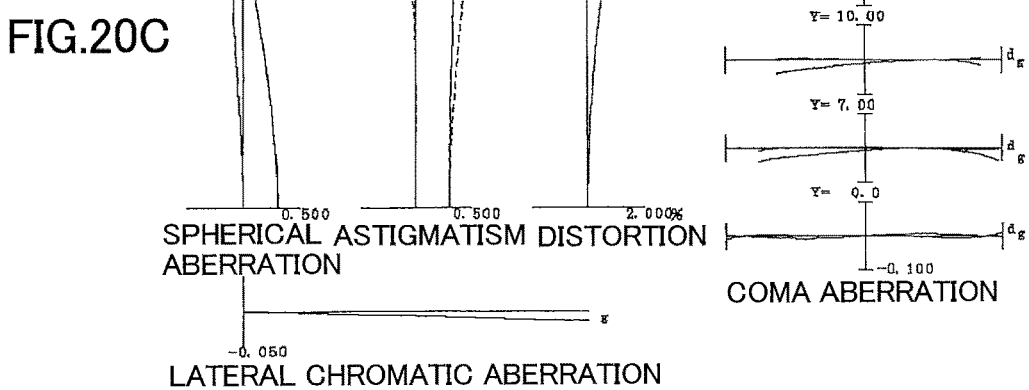

FIGS. 20A, 20B and 20C are graphs showing various aberrations of the variable magnification optical system according to the Fifth Example upon focusing on a close distance object, in which FIG. 20A is in the wide-angle end state, FIG. 20B is in the intermediate focal length state, and FIG. 20C is in the telephoto end state.

As is apparent from the respective graphs, the variable magnification optical system according to the Fifth Example shows superb imaging performance as a result of good corrections to various aberrations in the wide-angle end state to the telephoto end state, and also shows superb imaging performance upon carrying out vibration reduction as well as focusing on a close distance object.

Sixth Example

Figure 21:
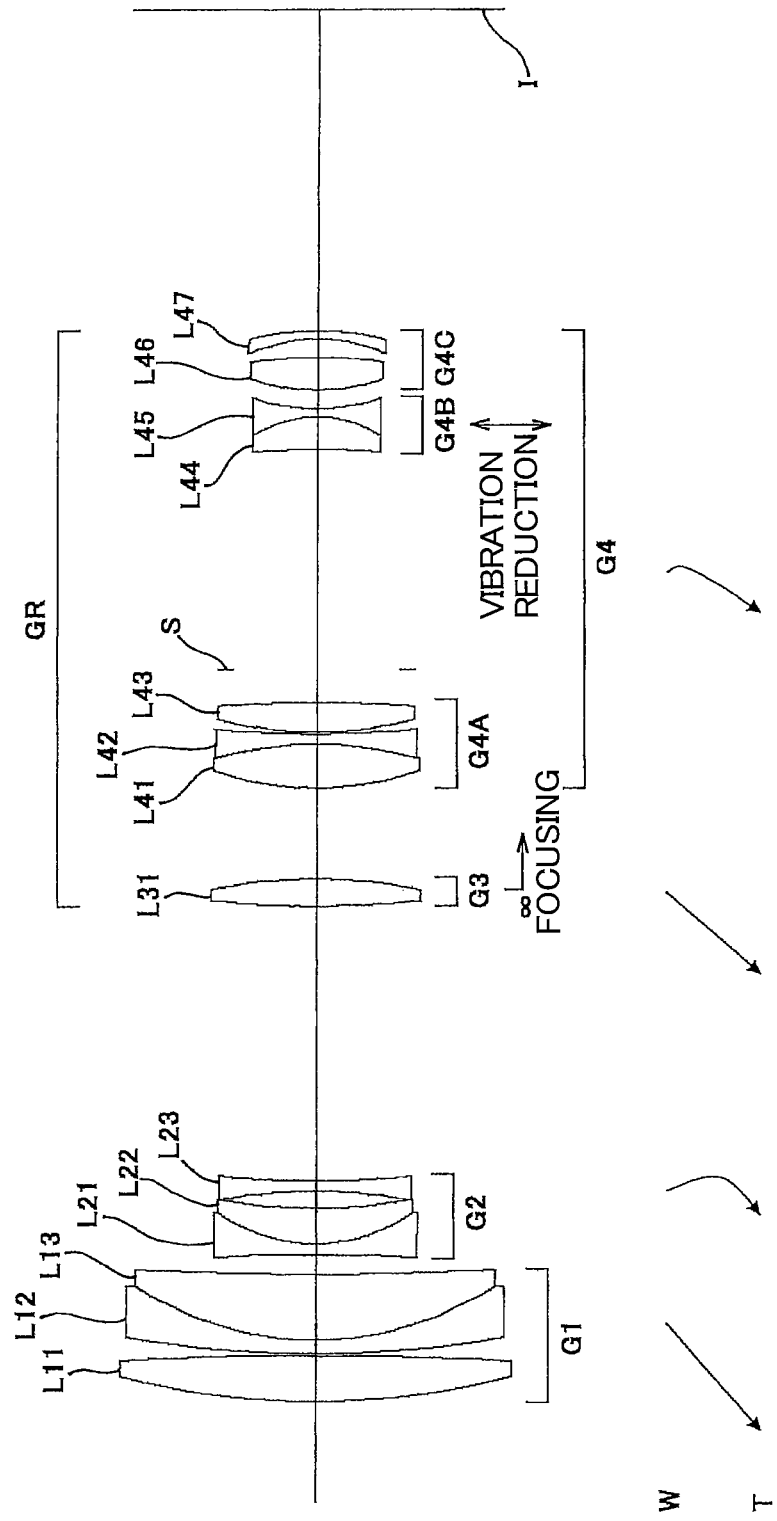
FIG. 21 is a sectional view of a variable magnification optical system according to a Sixth Example.

FIG. 21 is a sectional view showing a configuration of a variable magnification optical system according to the Sixth Example that is common to the first to third embodiments.

The variable magnification optical system according to the Sixth Example is composed of, in order from an object side: a first lens group G1 having positive refractive power, a second lens group G2 having negative refractive power, and a rear group GR having positive refractive power. The rear group GR is composed of, in order from the object side, a third lens group G3 having positive refractive power and a fourth lens group G4 having positive refractive power.

The first lens group G1 consists of, in order from the object side, a double convex positive lens L11 and a cemented positive lens constructed by a negative meniscus lens L12 having a convex surface facing the object side cemented with a positive meniscus lens L13 having a convex surface facing the object side.

The second lens group G2 consists of, in order from the object side, a cemented negative lens constructed by a double concave negative lens L21 cemented with a positive meniscus lens L22 having a convex surface facing the object side, and a double concave negative lens L23.

The third lens group G3 consists of a double convex positive lens L31.

The fourth lens group G4 is composed of, in order from the object side, an A group G4A having positive refractive power, a B group G4B having negative refractive power, and a C group G4C having positive refractive power. Meanwhile, an aperture stop S is disposed between the A group G4A and the B group G4B.

The A group G4A consists of, in order from the object side, a cemented positive lens constructed by a double convex positive lens L41 cemented with a double concave negative lens L42, and a double convex positive lens L43.

The B group G4B consists of, in order from the object side, a cemented negative lens constructed by a negative meniscus lens L44 having a concave surface facing the object side cemented with a double concave negative lens L45.

The C group G4C consists of, in order from the object side, a double convex positive lens L46 and a negative meniscus lens L47 having a concave surface facing the object side.

In the variable magnification optical system according to the Sixth Example, upon varying magnification between the wide-angle end state and the telephoto end state, the first to the fourth lens groups G1 to G4 are moved along the optical axis such that a distance between the first lens group G1 and the second lens group G2, a distance between the second lens group G2 and the third lens group G3 and a distance between the third lens group G3 and the fourth lens group G4 are varied.

In the variable magnification optical system according to the Sixth Example, focusing from an infinitely distant object to a close distance object is carried out by moving the third lens group G3 along the optical axis as the focusing group.

In the variable magnification optical system according to the Sixth Example, vibration reduction is carried out by moving the B group G4B as the vibration group to have a component in a direction perpendicular to the optical axis. Meanwhile, upon carrying out vibration reduction, the A group G4A and the C group G4C are fixed at the respective positions in the direction perpendicular to the optical axis.

It is noted here that in the variable magnification optical system according to the Sixth Example, the vibration reduction coefficient is 1.54 and the focal length is 72.10 (mm) in the wide-angle end state, so that the moving amount of the B group G4B for correcting a rotational camera shake of 0.30 degrees is 0.25 (mm). Further, in the telephoto end state, the vibration reduction coefficient is 2.42, and the focal length is 292.00 (mm), so that the moving amount of the B lens group G4B for correcting a rotational camera shake of 0.20 degrees is 0.42 (mm).

Table 6 below shows various values of the variable magnification optical system according to the Sixth Example.

TABLE 6

Sixth Example

[Surface Data]

| Surface number | r | d | nd | vd |
|---|---|---|---|---|
| Object surface | ∞ | | | |
| 1 | 94.0000 | 5.600 | 1.51680 | 63.88 |
| 2 | −475.5757 | 0.200 | | |
| 3 | 128.0000 | 1.700 | 1.62004 | 36.40 |
| 4 | 39.6000 | 8.000 | 1.51680 | 63.88 |
| 5 | 425.5305 | variable | | |
| 6 | −190.0000 | 1.300 | 1.69680 | 55.52 |
| 7 | 20.4656 | 4.300 | 1.84666 | 23.80 |
| 8 | 66.5049 | 2.063 | | |
| 9 | −61.8359 | 1.200 | 1.85026 | 32.35 |
| 10 | 109.1965 | variable | | |
| 11 | 128.7113 | 3.300 | 1.58913 | 61.22 |
| 12 | −63.7222 | variable | | |
| 13 | 37.0000 | 5.400 | 1.49700 | 81.73 |
| 14 | −45.9212 | 1.300 | 1.85026 | 32.35 |
| 15 | 148.3744 | 0.200 | | |
| 16 | 45.1050 | 3.600 | 1.48749 | 70.31 |
| 17 | −172.8812 | 4.000 | | |
| 18 (Stop S) | ∞ | 26.764 | | |
| 19 | −95.3704 | 3.900 | 1.74950 | 35.25 |
| 20 | −14.2257 | 1.000 | 1.69680 | 55.52 |
| 21 | 24.1570 | 2.279 | | |
| 22 | 26.2427 | 4.000 | 1.62004 | 36.40 |
| 23 | −55.0000 | 2.250 | | |
| 24 | −20.2886 | 1.000 | 1.84666 | 23.80 |
| 25 | −34.0000 | BF | | |
| Image plane | ∞ | | | |

[Various Data]
Variable magnification ratio 4.05

| | W | M | T |
|---|---|---|---|
| f | 72.1 | 100.0 | 292.0 |
| FNO | 4.69 | 4.66 | 6.54 |
| 2ω | 22.56 | 16.04 | 5.50 |
| Ymax | 14.25 | 14.25 | 14.25 |
| TL | 169.32 | 189.24 | 221.32 |
| BF | 38.93 | 38.52 | 65.93 |

TABLE 6-continued

Sixth Example

Infinitely distant

| | | | |
|---|---|---|---|
| d5 | 2.500 | 25.118 | 52.806 |
| d10 | 33.481 | 28.557 | 2.155 |
| d12 | 11.047 | 13.692 | 17.068 |

Close distance

| | | | |
|---|---|---|---|
| d5 | 2.500 | 25.118 | 52.806 |
| d10 | 34.454 | 29.917 | 3.849 |
| d12 | 10.075 | 12.332 | 15.373 |

[Lens Group Data]

| Group | Starting surface | f |
|---|---|---|
| 1 | 1 | 130.472 |
| 2 | 6 | −32.352 |
| 3 | 11 | 72.809 |
| 4 | 13 | 142.608 |

[Values for Conditional Expression]

(1) Dvrw/TLw = 0.182
(2) f1/f3 = 1.792
(3) f3/f4 = 0.511
(4) f4/(−fvr) = 4.779
(5) vFP = 61.22
(6) nN = 1.620
(7) (R2 + R1)/(R2 − R1) = 1.889
(8) DSt/DRt = 0.458

Figure 22A:
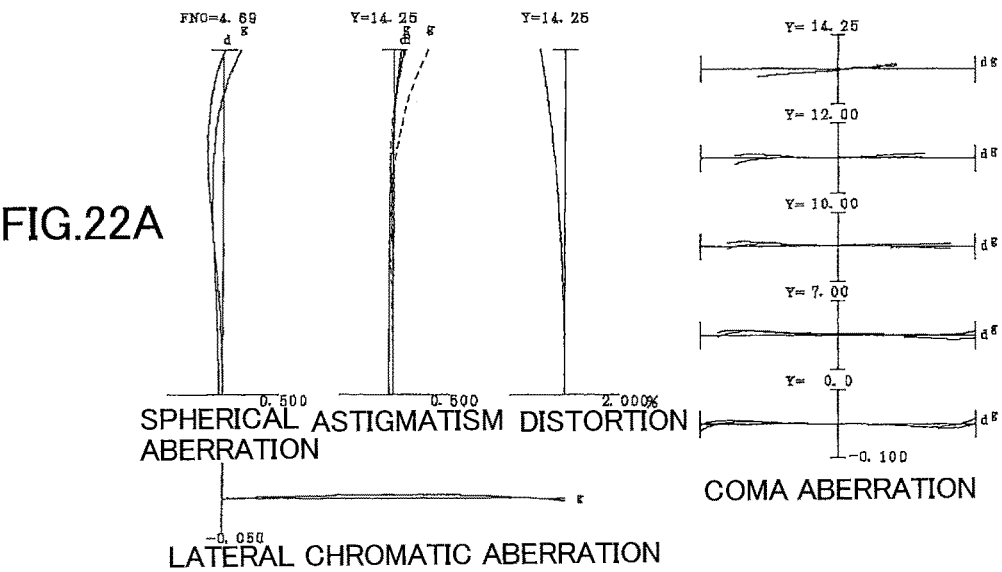
FIGS. 22A, 22B and 22C are graphs showing various aberrations of the variable magnification optical system according to the Sixth Example.
Figure 22B:
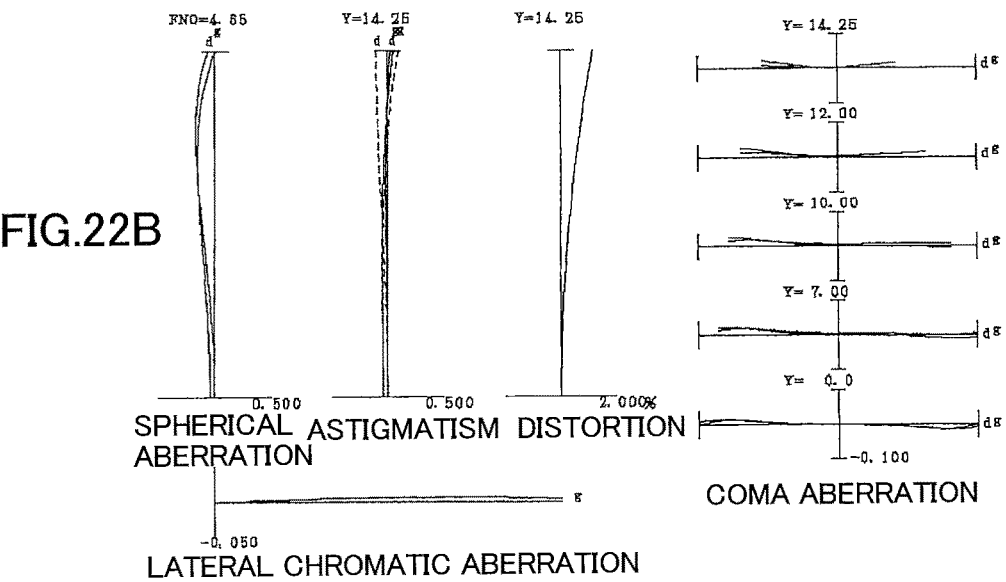
Figure 22C:
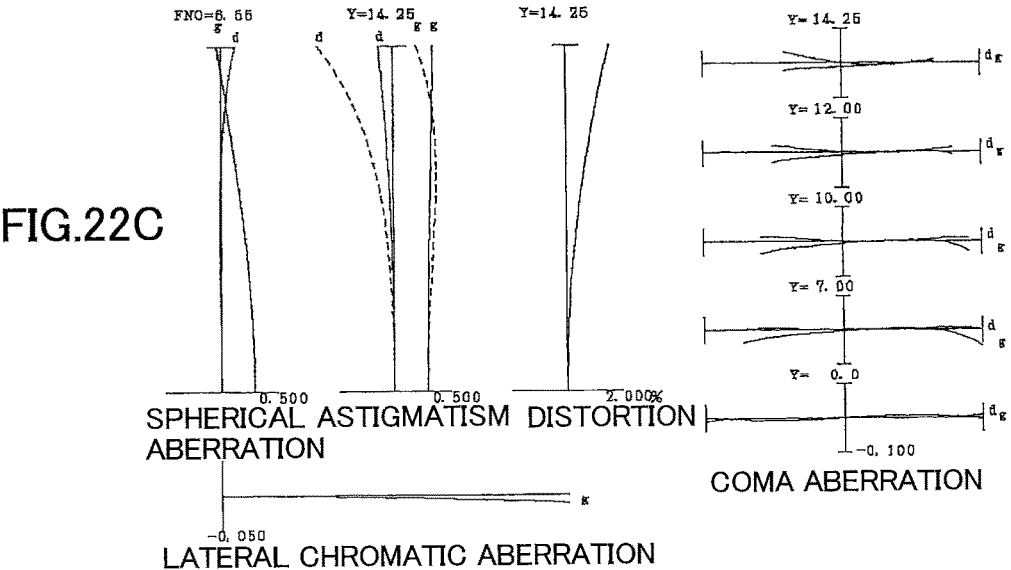

FIGS. 22A, 22B and 22C are graphs showing various aberrations of the variable magnification optical system according to the Sixth Example upon focusing on an infinitely distant object, in which FIG. 22A is in a wide-angle end state, FIG. 22B is in an intermediate focal length state, and FIG. 22C is in a telephoto end state.

Figure 23A:
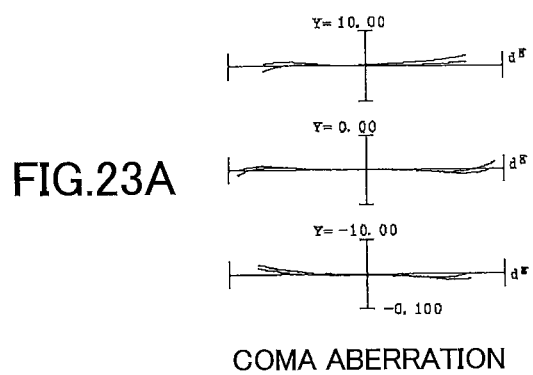
FIGS. 23A and 23B are graphs showing meridional transverse aberrations of the variable magnification optical system according to the Sixth Example.
Figure 23B:
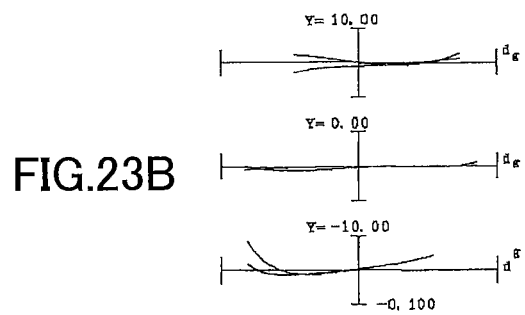

FIGS. 23A and 23B are graphs showing meridional transverse aberration of the variable magnification optical system according to the Sixth Example, in which FIG. 23A is upon focusing on an infinitely distant object with carrying out vibration reduction for a rotation camera shake of 0.30 degrees in the wide-angle end state, FIG. 22B is upon focusing on an infinitely distant object with carrying out vibration reduction for a rotation camera shake of 0.20 degrees in the telephoto end state.

Figure 24A:
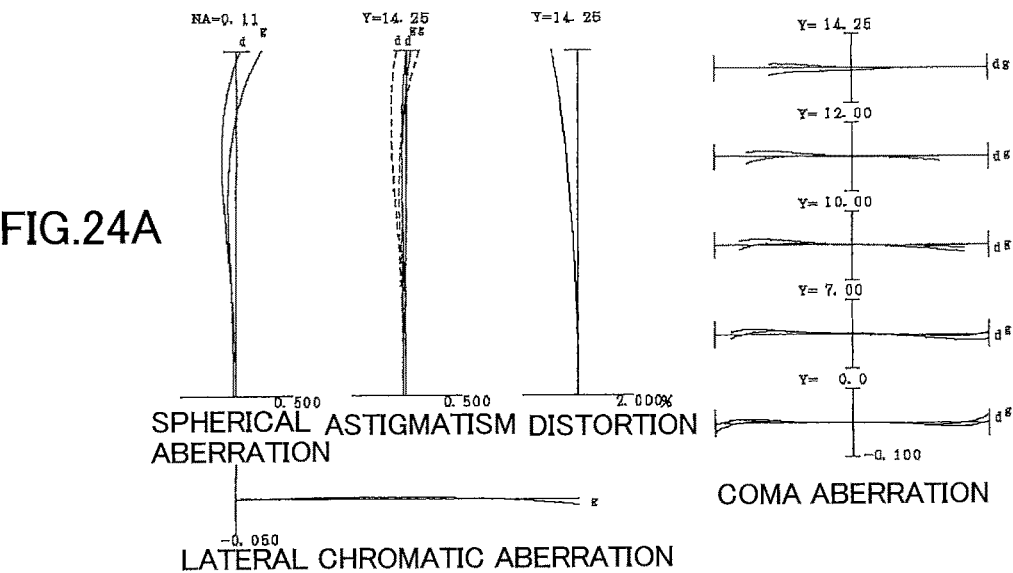
FIGS. 24A, 24B and 24C are graphs showing various aberrations of the variable magnification optical system according to the Sixth Example.
Figure 24B:
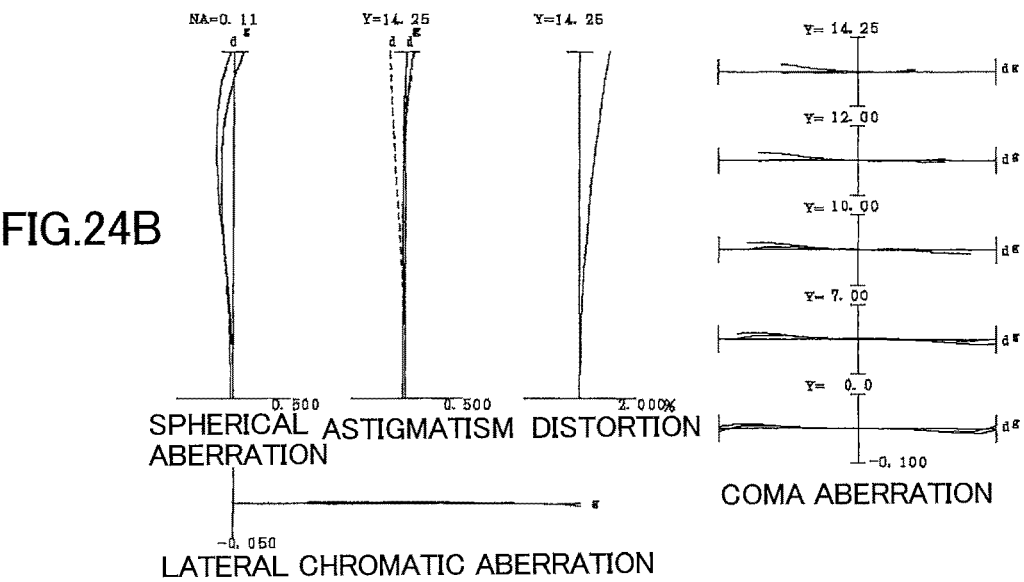
Figure 24C:
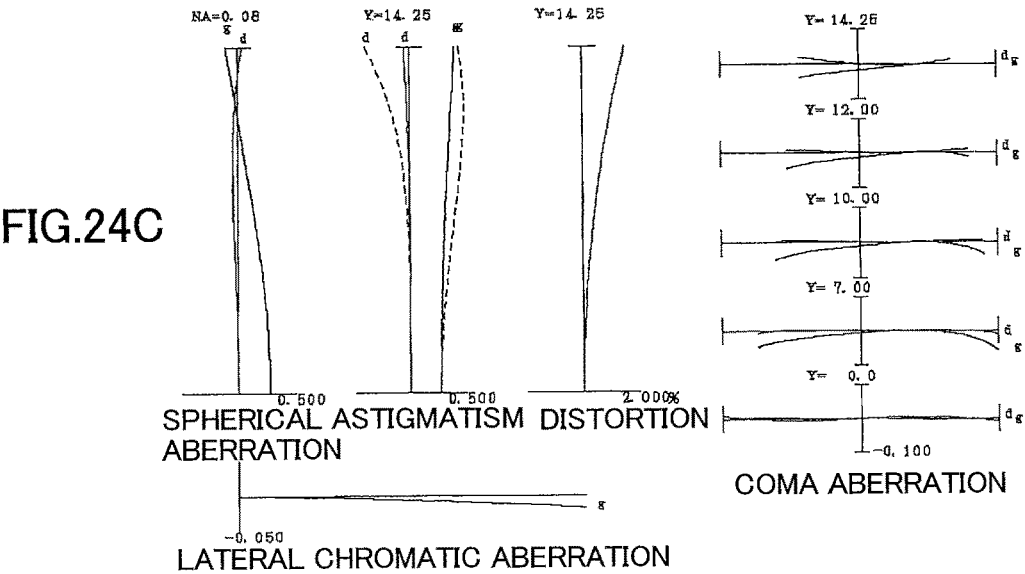

FIGS. 24A, 24B and 24C are graphs showing various aberrations of the variable magnification optical system according to the Sixth Example upon focusing on close distance object, in which FIG. 24A is in the wide-angle end state, FIG. 24B is in the intermediate focal length state, and FIG. 24C is in the telephoto end state.

As is apparent from the respective graphs, the variable magnification optical system according to the Sixth Example shows superb imaging performance as a result of good corrections to various aberrations in the wide-angle end state to the telephoto end state, and also shows superb imaging performance upon carrying out vibration reduction as well as focusing on a close distance object.

Seventh Example

Figure 25:
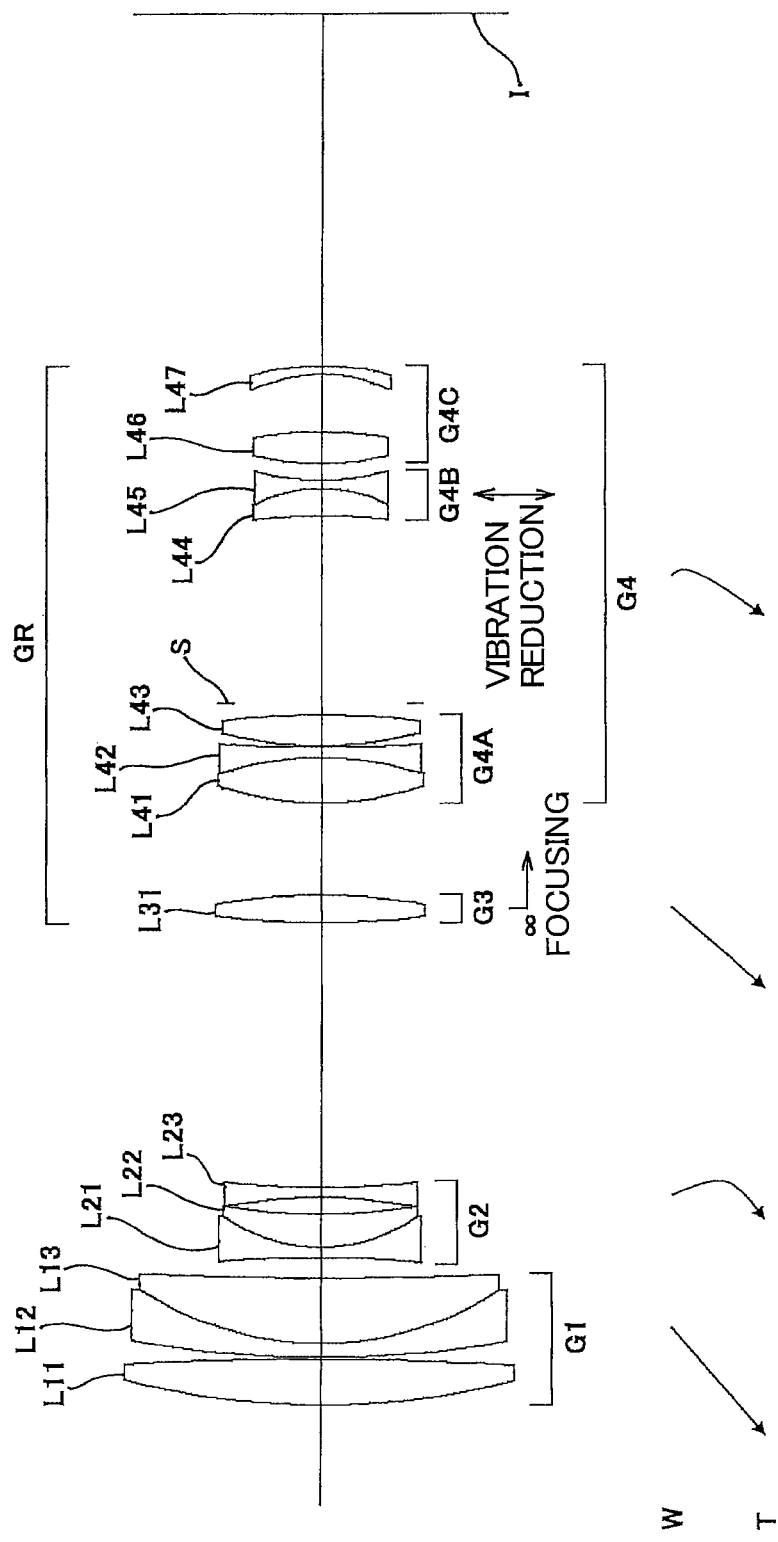
FIG. 25 is a sectional view of a variable magnification optical system according to a Seventh Example.

FIG. 25 is a sectional view showing a configuration of a variable magnification optical system according to the Seventh Example that is common to the first to third embodiments.

The variable magnification optical system according to the Seventh Example is composed of, in order from an object side: a first lens group G1 having positive refractive power, a second lens group G2 having negative refractive power, and a rear group GR having positive refractive power. The rear group GR is composed of, in order from the object side, a third lens group G3 having positive refractive power and a fourth lens group G4 having positive refractive power.

The first lens group G1 consists of, in order from the object side, a double convex positive lens L11 and a cemented positive lens constructed by a negative meniscus lens L12 having a convex surface facing the object side cemented with a positive meniscus lens L13 having a convex surface facing the object side.

The second lens group G2 consists of, in order from the object side, a cemented negative lens constructed by a double concave negative lens L21 cemented with a positive meniscus lens L22 having a convex surface facing the object side, and a double concave negative lens L23.

The third lens group G3 consists of a double convex positive lens L31.

The fourth lens group G4 is composed of, in order from the object side, an A group G4A having positive refractive power, a B group G4B having negative refractive power, and a C group G4C having positive refractive power. Meanwhile, an aperture stop S is disposed between the A group G4A and the B group G4B.

The A group G4A consists of, in order from the object side, a cemented positive lens constructed by a double convex positive lens L41 cemented with a double concave negative lens L42, and a double convex positive lens L43.

The B group G4B consists of, in order from the object side, a cemented negative lens constructed by a positive meniscus lens L44 having a concave surface facing the object side cemented with a double concave negative lens L45.

The C group G4C consists of, in order from the object side, a double convex positive lens L46 and a negative meniscus lens L47 having a concave surface facing the object side.

In the variable magnification optical system according to the Seventh Example, upon varying magnification between the wide-angle end state and the telephoto end state, the first to the fourth lens groups G1 to G4 are moved along the optical axis such that a distance between the first lens group G1 and the second lens group G2, a distance between the second lens group G2 and the third lens group G3 and a distance between the third lens group G3 and the fourth lens group G4 are varied.

In the variable magnification optical system according to the Seventh Example, focusing from an infinitely distant object to a close distance object is carried out by moving the third lens group G3 along the optical axis as the focusing group.

In the variable magnification optical system according to the Seventh Example, vibration reduction is carried out by moving the B group G4B as the vibration group to have a component in a direction perpendicular to the optical axis. Meanwhile, upon carrying out vibration reduction, the A group G4A and the C group G4C are fixed at the respective positions in the direction perpendicular to the optical axis.

It is noted here that in the variable magnification optical system according to the Seventh Example, the vibration reduction coefficient is 1.61 and the focal length is 72.10 (mm) in the wide-angle end state, so that the moving amount of the B group G4B for correcting a rotational camera shake of 0.30 degrees is 0.23 (mm). Further, in the telephoto end state, the vibration reduction coefficient is 2.42, and the focal length is 292.00 (mm), so that the moving amount of the B lens group G4B for correcting a rotational camera shake of 0.20 degrees is 0.42 (mm).

Table 7 below shows various values of the variable magnification optical system according to the Seventh Example.

TABLE 7

Seventh Example

[Surface Data]

| Surface number | r | d | nd | vd |
|---|---|---|---|---|
| Object surface | ∞ | | | |
| 1 | 94.0000 | 5.600 | 1.51680 | 63.88 |
| 2 | −477.1369 | 0.200 | | |
| 3 | 127.9954 | 1.700 | 1.62004 | 36.40 |
| 4 | 39.7182 | 8.000 | 1.51680 | 63.88 |
| 5 | 477.0326 | variable | | |
| 6 | −133.8008 | 1.300 | 1.69680 | 55.52 |
| 7 | 20.5210 | 4.000 | 1.84666 | 23.80 |
| 8 | 68.1000 | 2.028 | | |
| 9 | −63.5000 | 1.200 | 1.85026 | 32.35 |
| 10 | 113.2367 | variable | | |
| 11 | 102.3130 | 3.400 | 1.58913 | 61.22 |
| 12 | −69.1650 | | | |
| 13 | 39.2000 | 5.500 | 1.49700 | 81.73 |
| 14 | −39.2000 | 1.300 | 1.85026 | 32.35 |
| 15 | 209.5771 | 0.200 | | |
| 16 | 50.7811 | 3.700 | 1.48749 | 70.31 |
| 17 | −101.5494 | 1.393 | | |
| 18 (Stop S) | ∞ | 22.905 | | |
| 19 | −80.0000 | 3.300 | 1.80100 | 34.92 |
| 20 | −18.0344 | 1.000 | 1.70000 | 48.11 |
| 21 | 29.8801 | 2.000 | | |
| 22 | 34.2607 | 3.800 | 1.60342 | 38.03 |
| 23 | −54.3498 | 7.014 | | |
| 24 | −20.2978 | 1.000 | 1.77250 | 49.62 |
| 25 | −34.3298 | BF | | |
| Image plane | ∞ | | | |

[Various Data]
Variable magnification ratio 4.05

| | W | M | T |
|---|---|---|---|
| f | 72.1 | 100.0 | 292.0 |
| FNO | 4.71 | 4.68 | 6.51 |
| 2ω | 22.58 | 16.04 | 5.50 |
| Ymax | 14.25 | 14.25 | 14.25 |
| TL | 169.32 | 188.35 | 221.32 |
| BF | 42.82 | 42.30 | 69.82 |
| | Infinitely distant | | |
| d5 | 2.500 | 25.131 | 52.658 |
| d10 | 32.209 | 27.505 | 2.151 |
| d12 | 11.251 | 12.875 | 16.152 |
| | Close distance | | |
| d5 | 2.500 | 25.131 | 52.658 |
| d10 | 33.116 | 28.781 | 3.756 |
| d12 | 10.345 | 11.599 | 14.546 |

[Lens Group Data]

| Group | Starting surface | f |
|---|---|---|
| 1 | 1 | 128.381 |
| 2 | 6 | −31.506 |
| 3 | 11 | 70.567 |
| 4 | 13 | 143.423 |

[Values for Conditional Expression]

(1) Dvrw/TLw = 0.144
(2) f1/f3 = 1.819
(3) f3/f4 = 0.492
(4) f4/(−fvr) = 4.048

TABLE 7-continued

Seventh Example (5) vFP = 61.22
(6) nN = 1.620
(7) (R2 + R1)/(R2 − R1) = 1.863
(8) DSt/DRt = 0.435

Figure 26A:
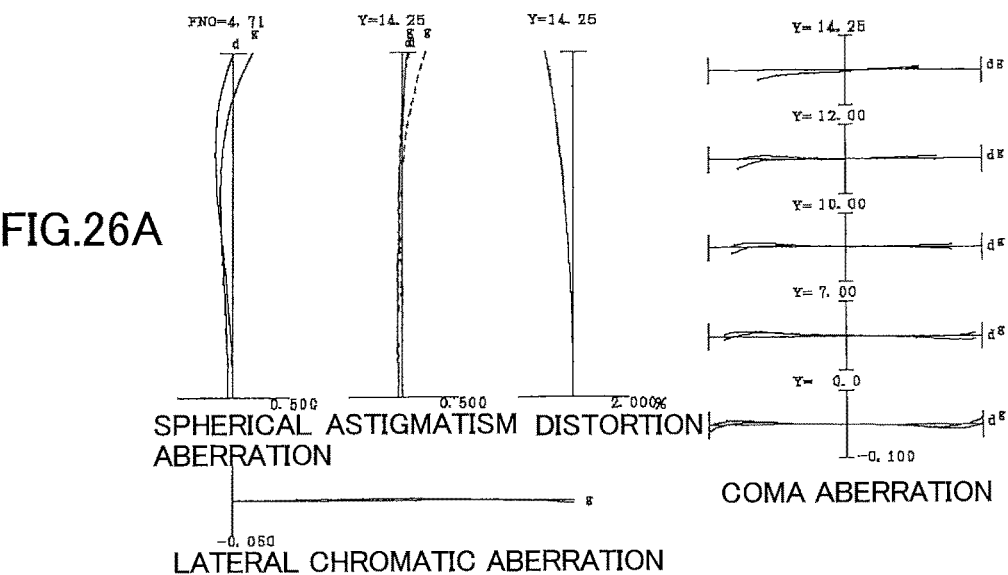
FIGS. 26A, 26B and 26C are graphs showing various aberrations of the variable magnification optical system according to the Seventh Example.
Figure 26B:
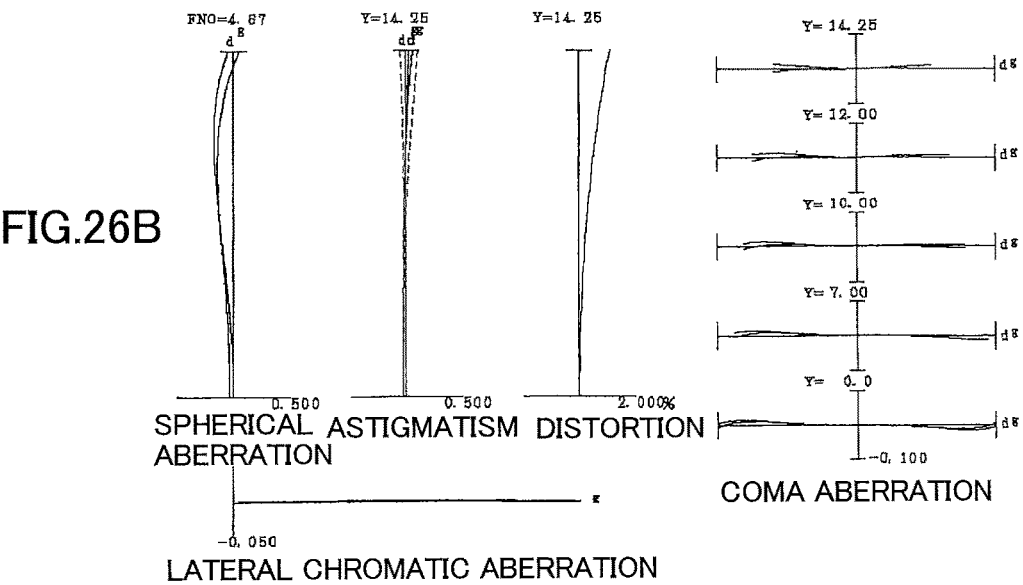
Figure 26C:
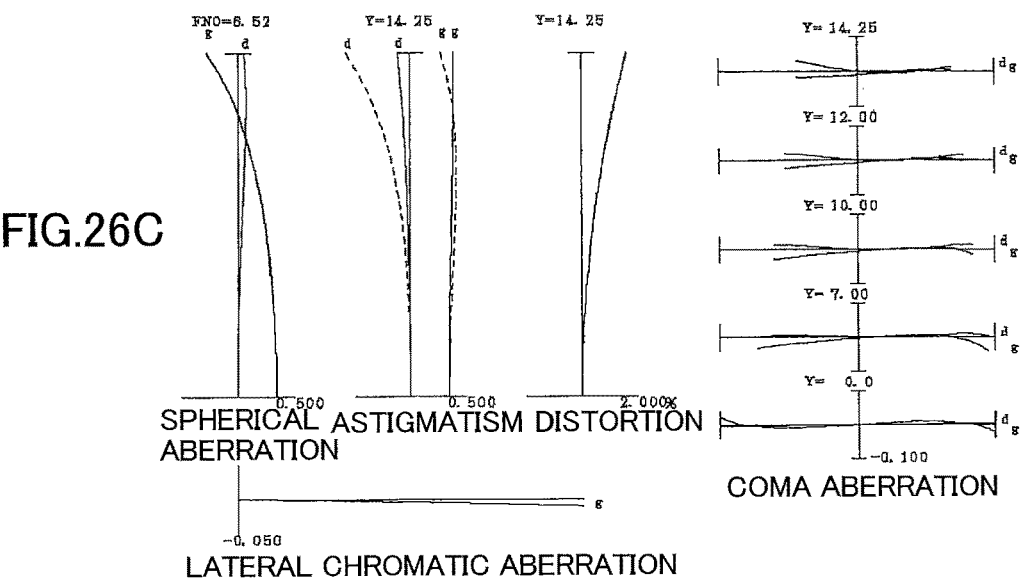

FIGS. 26A, 26B and 26C are graphs showing various aberrations of the variable magnification optical system according to the Seventh Example upon focusing on an infinitely distant object, in which FIG. 26A is in a wide-angle end state, FIG. 26B is in an intermediate focal length state, and FIG. 26C is in a telephoto end state.

Figure 27A:
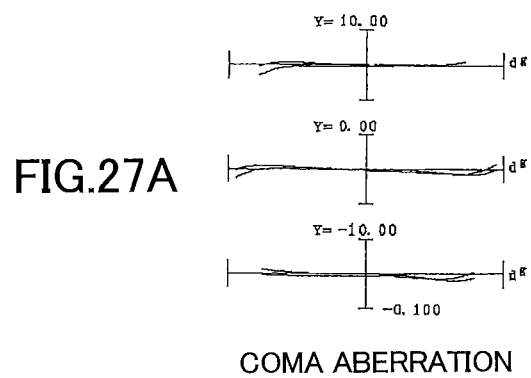
FIGS. 27A and 27B are graphs showing meridional transverse aberrations of the variable magnification optical system according to the Seventh Example.
Figure 27B:
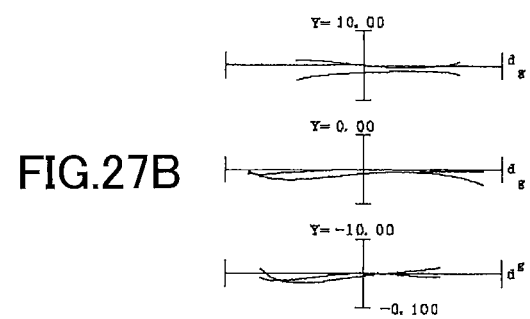

FIGS. 27A and 27B are graphs showing meridional transverse aberration of the variable magnification optical system according to the Seventh Example, in which FIG. 27A is upon focusing on an infinitely distant object with carrying out vibration reduction for a rotation camera shake of 0.30 degrees in the wide-angle end state, FIG. 27B is upon focusing on an infinitely distant object with carrying out vibration reduction for a rotation camera shake of 0.20 degrees in the telephoto end state.

Figure 28A:
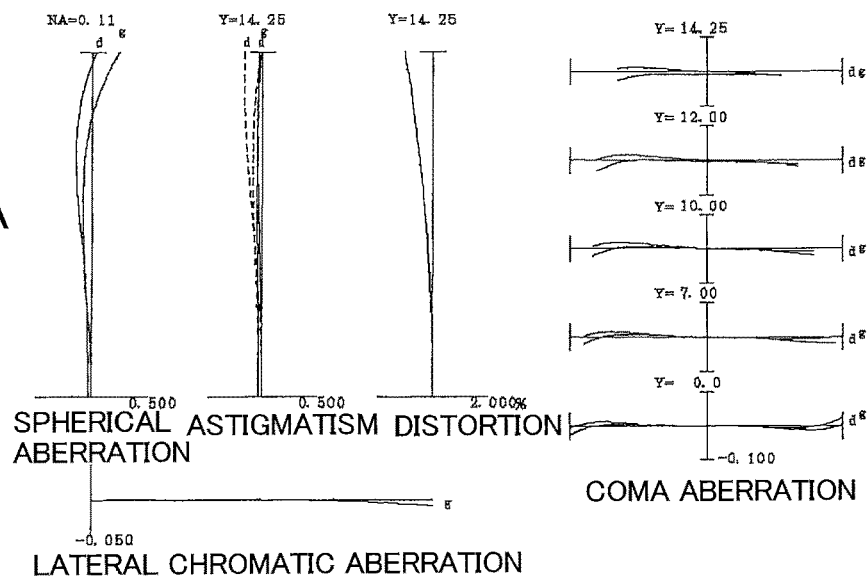
FIGS. 28A, 28B and 28C are graphs showing various aberrations of the variable magnification optical system according to the Seventh Example.
Figure 28B:
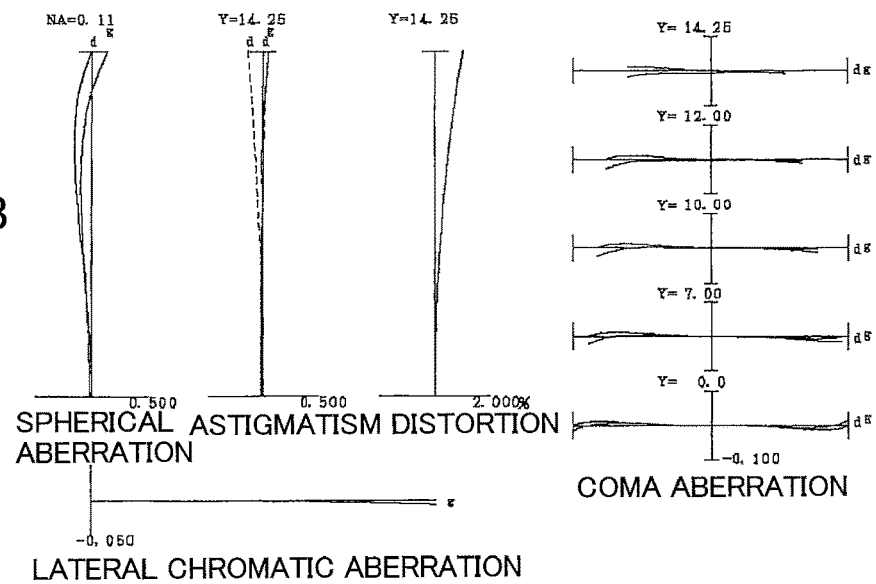
Figure 28C:
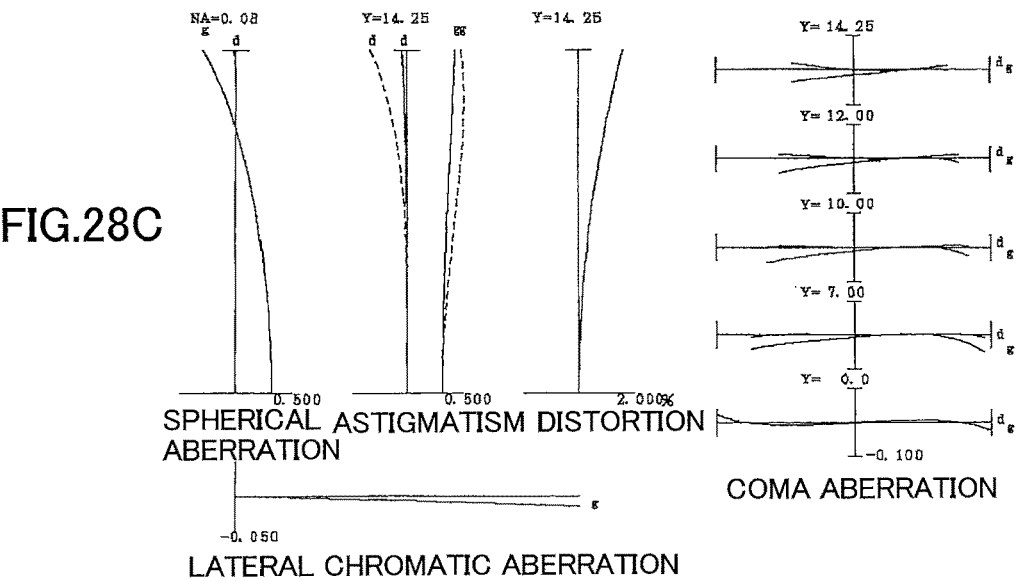

FIGS. 28A, 28B and 28C are graphs showing various aberrations of the variable magnification optical system according to the Seventh Example upon focusing on close distance object, in which FIG. 28A is in the wide-angle end state, FIG. 28B is in the intermediate focal length state, and FIG. 28C is in the telephoto end state.

As is apparent from the respective graphs, the variable magnification optical system according to the Seventh Example shows superb imaging performance as a result of good corrections to various aberrations in the wide-angle end state to the telephoto end state, and also shows superb imaging performance upon carrying out vibration reduction as well as focusing on a close distance object.

Eighth Example

FIG. 29 is a sectional view showing a configuration of a variable magnification optical system according to the Eighth Example that is common to the first to third embodiments.

The variable magnification optical system according to the Eighth Example is composed of, in order from an object side: a first lens group G1 having positive refractive power, a second lens group G2 having negative refractive power, and a rear group GR having positive refractive power. The rear group GR is composed of, in order from the object side, a third lens group G3 having positive refractive power, a fourth lens group G4 having positive refractive power and a fifth lens group G5 having negative refractive power.

The first lens group G1 consists of, in order from the object side, a double convex positive lens L11, and a cemented positive lens constructed by a negative meniscus lens L12 having a convex surface facing the object side cemented with a positive meniscus lens L13 having a convex surface facing the object side.

The second lens group G2 consists of, in order from the object side, a cemented negative lens constructed by a double concave negative lens L21 cemented with a positive meniscus lens L22 having a convex surface facing the object side, and a double concave negative lens L23.

The third lens group G3 consists of a double convex positive lens L31.

The fourth lens group G4 is composed of, in order from the object side, an A group G4A having positive refractive power, a B group G4B having negative refractive power, and a C group G4C having positive refractive power. Meanwhile, an aperture stop S is disposed between the A group G4A and the B group G4B.

The A group G4A consists of, in order from the object side, a cemented positive lens constructed by a double convex positive lens L41 cemented with a double concave negative lens L42, and a double convex positive lens L43.

The B group G4B consists of, in order from the object side, a cemented negative lens constructed by a positive meniscus lens L44 having a concave surface facing the object side cemented with a double concave negative lens L45.

The C group G4C consists of a double convex positive lens L46.

The fifth lens group G5 consists of a negative meniscus lens L51 having a concave surface facing the object side.

In the variable magnification optical system according to the Eighth Example, upon varying magnification between the wide-angle end state and the telephoto end state, the first to the fifth lens groups G1 to G5 are moved along the optical axis such that a distance between the first lens group G1 and the second lens group G2, a distance between the second lens group G2 and the third lens group G3, a distance between the third lens group G3 and the fourth lens group G4 and a distance between the fourth lens group G4 and the fifth lens group G5 are varied.

In the variable magnification optical system according to the Eighth Example, focusing from an infinitely distant object to a close distance object is carried out by moving the third lens group G3 along the optical axis as the focusing group.

In the variable magnification optical system according to the Eighth Example, vibration reduction is carried out by moving the B group G4B as the vibration group to have a component in the direction perpendicular to the optical axis. Meanwhile, upon carrying out vibration reduction, the A group G4A and the C group G4C are fixed at the respective positions in the direction perpendicular to the optical axis.

It is noted here that in the variable magnification optical system according to the Eighth Example, the vibration reduction coefficient is 1.62 and the focal length is 72.10 (mm) in the wide-angle end state, so that the moving amount of the B group G4B for correcting a rotational camera shake of 0.30 degrees is 0.23 (mm). Further, in the telephoto end state, the vibration reduction coefficient is 2.42, and the focal length is 292.00 (mm), so that the moving amount of the B lens group G4B for correcting a rotational camera shake of 0.20 degrees is 0.42 (mm).

Table 8 below shows various values of the variable magnification optical system according to the Eighth Example.

TABLE 8

Eighth Example

[Surface Data]

| Surface number | r | d | nd | vd |
| --- | --- | --- | --- | --- |
| Object surface | ∞ | | | |
| 1 | 94.0000 | 5.600 | 1.51680 | 63.88 |
| 2 | −475.1178 | 0.200 | | |
| 3 | 128.0000 | 1.700 | 1.62004 | 36.40 |
| 4 | 39.6000 | 8.000 | 1.51680 | 63.88 |
| 5 | 485.7465 | variable | | |
| 6 | −132.5210 | 1.300 | 1.69680 | 55.52 |
| 7 | 20.5172 | 4.000 | 1.84666 | 23.80 |

TABLE 8-continued

Eighth Example

| | | | | |
| --- | --- | --- | --- | --- |
| 8 | 68.1000 | 2.042 | | |
| 9 | −63.5000 | 1.200 | 1.85026 | 32.35 |
| 10 | 115.6235 | variable | | |
| 11 | 101.8918 | 3.400 | 1.58913 | 61.22 |
| 12 | −69.9544 | variable | | |
| 13 | 39.2000 | 5.500 | 1.49700 | 81.73 |
| 14 | −39.2000 | 1.300 | 1.85026 | 32.35 |
| 15 | 212.6596 | 0.200 | | |
| 16 | 51.4164 | 3.700 | 1.48749 | 70.31 |
| 17 | −99.0728 | 1.373 | | |
| 18 (Stop S) | ∞ | 23.152 | | |
| 19 | −80.0000 | 3.300 | 1.80100 | 34.92 |
| 20 | −17.8244 | 1.000 | 1.70000 | 48.11 |
| 21 | 29.4302 | 2.000 | | |
| 22 | 34.1234 | 3.800 | 1.60342 | 38.03 |
| 23 | −54.6969 | variable | | |
| 24 | −20.3466 | 1.000 | 1.77250 | 49.62 |
| 25 | −34.1069 | BF | | |
| Image plane | ∞ | | | |

[Various Data]
Variable magnification ratio 4.05

| | W | M | T |
| --- | --- | --- | --- |
| f | 72.1 | 100.0 | 292.0 |
| FNO | 4.71 | 4.69 | 6.49 |
| 2ω | 22.58 | 16.06 | 5.50 |
| Ymax | 14.25 | 14.25 | 14.25 |
| TL | 169.32 | 188.16 | 221.32 |
| BF | 43.07 | 42.89 | 70.02 |

Infinitely distant

| | | | |
| --- | --- | --- | --- |
| d5 | 2.500 | 24.944 | 52.518 |
| d10 | 32.517 | 27.845 | 2.150 |
| d12 | 10.875 | 12.288 | 16.347 |
| d23 | 6.586 | 6.430 | 6.515 |

Close distance

| | | | |
| --- | --- | --- | --- |
| d5 | 2.500 | 24.944 | 52.518 |
| d10 | 33.434 | 29.131 | 3.779 |
| d12 | 9.958 | 11.001 | 14.718 |
| d23 | 6.586 | 6.430 | 6.515 |

[Lens Group Data]

| Group | Starting surface | f |
| --- | --- | --- |
| 1 | 1 | 128.138 |
| 2 | 6 | −31.607 |
| 3 | 11 | 70.925 |
| 4 | 13 | 71.734 |
| 5 | 24 | −67.420 |

[Values for Conditional Expression]
[Values for Conditional Expression]

(1) Dvrw/TLw = 0.145
(2) f1/f3 = 1.807
(3) f3/f4 = 0.989
(4) f4/(−fvr) = 2.046
(5) νFP = 61.22
(6) nN = 1.620
(7) (R2 + R1)/(R2 − R1) = 1.862
(8) DSt/DRt = 0.438

Figure 30A:
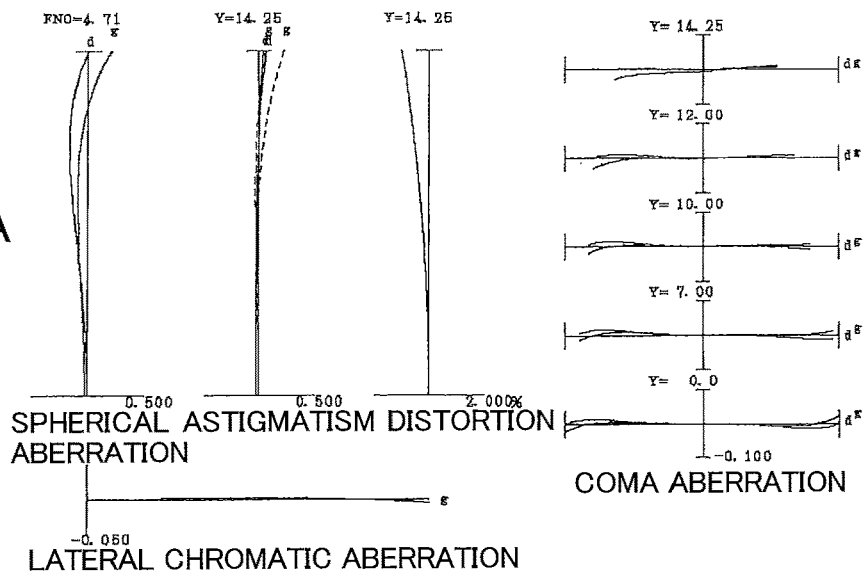
FIGS. 30A, 30B and 30C are graphs showing various aberrations of the variable magnification optical system according to the Eighth Example.
Figure 30B:
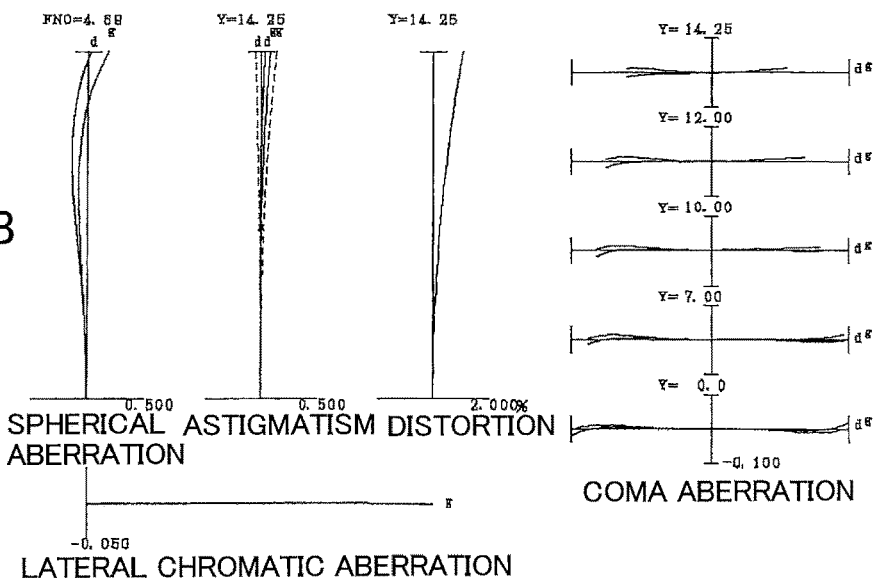
Figure 30C:
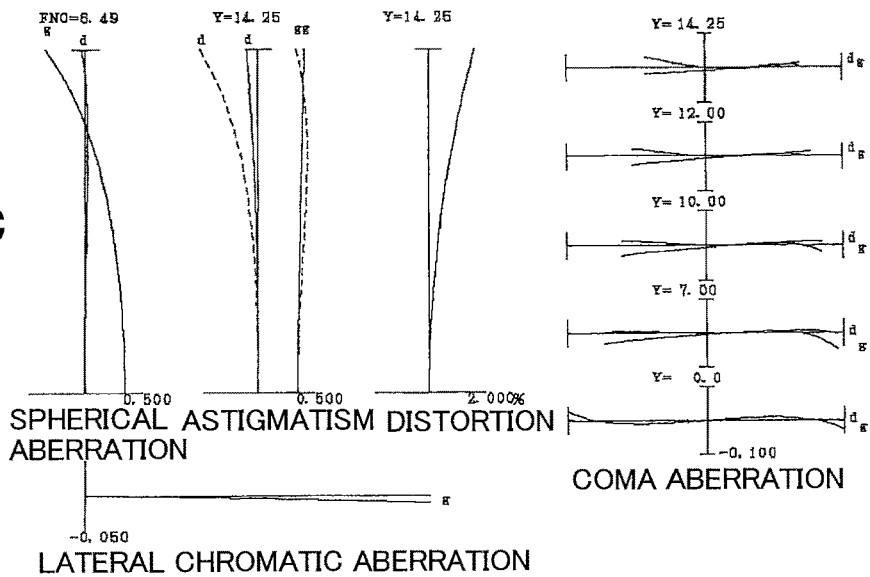

FIGS. 30A, 30B and 308C are graphs showing various aberrations of the variable magnification optical system according to the Eighth Example upon focusing on an infinitely distant object, in which FIG. 30A is in a wide-angle end state, FIG. 30B is in an intermediate focal length state, and FIG. 30C is in a telephoto end state.

FIGS. 31A and 31B are graphs showing meridional transverse aberration of the variable magnification optical system according to the Eighth Example, in which FIG. 31A is upon focusing on an infinitely distant object with carrying out vibration reduction for a rotation camera shake of 0.30 degrees in the wide-angle end state, FIG. 31B is upon focusing on an infinitely distant object with carrying out vibration reduction for a rotation camera shake of 0.20 degrees in the telephoto end state.

Figure 32A:
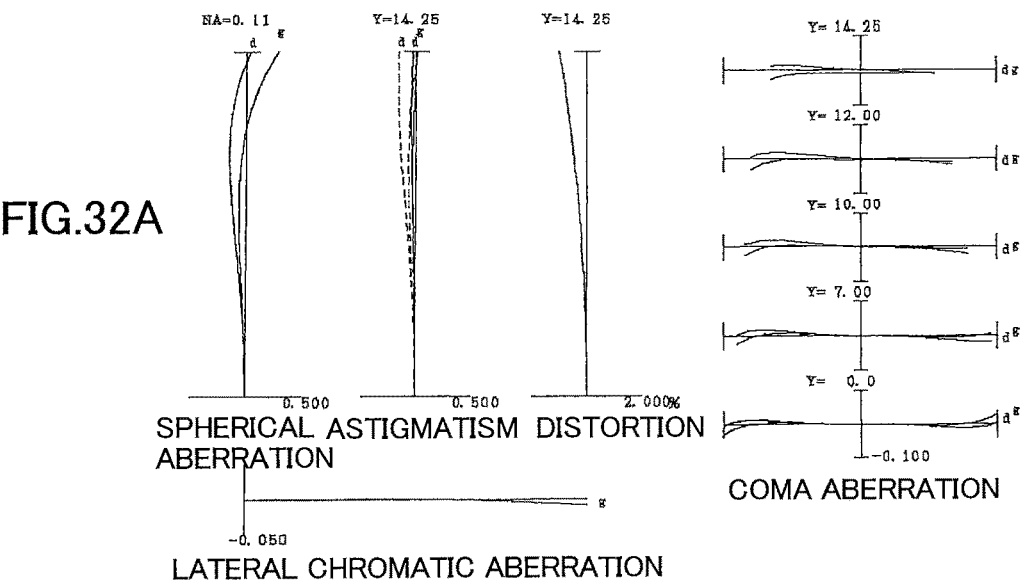
FIGS. 32A, 32B and 32C are graphs showing various aberrations of the variable magnification optical system according to the Eighth Example.
Figure 32B:
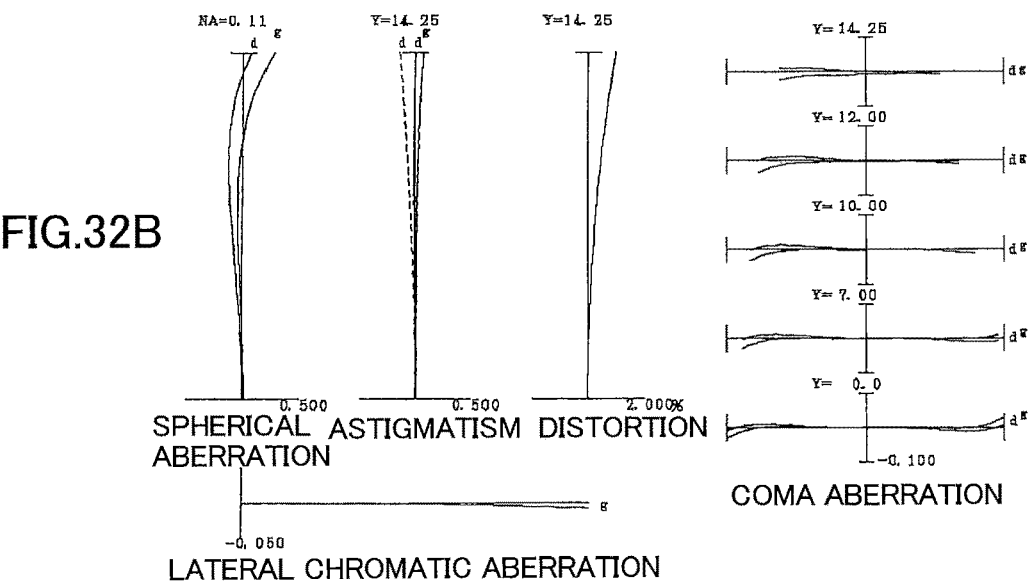
Figure 32C:
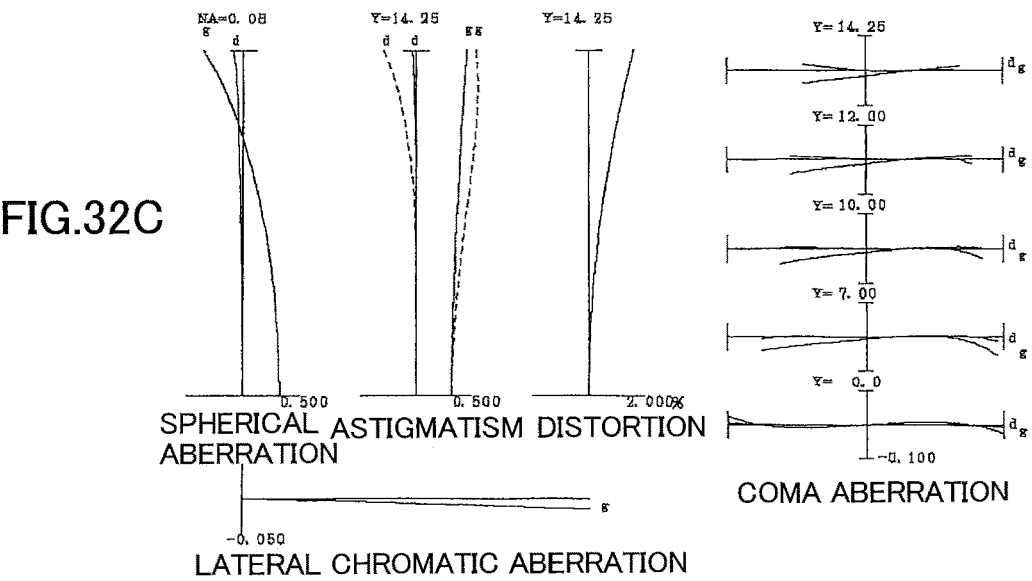

FIGS. 32A, 32B and 32C are graphs showing various aberrations of the variable magnification optical system according to the Eighth Example upon focusing on close distance object, in which FIG. 32A is in the wide-angle end state, FIG. 32B is in the intermediate focal length state, and FIG. 32C is in the telephoto end state.

As is apparent from the respective graphs showing aberrations, the variable magnification optical system according to the Eighth Example shows superb imaging performance as a result of good corrections to various aberrations in the wide-angle end state to the telephoto end state, and also shows superb imaging performance upon carrying out vibration reduction as well as focusing on a close distance object.

According to each Example described above, it is possible to realize a variable magnification optical system which can suppress superbly variations in various aberrations upon varying magnification from the wide angle end state to the telephoto end state and variations in various aberrations upon carrying out focusing from an infinitely distant object to a close distance object, thereby attaining a focusing group that is down-sized and reduced in weight. By down-sizing and reducing in weight the focusing group, the focusing group can be driven by a compact motor as well as a compact mechanism, so it is possible to attain high speed and quiet focusing operation without making a lens barrel to be large-sized.

Incidentally, it is noted that each of the above described Examples is a concrete example of the present invention, and the present invention is not limited to them. The contents described below can be adopted without deteriorating optical performance of the variable magnification optical systems according to the first to the third embodiments.

Although the Examples of the variable magnification optical systems, having 4 group or 5 group configuration, were illustrated above as examples of the variable magnification optical systems according to the first to the third embodiments, the present application is not limited to them and variable magnification optical systems having other configurations (for example, a 6 group configuration and the like) can be configured. Concretely, a lens configuration that a lens or a lens group is added to the most object side or the most image side of the variable magnification optical system of each Example described above is possible.

Further, a configuration consisting of a positive third lens group and a positive fourth lens group and a configuration consisting of a positive third lens group, a positive fourth lens group and a negative fifth lens group are illustrated as the rear lens groups in the variable magnification optical system according to the first to the third embodiments, but are not limited thereto. For example, the rear group may have a configuration consisting of a positive third lens group, a positive fourth lens group and a positive fifth lens group, or a configuration comprising a negative third lens group and a positive fourth lens group. Further, the rear group may be preferably a configuration in which the focusing group is disposed at the most object side, but not limited thereto. Further, it is preferable that, in the rear group, vibration reduction group is disposed at the image side of the focusing group, and it is more preferable that, in the rear group, other lens (es) is(are) disposed between the focusing group and the vibration reduction group. Further, in a case where other lens(es) is (are) disposed between the focusing group and the vibration reduction group, an air distance between a lens opposed to an object side of the vibration reduction group and the vibration reduction group is largest among air distances in the rear group.

Further, it is preferable that in the rear group an aperture stop is disposed between the focusing group and the vibration reduction group, and it is more preferable that the aperture stop is disposed in a position opposed to the object side of the vibration reduction group. Meanwhile, a lens frame may substitute for a member as the aperture stop.

It is possible also to combine properly some portions of the respective Examples.

Further, in the variable magnification optical system according to each Example described above, the third lens group in the entirety thereof is made to be a focusing group. However, a portion of a lens group, or a plurality of lens groups can be made as a focusing lens group. Further, it is preferable that the focusing group has positive refractive power. Further, the focusing group may be composed of one or two lens components, and it is more preferable that the focusing group consists of one lens component. Such focusing group can be used for auto focus, and suitable for being driven by a motor for auto focus such as an ultrasonic motor, stepping motor and a VCM motor.

Further, in the variable magnification optical system according to each Example described above, any lens group in the entirety thereof or a portion thereof can be so moved, as a vibration reduction lens group, to have a component in a direction perpendicular to the optical axis, or rotationally moved (swayed) in an intra-plane direction including the optical axis to carry out vibration reduction. Particularly, in the variable magnification optical system according to each Example described above, it is preferable that the B group is used as a vibration reduction group. There is no particular limitation with respect to the number or shape of lenses for the vibration reduction group. It is preferable that the vibration reduction group has negative refractive power. Further, it is preferable that the vibration reduction group consists of a portion of one lens group, and it is more preferable that the vibration reduction group consists of a central portion of three portions divided out of one lens group. Furthermore, it is preferable that the vibration reduction group consists of a central negative portion of three positive negative positive or positive negative portions divided out of one lens group.

Further, the lens surface(s) of the lenses configuring the variable magnification optical system according to each Example described above, may be a spherical surface, a plane surface, or an aspherical surface. Each lens may be formed of glass material, resin material, or a composite of glass and resin. When a lens surface is a spherical surface or a plane surface, lens processing, assembling and adjustment become easy, and it is possible to prevent deterioration in optical performance caused by errors in lens processing, assembling and adjustment, so that it is preferable. Moreover, even if an image plane is shifted, deterioration in representation performance is little, so that it is preferable. When a lens surface is an aspherical surface, the aspherical surface may be fabricated by a grinding process, a glass molding process that a glass material is formed into an aspherical shape by a mold, or a compound type process that a resin material on a glass lens surface is formed into an aspherical shape. A lens surface may be a diffractive optical surface, and a lens may be a graded-index type lens (GRIN lens) or a plastic lens.

Moreover, the lens surface(s) of the lenses configuring the variable magnification optical system according to each Example described above, may be coated with anti-reflection coating(s). With this contrivance, it is feasible to reduce a flare as well as ghost and attain a high optical performance with high contrast. In particular, it is preferable that, in the variable magnification optical system according to each Example described above, the object side lens surface of the second lens counted from the most object side is coated with anti-reflection coating.

Next, a camera equipped with the variable magnification optical system according to the first to the third embodiments, will be explained with referring to FIG. 33.

Figure 33:
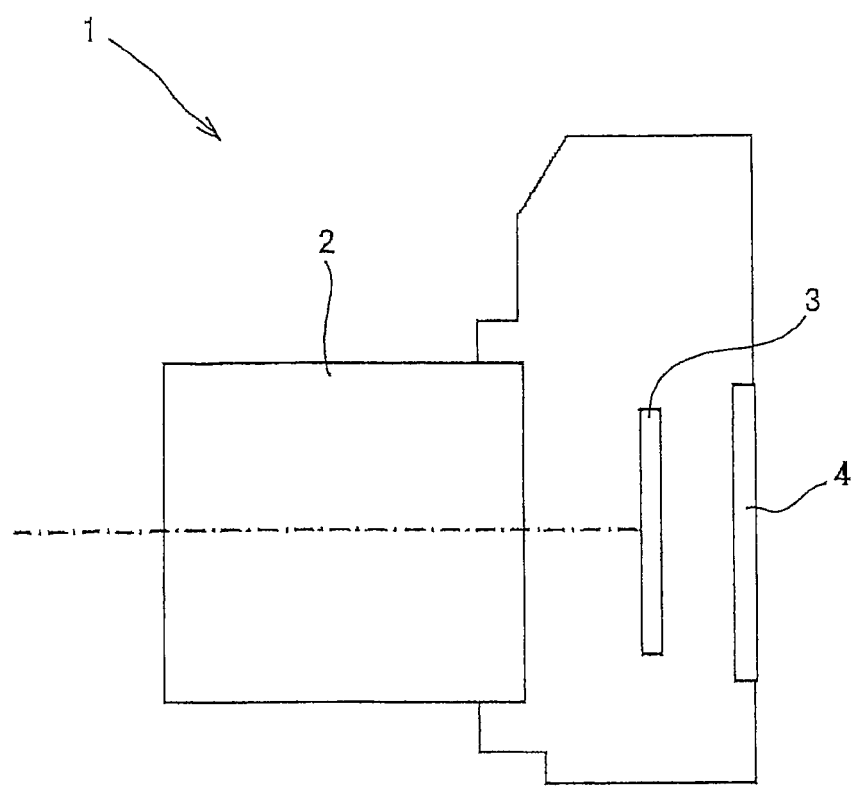
FIG. 33 shows a configuration of a camera equipped with the variable magnification optical system.

FIG. 33 shows a configuration of a camera equipped with the variable magnification optical system according to the first to the third embodiments.

The camera 1 as shown in FIG. 33 is a lens changeable type, so-called mirrorless camera equipped with the variable magnification optical system according to the First Example as an imaging lens 2.

In the present camera 1, light emitted from an unillustrated object is converged by the imaging lens 2, and forms an object image on a imaging screen of an imaging portion 3 through an unillustrated OLPF (Optical Low Pass Filter). The object image is photo-electrically converted by a photo electric conversion device provided on the imaging portion 3 to form a picture image of the object. The picture image is displayed on an EVF (Electronic View Finder) 4 provided on the camera 1. Thus, a photographer can observe an object through the EVF.

When the photographer presses an unillustrated release button down, the picture image formed by the imaging portion 3 is stored in a memory (unillustrated). Thus, the photographer can take a picture by the present camera 1.

The variable magnification optical system according to the First Example installed as the imaging lens 2 in the present camera 1, has excellent optical performance, as described above, and comprises a focusing group that is reduced in weight. In other words, by the present camera 1 high speed focusing operation and excellent optical performance can be attained. Incidentally, even if a variable magnification optical system according to each of the Second to the Eighth Examples is installed as an imaging lens 2 in a camera, the same effect as the camera 1 can be obtained. Further, even if a variable magnification optical system according to each of the above Examples is installed in a single lens reflex type camera, which includes a quick return mirror and a finder optical system for observing an object, the same effect as the above described camera 1 can be obtained.

Figure 34:
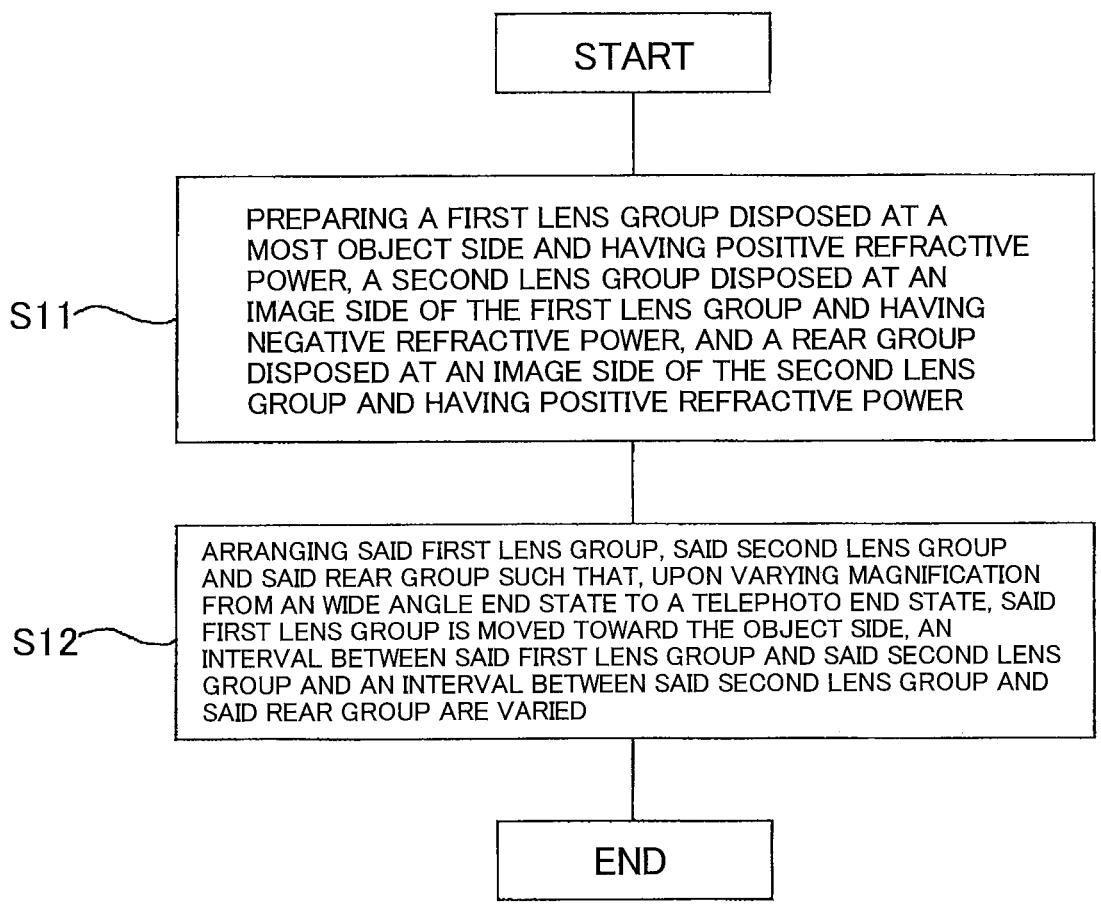
FIG. 34 is a flowchart schematically explaining a method for manufacturing the variable magnification optical system.
Figure 35:
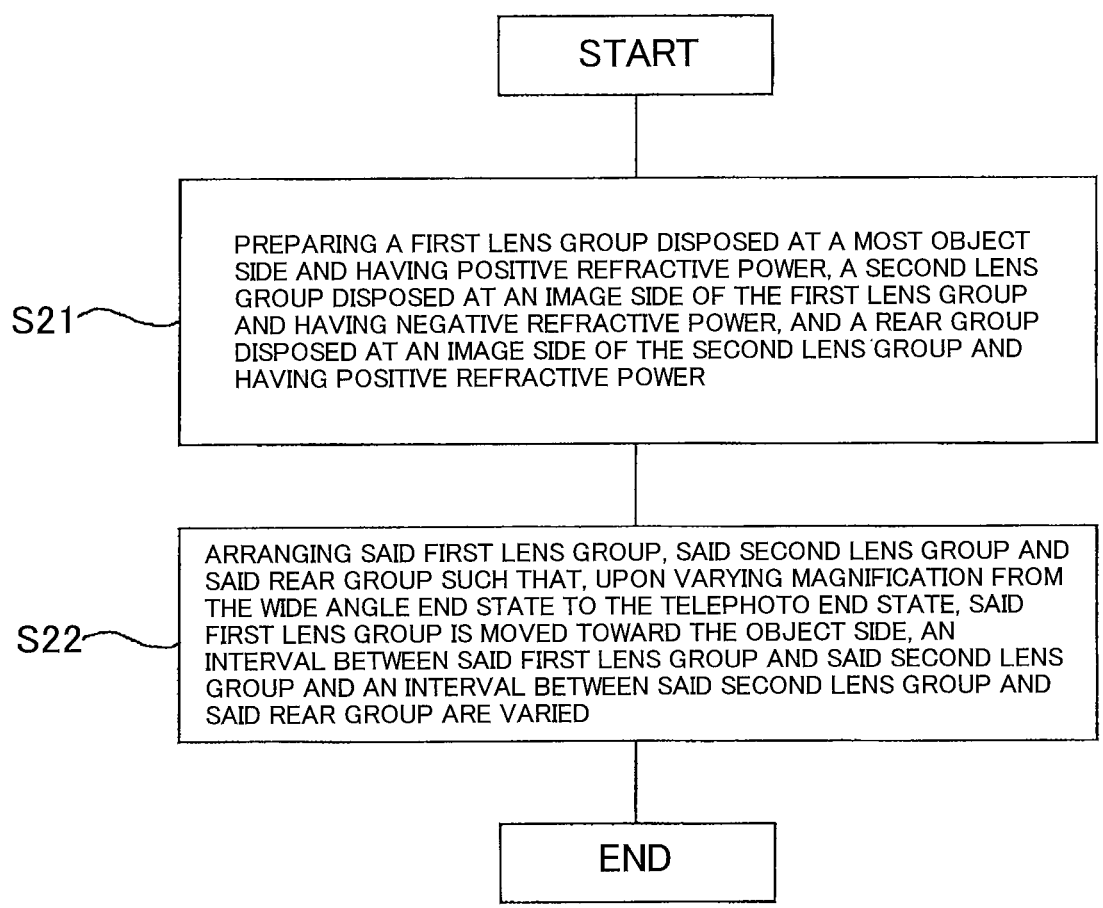
FIG. 35 is a flowchart schematically explaining a method for manufacturing the variable magnification optical system.
Figure 36:
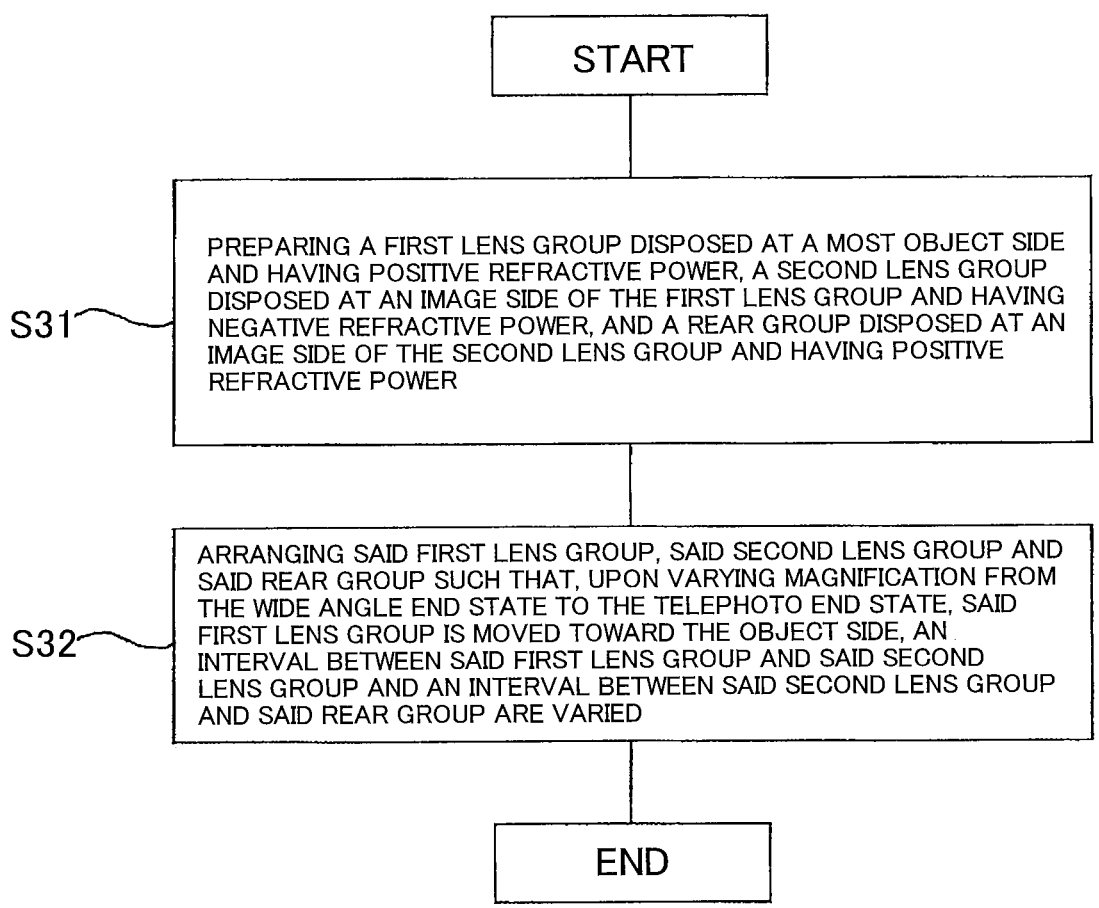
FIG. 36 is a flowchart schematically explaining a method for manufacturing the variable magnification optical system.

Finally, an outline of a method for manufacturing a variable magnification optical system according to the first embodiment, is described with referring to FIG. 34 to FIG. 36.

FIG. 34 is a flowchart showing an outline of a method for manufacturing a variable magnification optical system according to the first embodiment.

The method for manufacturing the variable magnification optical system according to the first embodiment shown in FIG. 34, comprises:

step S11 of preparing a first lens group disposed at a most object side and having positive refractive power, a second lens group disposed at an image side of the first lens group and having negative refractive power, and a rear group disposed at an image side of the second lens group and having positive refractive power; and step S12 of arranging the first lens group, the second lens group and the rear group such that, upon varying magnification from an wide angle end state to a telephoto end state, the first lens group is moved toward the object side, a distance between the first lens group and the second lens group and a distance between the second lens group and the rear group are varied;

the rear group being composed of a focusing group moving upon focusing, an A group having positive refractive power and a B group satisfying the following conditional expression (1) with respect to the A group and having negative refractive power:

$$0.11 < Dvrw/TLw < 0.25 \qquad (1)$$

where Dvrw denotes a distance from the A group to the B group in the wide angle end state, and TLw denotes a whole length of the variable magnification optical system in the wide angle end state.

FIG. 35 is a flowchart showing an outline of a method for manufacturing a variable magnification optical system according to the first embodiment.

It is desirable that the method for manufacturing the variable magnification optical system according to the first embodiment shown in FIG. 35, comprises:

step S21 of preparing a first lens group disposed at a most object side and having positive refractive power, a second lens group disposed at an image side of the first lens group and having negative refractive power, and a rear group disposed at an image side of the second lens group and having positive refractive power;

step S22 of arranging the first lens group, the second lens group and the rear group such that, upon varying magnification from the wide angle end state to the telephoto end state, the first lens group is moved toward the object side, a distance between the first lens group and the second lens group and a distance between the second lens group and the rear group are varied, the first lens group comprising at least one negative lens satisfying the following conditional expression (6):

$$nN < 1.70 \qquad (6)$$

where nN denotes refractive index of the negative lens in the first lens group at d line (wavelength 587.6 nm), and the rear group being composed of a focusing group moving upon focusing, an A group having positive refractive power, and a B group satisfying the following conditional expression (1) with respect to the A group and having negative refractive power:

$$0.11 < Dvrw/TLw < 0.25 \qquad (1)$$

where Dvrw denotes a distance from the A group to the B group in the wide angle end state, and TLw denotes a whole length of the variable magnification optical system in the wide angle end state.

FIG. 36 is a flowchart showing an outline of a method for manufacturing a variable magnification optical system according to the first embodiment.

It is desirable that the method for manufacturing the variable magnification optical system according to the first embodiment shown in FIG. 36, comprises:

step S31 of preparing a first lens group disposed at a most object side and having positive refractive power, a second lens group disposed at an image side of the first lens group and having negative refractive power, and a rear group disposed at an image side of the second lens group and having positive refractive power;

step S32 of arranging the first lens group, the second lens group and the rear group such that, upon varying magnification from the wide angle end state to the telephoto end state, the first lens group is moved toward the object side, a distance between the first lens group and the second lens group and a distance between the second lens group and the rear group are varied, the rear group being composed of a focusing group moving upon focusing, an A group having positive refractive power and a B group satisfying the following conditional expression (1) with respect to the A group and having negative refractive power:

$$0.11<Dvrw/TLw<0.25 \qquad (1)$$

where Dvrw denotes a distance from the A group to the B group in the wide angle end state, and TLw denotes a whole length of the variable magnification optical system in the wide angle end state, and an aperture stop being provided at an image side of the focusing group.

What is claimed is:

1. A variable magnification optical system comprises:
a first lens group disposed at a most object side and having positive refractive power,
a second lens group disposed at an image side of the first lens group and having negative refractive power; and
a rear group disposed at an image side of the second lens group and having positive refractive power;
upon varying magnification from a wide angle end state to a telephoto end state, the first lens group being moved toward the object side, a distance between the first lens group and the second lens group and a distance between the second lens group and the rear group being varied;
the rear group comprising a focusing group that is moved upon focusing, an A group having positive refractive power, and a B group satisfying the following conditional expression with respect to the A group and having negative refractive power:

$$0.11<Dvrw/TLw<0.25$$

where Dvrw denotes a distance from the A group to the B group in the wide angle end state, and TLw denotes a whole length of the variable magnification optical system in the wide angle end state;
the rear group comprising, in order from the object side, a third lens group having positive refractive power and a fourth lens group having positive refractive power; and
the following conditional expression is satisfied:

$$1.50<f1/f2<2.35$$

where f1 denotes a focal length of the first lens group, and f3 denotes a focal length of the third lens group.

2. A variable magnification optical system according to claim 1, wherein the B group is disposed to be movable to have a displacement component in a direction perpendicular to the optical axis.

3. A variable magnification optical system according to claim 1, wherein, in the rear group, a distance between the A group and the B group is largest.

4. A variable magnification optical system according to claim 1, wherein, upon varying magnification from the wide angle end state to the telephoto end state, a distance between the third lens group and the fourth lens group is increased.

5. A variable magnification optical system according to claim 1, wherein
the following conditional expression is satisfied:

$$0.25<f3/f4<1.10$$

where f3 denotes the focal length of the third lens group, and f4 denotes a focal length of the fourth lens group.

6. A variable magnification optical system according to claim 1, wherein
the following conditional expression is satisfied:

$$1.80<f4/(-fvr)<5.20$$

where f4 denotes a focal length of the fourth lens group, and fvr denotes a focal length of the B group.

7. A variable magnification optical system according to claim 1, wherein
the first lens group comprises at least two positive lenses.

8. A variable magnification optical system according to claim 1, wherein
the third lens group is composed of one single lens having positive refractive power.

9. A variable magnification optical system according to claim 8, wherein
the following conditional expression is satisfied:

$$58.00<vFP$$

where vFP denotes an Abbe number at d-line (wavelength 587.6 nm) of the single lens composing the third lens group.

10. An optical apparatus comprising the variable magnification optical system according to claim 1.

11. An imaging apparatus equipped with a variable magnification optical system according to claim 1 and an imaging portion that captures an image formed by the variable magnification optical system.

12. A variable magnification optical system according to claim 1, wherein
the first lens group comprises at least one negative lens, and the following conditional expression is satisfied:

$$nN<1.70$$

where nN denotes refractive index at d-line (wavelength 587.6 nm) of the negative lens in the first lens group.

13. A variable magnification optical system according to claim 12, wherein
the second lens group comprises at least one positive lens.

14. A variable magnification optical system according to claim 13, wherein
the following conditional expression is satisfied:

$$1.40<(R2+R1)/(R2-R1)<3.50$$

where R1 denotes radius of curvature of an object side lens surface of the positive lens in the second lens group, and R2 denotes radius of curvature of an image side lens surface of the positive lens in the second lens group.

15. A variable magnification optical system according to claim 1, wherein
the following conditional expression is satisfied:

$$0.20<DSt/DRt<0.60$$

where DSt denotes a distance along the optical axis from a most object side lens surface in the rear group to the aperture stop in the telephoto end state, and DRt denotes a distance along the optical axis from the most object side lens surface to a most image side lens surface in the rear group in the telephoto end state.

16. An imaging apparatus comprising a variable magnification optical system according to claim 15, and an imaging portion which captures an image formed by the variable magnification optical system.

17. A variable magnification optical system comprising a first lens group disposed at a most object side and having positive refractive power, a second lens group disposed at an image side of the first lens group and having negative refractive power, and a rear group disposed at an image side of the second lens group and having positive refractive power;
  upon varying magnification from a wide angle end state to a telephoto end state, the first lens group being moved toward the object side, a distance between the first lens group and the second lens group and a distance between the second lens group and the rear group being varied;
  the rear group comprising a focusing group;
  the first lens group comprising at least one negative lens that satisfies the following conditional expression:

$nN<1.70$ where nN denotes refractive index at d-line (wavelength 587.6 nm) of the negative lens in the first lens group.

18. A variable magnification optical system according to claim 17, wherein
  the rear group comprises a vibration reduction group which is disposed to be movable to have a displacement component in a direction perpendicular to the optical axis.

19. A variable magnification optical system according to claim 18, wherein
  the second lens group comprises at least one positive lens.

20. A variable magnification optical system according to claim 19, wherein
  the following conditional expression is satisfied:

$1.40<(R2+R1)/(R2-R1)<3.50$ where R1 denotes radius of curvature of an object side lens surface of the positive lens in the second lens group, and R2 denotes radius of curvature of an image side lens surface of the positive lens in the second lens group.

21. A variable magnification optical system comprising a first lens group disposed at a most object side and having positive refractive power, a second lens group disposed at an image side of the first lens group and having negative refractive power, and a rear group disposed at an image side of the second lens group and having positive refractive power;
  upon varying magnification from a wide angle end state to a telephoto end state, the first lens group being moved toward the object side, a distance between the first lens group and the second lens group and a distance between the second lens group and the rear group being varied;
  the rear group comprises a focusing group that is moved upon focusing;
  an aperture stop being disposed at an image side of the focusing group; and
  a lens group disposed at a most image side including at least six lenses.

22. A variable magnification optical system according to claim 21, wherein
  the rear group comprises a vibration reduction group that is disposed to be movable to have a displacement component in a direction perpendicular to the optical axis.

23. A variable magnification optical system according to claim 22, wherein
  the following conditional expression is satisfied:

$0.20<DSt/DRt<0.60$ where DSt denotes a distance along the optical axis from a most object side lens surface in the rear group to the aperture stop in the telephoto end state, and DRt denotes a distance along the optical axis from the most object side lens surface to a most image side lens surface in the rear group in the telephoto end state.

24. A method for manufacturing a variable magnification optical system, comprising:
  arranging a first lens group disposed at a most object side and having positive refractive power, a second lens group disposed at an image side of the first lens group and having negative refractive power, and a rear group disposed at an image side of the second lens group and having positive refractive power such that, upon varying magnification from a wide angle end state to a telephoto end state, the first lens group is moved toward the object side, a distance between the first lens group and the second lens group and a distance between the second lens group and the rear group are varied,
  the method further comprising one or more of the following features (A), (B) and (C):
  (A) the rear group comprising a focusing group that is moved upon focusing, an A group having positive refractive power, and a B group satisfying the following conditional expression with respect to the A group and having negative refractive power:

$0.11<Dvrw/TLw<0.25$ where Dvrw denotes a distance from the A group to the B group in the wide angle end state, and TLw denotes a whole length of the variable magnification optical system in the wide angle end state;
  the rear group comprising, in order from the object side, a third lens group having positive refractive power and a fourth lens group having positive refractive power; and
  the following conditional expression is satisfied:

$1.50<f1/f3<2.35$ where f1 denotes a focal length of the first lens group, and f3 denotes a focal length of the third lens group;
  (B) the rear group comprising a focusing group; and
  the first lens group comprising at least one negative lens that satisfies the following conditional expression:

$nN<1.70$ where nN denotes refractive index at d-line (wavelength 587.6 nm) of the negative lens in the first lens group; and
  (C) the rear group comprises a focusing group that is moved upon focusing;
  an aperture stop being disposed at an image side of the focusing group; and
  a lens group disposed at a most image side including at least six lenses.

* * * * *